US011132969B2

(12) United States Patent
Takahashi

(10) Patent No.: US 11,132,969 B2
(45) Date of Patent: Sep. 28, 2021

(54) DISPLAY DEVICE AND METHOD FOR OPERATING THE SAME

(71) Applicant: Semiconductor Energy Laboratory Co., Ltd., Atsugi (JP)

(72) Inventor: Kei Takahashi, Isehara (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 9 days.

(21) Appl. No.: 16/462,422

(22) PCT Filed: Dec. 1, 2017

(86) PCT No.: PCT/IB2017/057561
§ 371 (c)(1),
(2) Date: May 20, 2019

(87) PCT Pub. No.: WO2018/104831
PCT Pub. Date: Jun. 14, 2018

(65) Prior Publication Data
US 2019/0279590 A1    Sep. 12, 2019

(30) Foreign Application Priority Data

Dec. 9, 2016 (JP) .............................. JP2016-239122

(51) Int. Cl.
*G09G 3/36* (2006.01)
*G06F 3/041* (2006.01)
(Continued)

(52) U.S. Cl.
CPC ......... *G09G 3/3677* (2013.01); *G06F 3/0412* (2013.01); *G06F 3/0446* (2019.05);
(Continued)

(58) Field of Classification Search
CPC .. G09G 3/3677; G09G 3/3225; G09G 3/3266; G09G 2310/0286; G06F 3/04166
See application file for complete search history.

(56) References Cited

U.S. PATENT DOCUMENTS 8,854,286 B2    10/2014  Yamazaki et al.
8,890,781 B2    11/2014  Yamazaki et al.
(Continued)

FOREIGN PATENT DOCUMENTS

JP    2010-135762 A    6/2010
JP    2011-141522 A    7/2011
(Continued)

OTHER PUBLICATIONS

International Search Report (Application No. PCT/IB2017/057561) dated Mar. 20, 2018.
(Continued)

*Primary Examiner* — Lixi C Simpson
(74) *Attorney, Agent, or Firm* — Robinson IP Law Office, P.C.; Eric J. Robinson

(57) ABSTRACT

A display device which achieves both a high-accuracy sensing operation and smooth input in a touch sensor unit is provided. The display device includes a display unit and the touch sensor unit. The touch sensor unit performs a touch sensing operation when the display unit does not perform a display image rewriting operation; thus, a highly accurate sensing operation is possible. A gate driver of the display unit includes a first circuit and a second circuit. The second circuit includes a plurality of shift registers. Only a display image of a region that needs to be rewritten can be rewritten. The first circuit is a shift register and designates a shift register from the plurality of shift registers included in the second circuit to operate. In the case where an image in the entire display region does not need to be rewritten, the time (Continued)

assigned for the sensing operation of the touch sensor unit increases, leading to the smooth input.

13 Claims, 32 Drawing Sheets

(51) Int. Cl.
  *G09G 3/20* (2006.01)
  *G09G 3/3266* (2016.01)
  *G09G 3/3225* (2016.01)
  *G06F 3/044* (2006.01)

(52) U.S. Cl.
  CPC .......... *G06F 3/04166* (2019.05); *G09G 3/20* (2013.01); *G09G 3/2096* (2013.01); *G09G 3/3225* (2013.01); *G09G 3/3266* (2013.01); *G09G 3/36* (2013.01); *G09G 2300/0426* (2013.01); *G09G 2310/0286* (2013.01); *G09G 2310/08* (2013.01); *G09G 2354/00* (2013.01)

(56) References Cited

U.S. PATENT DOCUMENTS

| | | | |
|---|---|---|---|
| 9,013,391 B2* | 4/2015 | Fujikawa | H03K 3/015 345/100 |
| 9,165,502 B2 | 10/2015 | Yamazaki et al. | |
| 9,368,082 B2 | 6/2016 | Yamazaki et al. | |
| 9,959,822 B2 | 5/2018 | Yamazaki et al. | |
| 1,008,365 A1 | 9/2018 | Yamazakis et al. | |
| 2005/0168491 A1* | 8/2005 | Takahara | G09G 3/3241 345/690 |
| 2008/0186267 A1* | 8/2008 | Mamba | G09G 3/3655 345/87 |
| 2010/0110623 A1 | 5/2010 | Koyama et al. | |
| 2013/0235026 A1* | 9/2013 | Yamamoto | G11C 19/184 345/214 |
| 2014/0292741 A1* | 10/2014 | Yamazaki | H01L 27/1225 345/212 |
| 2015/0054781 A1* | 2/2015 | Miyamoto | G09G 3/20 345/174 |
| 2015/0200240 A1* | 7/2015 | Cho | H01L 29/7869 257/43 |
| 2017/0004788 A1 | 1/2017 | Yamazaki et al. | |
| 2017/0052635 A1 | 2/2017 | Yu et al. | |
| 2017/0116946 A1* | 4/2017 | Nakatani | G09G 3/3677 |
| 2018/0090086 A1 | 3/2018 | Yamazaki et al. | |
| 2019/0012960 A1 | 1/2019 | Yamazaki et al. | |

FOREIGN PATENT DOCUMENTS

| | | |
|---|---|---|
| JP | 2011-141524 A | 7/2011 |
| JP | 2015-041235 A | 3/2015 |
| KR | 2011-0093822 A | 8/2011 |
| TW | 201027754 | 7/2010 |
| WO | WO-2015/137706 | 9/2015 |

OTHER PUBLICATIONS

Written Opinion (Application No. PCT/IB2017/057561) dated Mar. 20, 2018.

* cited by examiner

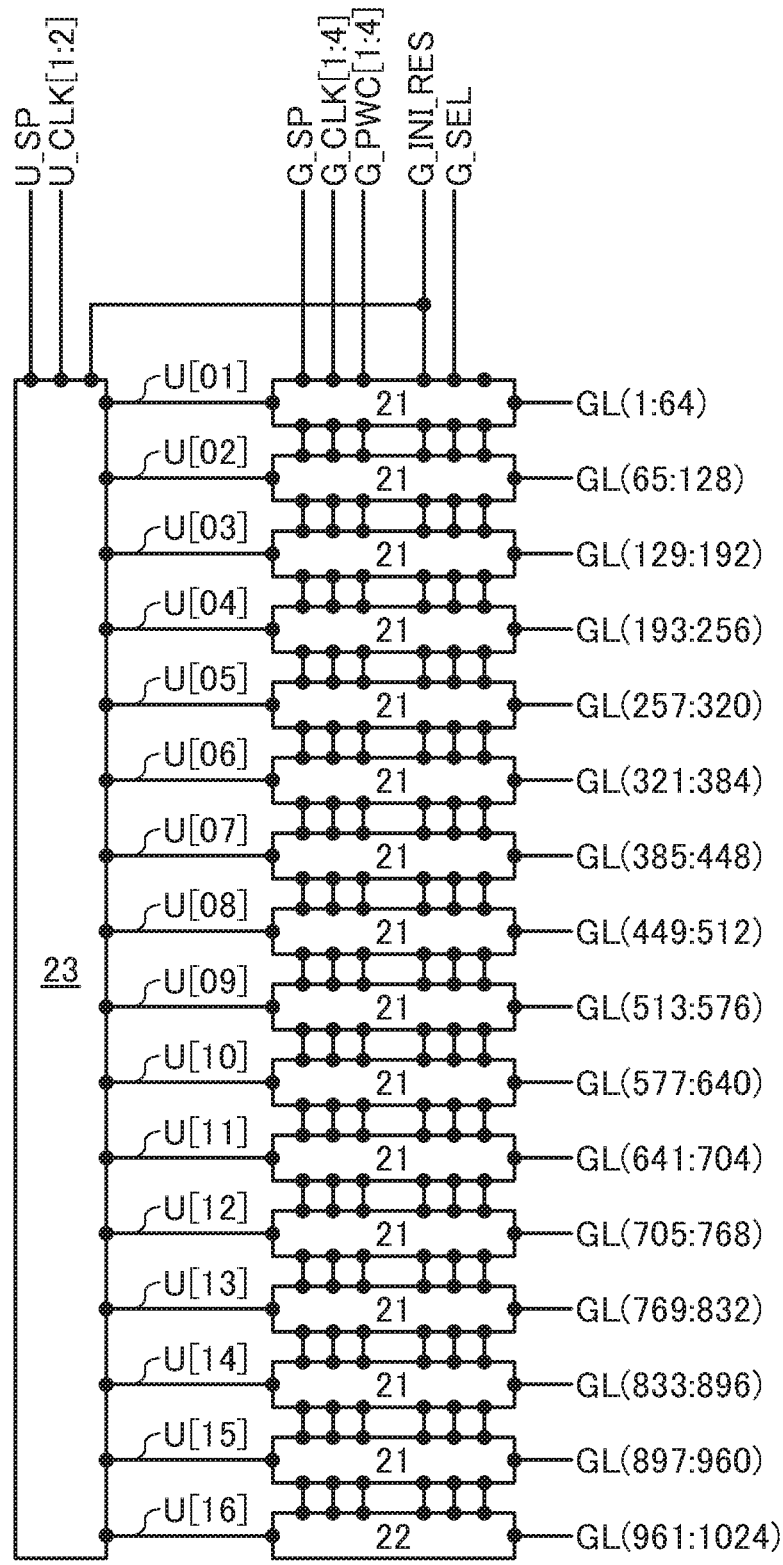

FIG. 26A1
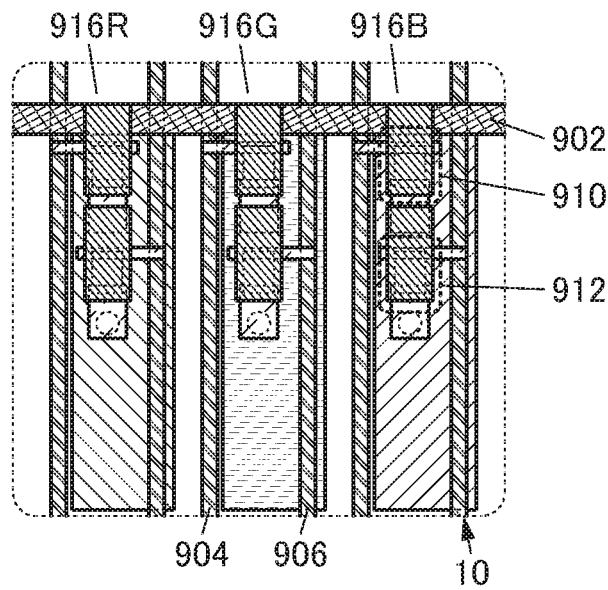
FIG. 26A2
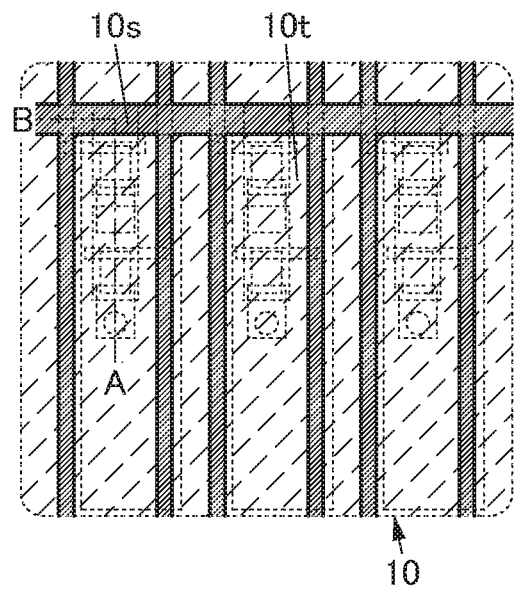
FIG. 26B
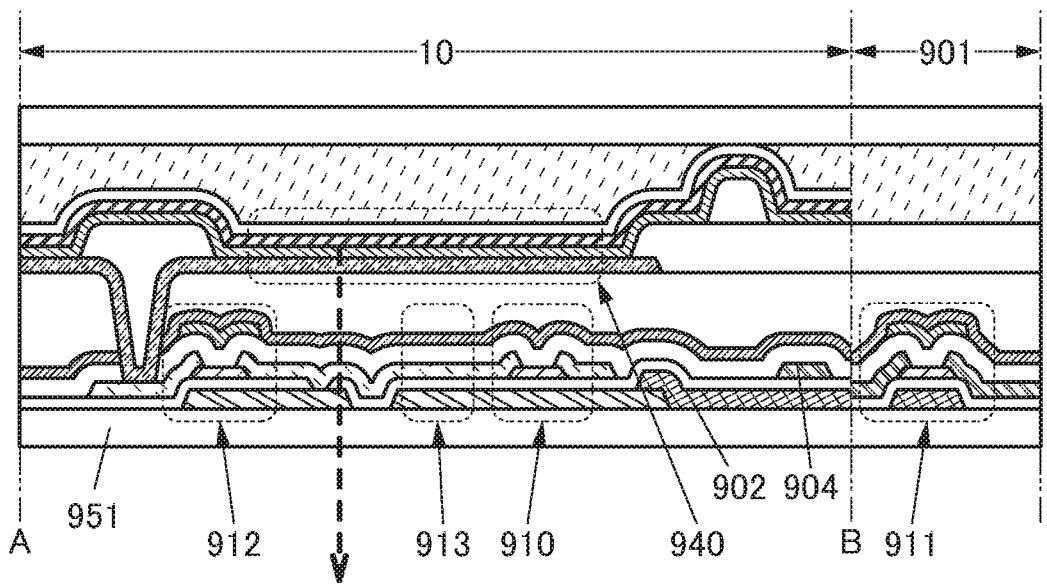

FIG. 27A1
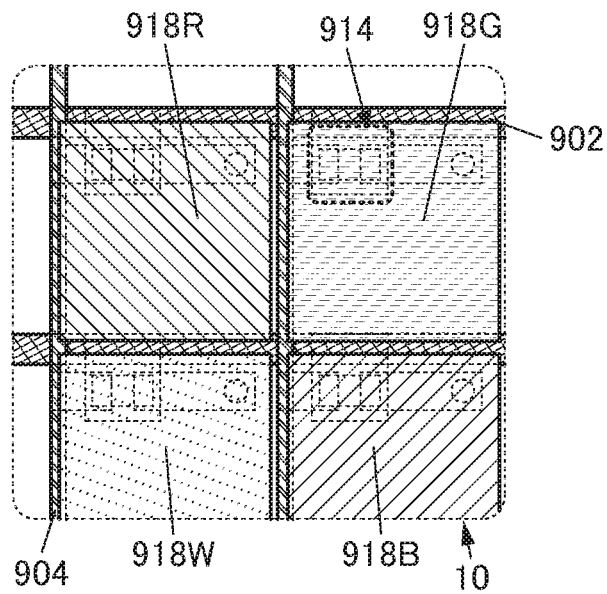
FIG. 27A2
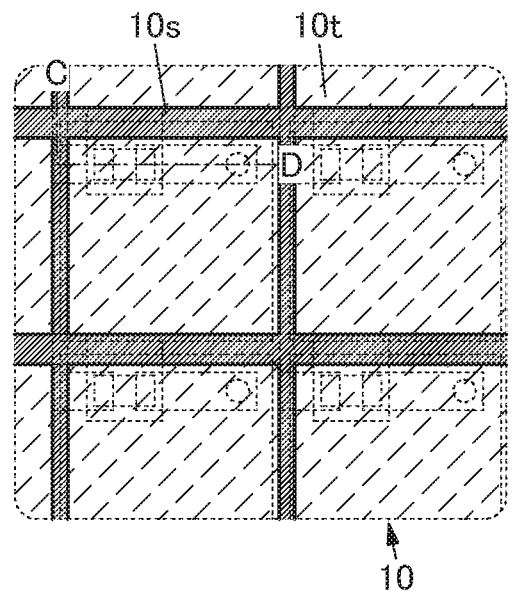
FIG. 27B
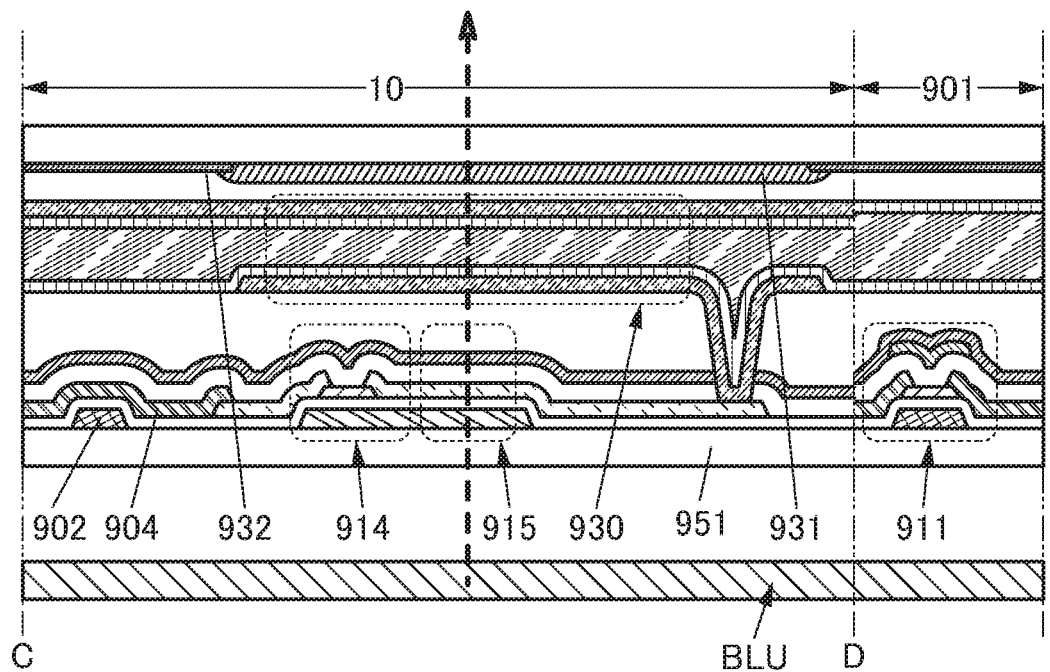

DISPLAY DEVICE AND METHOD FOR OPERATING THE SAME

TECHNICAL FIELD

One embodiment of the present invention relates to a display device and a method for operating the display device. Furthermore, one embodiment of the present invention relates to a semiconductor device.

Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter.

Specifically, examples of the technical field of one embodiment of the present invention disclosed in this specification and the like include a display device, a semiconductor device, an electronic device, a method for driving any of them, and a method for manufacturing any of them. In this specification and the like, a semiconductor device generally means a device that can function by utilizing semiconductor characteristics. For example, an integrated circuit, a chip including an integrated circuit, an electronic component including a packaged chip, and an electronic device including an integrated circuit are examples of a semiconductor device.

BACKGROUND ART

A display device in which a display unit and a touch sensor unit are combined is used. A sensing region of the touch sensor unit overlaps with a display region of the display unit, so that the display device displays an image on the display region and can obtain information of the position in the display region indicated by a user. The user performs input with a finger, a stylus, or the like.

A transistor including an oxide semiconductor can be used for a pixel of the display unit. A transistor including an oxide semiconductor exhibits an extremely low off-state current; hence, the frequency of refresh operations in displaying a still image with the display unit can be reduced. In this specification and the like, the technique for reducing the frequency of refresh operations is referred to as idling stop or IDS driving (Patent Document 1 and Patent Document 2). The IDS driving can reduce power consumption of the display unit.

REFERENCE

Patent Document

[Patent Document 1] Japanese Published Patent Application No. 2011-141522
[Patent Document 2] Japanese Published Patent Application No. 2011-141524

DISCLOSURE OF INVENTION

Although the frequency of display image rewriting by the display unit is generally about 60 times per second (in other words, the frame frequency is 60 Hz), a sensing operation by the touch sensor unit needs to be performed 80 times or more per second, preferably 100 times or more per second because smooth input such as handwriting input is required for the touch sensor unit.

In the case where the touch sensor unit performs a sensing operation at the time when the display unit rewrites a display image, the sensing accuracy of the touch sensor unit deteriorates by the influence of noise. An object of one embodiment of the present invention is to provide a display device that achieves both high sensing accuracy of the touch sensor unit and smooth input using the touch sensor unit.

An object of one embodiment of the present invention is to provide a novel display device. Another object of one embodiment of the present invention is to provide a novel driving method that achieves both high sensing accuracy of the touch sensor unit and smooth input using the touch sensor unit. Another object of one embodiment of the present invention is to provide an electronic device including the novel display device.

Note that one embodiment of the present invention does not necessarily achieve all the objects listed above and only needs to achieve at least one of the objects. The description of the above objects does not preclude the existence of other objects. Other objects will be apparent from and can be derived from the description of the specification, the drawings, the claims, and the like.

An embodiment of the present invention is a display device including first to N-th pixel groups (N is an integer of 2 or more) and a gate driver. The gate driver includes a first circuit and a second circuit, and the second circuit includes first to N-th shift registers. The first circuit is configured to select a K-th shift register (K is an integer more than or equal to 1 and less than or equal to N) from among the first to N-th shift registers, and the K-th shift register is configured to output a signal to a gate line electrically connected to a K-th pixel group.

In the above-described embodiment, one signal may trigger the first to N-th shift registers to output signals to gate lines electrically connected to the first to N-th pixel groups.

In the above-described embodiment, the first circuit may be a shift register.

In the above-described embodiment, in a period when the K-th shift register outputs the signal, the first circuit may be configured to select an L-th shift register (L is an integer more than or equal to 1 and less than or equal to N and different from K) to output a signal next.

An embodiment of the present invention is the display device of the above-described embodiment further including a touch sensor unit. The touch sensor unit performs a touch sensing operation in a period when the first circuit and the first to N-th shift registers stop signal output.

An embodiment of the present invention is the display device of the above-described embodiment further including an application processor. The application processor is configured to determine whether a display image changes in the first to N-th pixel groups. The application processor is configured to rewrite the display image in the pixel group in which the display image changes and not to rewrite the display image in the pixel group in which the display image does not change.

In the above-described embodiment, the first to N-th pixel groups may each include a transistor including a metal oxide in a channel formation region.

In the above-described embodiment, a transistor included in the gate driver may include a metal oxide in a channel formation region.

An embodiment of the present invention is a method for operating a display device including first to N-th pixel groups (N is an integer of 2 or more) and a gate driver. The gate driver includes a first circuit and a second circuit, and the second circuit includes first to N-th shift registers. The method includes a step in which the first circuit selects a K-th shift register (K is an integer more than or equal to 1 and less than or equal to N) from among the first to N-th shift registers in one frame and a step in which the K-th shift register outputs a signal to a gate line electrically connected to a K-th pixel group.

In the above-described embodiment, one signal may trigger the first to N-th shift registers to output signals to gate lines electrically connected to the first to N-th pixel groups.

In the above-described embodiment, the first circuit may be a shift register.

In the above-described embodiment, in a period when the K-th shift register outputs the signal, the first circuit may be configured to select an L-th shift register (L is an integer more than or equal to 1 and less than or equal to N and different from K) to output a signal next.

An embodiment of the present invention is the method for operating a display device of the above-described embodiment, in which the display device further includes a touch sensor unit. The touch sensor unit performs a touch sensing operation in a period when the first circuit and the first to N-th shift registers stop signal output.

An embodiment of the present invention is the method for operating a display device of the above-described embodiment, in which the display device further includes an application processor. The application processor is configured to determine whether a display image changes in the first to N-th pixel groups. The application processor is configured to rewrite the display image in the pixel group in which the display image changes and not to rewrite the display image in the pixel group in which the display image does not change.

In the above-described embodiment, the first to N-th pixel groups may each include a transistor including a metal oxide in a channel formation region.

In the above-described embodiment, a transistor included in the gate driver may include a metal oxide in a channel formation region.

One embodiment of the present invention can provide a novel display device. Another embodiment of the present invention can provide a display device that achieves both high sensing accuracy of a touch sensor unit and smooth input using the touch sensor unit. Another embodiment of the present invention can provide a display device that achieves both high sensing accuracy of a touch sensor unit and smooth input using the touch sensor unit with a small number of signals. Another embodiment of the present invention can provide a display device with low power consumption.

Another embodiment of the present invention can provide a novel driving method that achieves both high sensing accuracy of a touch sensor unit and smooth input using the touch sensor unit. Another embodiment of the present invention can provide an electronic device including the novel display device.

Note that the effects of one embodiment of the present invention are not limited to the effects listed above. The effects listed above do not preclude the existence of other effects. The other effects are the ones that are not described above and will be described below. The other effects will be apparent from and can be derived from the description of the specification, the drawings, and the like by those skilled in the art. One embodiment of the present invention has at least one of the effects listed above and the other effects. Accordingly, one embodiment of the present invention does not have the effects listed above in some cases.

BRIEF DESCRIPTION OF DRAWINGS

In the accompanying drawings:

FIG. 5 is a circuit diagram illustrating a structure example of a gate driver;

FIGS. 26A1, 26A2, and 26B are top views and a cross-sectional view illustrating an example of a pixel;

FIGS. 27A1, 27A2, and 27B are top views and a cross-sectional view illustrating an example of a pixel;

BEST MODE FOR CARRYING OUT THE INVENTION

Figure 1:
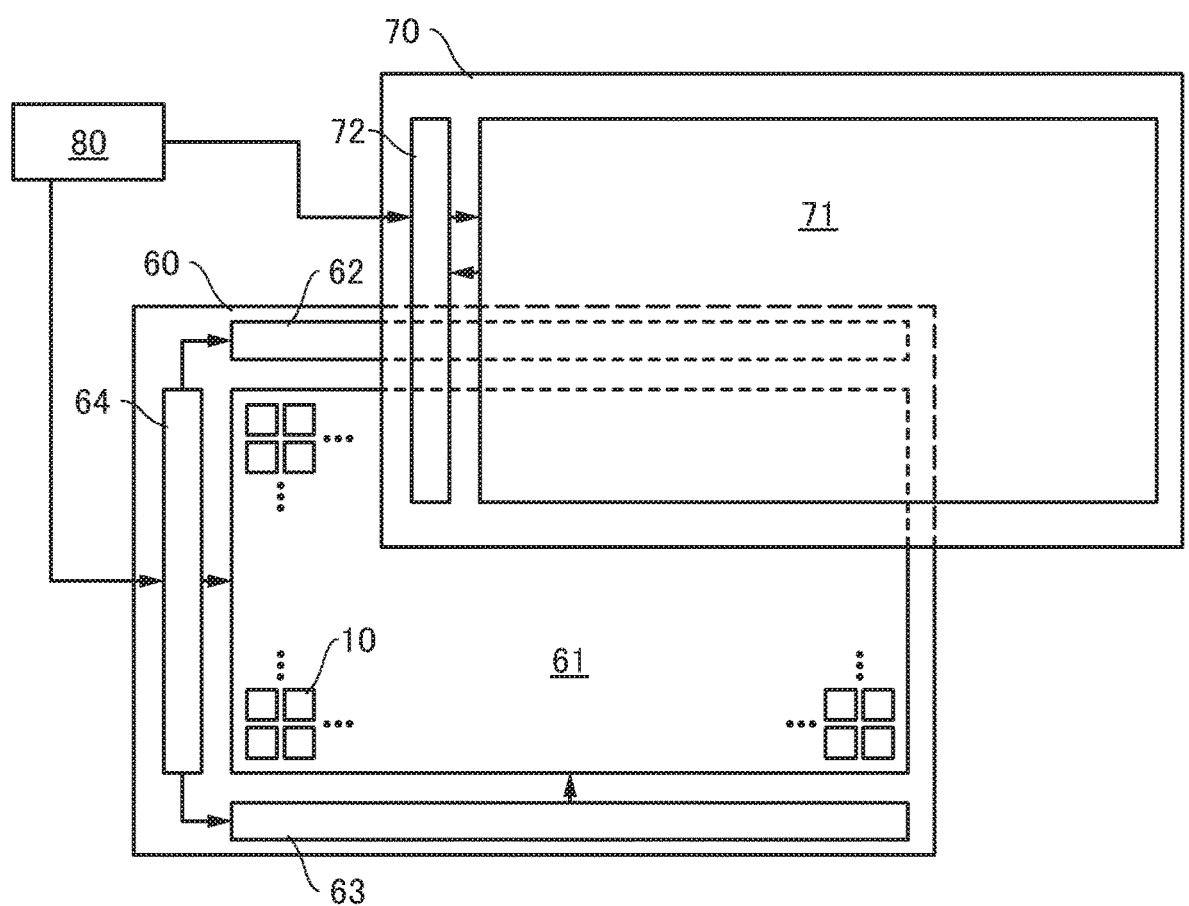
FIG. 1 is a block diagram illustrating a structure example of a display device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments. Any of the embodiments described below can be combined as appropriate.

A display device described in an embodiment includes a display unit, a touch sensor unit, and the like. Therefore, the display device is also referred to as a semiconductor device, an electronic device, or the like in some cases.

In the drawings and the like, the size, the layer thickness, the region, or the like is sometimes exaggerated for clarity, and thus is not limited to the illustrated scale. Note that drawings are schematic views of ideal examples, and the embodiments of the present invention are not limited to the shape, the value, or the like illustrated in the drawings.

In the drawings and the like, the same elements, elements having similar functions, elements formed of the same material, elements formed at the same time, and the like are sometimes denoted by the same reference numerals, and the description thereof is not repeated in some cases.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

In this specification and the like, the terms for describing arrangement such as "over" and "under" do not necessarily mean "directly over" and "directly under", respectively, in the description of a physical relationship between components. For example, the expression "a gate electrode over a gate insulating layer" can mean the case where there is an additional component between the gate insulating layer and the gate electrode.

In this specification and the like, the term "parallel" indicates that the angle formed between two straight lines is greater than or equal to −10° and less than or equal to 100, and accordingly also includes the case where the angle is greater than or equal to −50 and less than or equal to 50. The term "perpendicular" indicates that the angle formed between two straight lines is greater than or equal to 800 and less than or equal to 1000, and accordingly also includes the case where the angle is greater than or equal to 850 and less than or equal to 950°.

In this specification and the like, ordinal numbers such as "first", "second", and "third" are used in order to avoid confusion among components, and the terms do not limit the components numerically.

In this specification and the like, two numbers separated by a colon in square brackets (e.g., "1:4" in G_CLK[1:4]) represent a range of arrangement. For example, G_CLK[1:4] is the same as G_GLK[1] to G_GLK[4]. Similarly, two numbers separated by a colon in parentheses also represent a range of arrangement. For example, GL(1:64) is the same as GL(1) to GL(64).

In this specification and the like, the term "electrically connected" includes the case where components are connected through an object having any electric function. There is no particular limitation on the "object having any electric function" as long as electric signals can be transmitted and received between components that are connected through the object. Examples of the "object having any electric function" are a switching element such as a transistor, a resistor, an inductor, a capacitor, and elements with a variety of functions as well as an electrode and a wiring.

In this specification and the like, the term "voltage" often refers to a difference between a given potential and a reference potential (e.g., a ground potential). Accordingly, voltage, potential, and potential difference can also be referred to as potential, voltage, and voltage difference, respectively.

In this specification and the like, a transistor is an element having at least three terminals: a gate, a drain, and a source. The transistor has a channel region between a drain (a drain terminal, a drain region, or a drain electrode) and a source (a source terminal, a source region, or a source electrode), and a current can flow between the source and the drain through the channel region. Note that in this specification and the like, a channel region refers to a region through which a current mainly flows.

Furthermore, functions of a source and a drain might be switched when a transistor of opposite polarity is employed or a direction of current flow is changed in circuit operation, for example. Therefore, the terms "source" and "drain" can be switched in this specification and the like.

Unless otherwise specified, an off-state current in this specification and the like refers to a drain current of a transistor in an off state (also referred to as a non-conducting state and a cutoff state). Unless otherwise specified, the off state of an n-channel transistor means that a gate voltage with respect to a source voltage ($V_{gs}$) is lower than the threshold voltage ($V_{th}$), and the off state of a p-channel transistor means that $V_{gs}$ is higher than $V_{th}$. That is, the off-state current of an n-channel transistor sometimes refers to a drain current that flows when the gate voltage $V_{gs}$ with respect to the source voltage is lower than the threshold voltage $V_{th}$.

In the above description of the off-state current, a drain may be replaced with a source. That is, the off-state current sometimes refers to a current that flows through a source of a transistor in the off state.

In this specification and the like, the term "leakage current" sometimes expresses the same meaning as "off-state current". In this specification and the like, the off-state current sometimes refers to a current that flows between a source and a drain when a transistor is in the off state.

In this specification and the like, a metal oxide means an oxide of metal in a broad sense. Metal oxides are classified into an oxide insulator, an oxide conductor (including a transparent oxide conductor), an oxide semiconductor (also simply referred to as OS), and the like. For example, a metal oxide used in an active layer of a transistor is called an oxide semiconductor in some cases. That is, a metal oxide that has at least one of an amplifying function, a rectifying function, and a switching function can be called a metal oxide semiconductor, or OS for short. An OS transistor or an OS FET refers to a transistor including a metal oxide or an oxide semiconductor.

Embodiment 1

In this embodiment, a display device including a display unit and a touch sensor unit is described. In particular, a gate driver included in the display unit and a relationship between a display image rewriting operation by the display unit and a sensing operation (touch sensing) by the touch sensor unit are described.

<<Display Device>>

FIG. 1 is a block diagram illustrating a structure example of a display device. A display device 100 includes a display unit 60, a touch sensor unit 70, and an application processor 80.

<Display Unit>

The display unit 60 includes a pixel array 61, a gate driver 62, a gate driver 63, and a source driver IC 64.

The pixel array 61 includes a plurality of pixels 10. Each of the pixels 10 is an active element driven by a transistor. The pixel array 61 has a function of forming a display region of the display unit 60 and displaying an image. A more specific structure example of the pixel array 61 is described in Embodiment 4.

The gate driver 62 and the gate driver 63 (hereinafter, referred to as gate drivers 62 and 63) have a function of driving a gate line for selecting the pixel 10. Either the gate driver 62 or the gate driver 63 is not necessarily provided. Although FIG. 1 illustrates an example in which the gate drivers 62 and 63 are provided together with the pixel array 61 over the same substrate, the gate drivers 62 and 63 can be dedicated ICs.

The source driver IC 64 has a function of driving a source line that supplies a data signal to the pixel 10. Although the source driver IC 64 is mounted by a chip on glass (COG) method here, there is no particular limitation on the mounting method, and a chip on flexible (COF) method, a tape automated bonding (TAB) method, or the like may be employed. The same applies to a method for mounting the IC on the touch sensor unit 70 described later.

A transistor used for the pixel 10 is an OS transistor, which has a lower off-state current than a Si transistor.

The OS transistor preferably includes a metal oxide in a channel formation region. The metal oxide used for the OS transistor preferably contains at least one of indium (In) and zinc (Zn).

Typical examples of such an oxide include an In-M-Zn oxide, an In-M oxide, a Zn-M oxide, and an In—Zn oxide (the element M is aluminum (Al), gallium (Ga), yttrium (Y), tin (Sn), boron (B), silicon (Si), titanium (Ti), iron (Fe), nickel (Ni), germanium (Ge), zirconium (Zr), molybdenum (Mo), lanthanum (La), cerium (Ce), neodymium (Nd), vanadium (V), beryllium (Be), hafnium (Hf), tantalum (Ta), or tungsten (W), for example).

The off-state current per channel width of 1 μm of an OS transistor can be low and approximately higher than or equal to 1 yA/μm (y: yocto, $10^{-24}$) and lower than or equal to 1 zA/μm (z: zepto, $10^{-21}$).

A cloud-aligned composite oxide semiconductor (CAC-OS) is preferably used for an OS transistor. Note that the details of the CAC-OS will be described in Embodiment 6.

The transistor used for the pixel 10 is not necessarily an OS transistor, and a transistor with a low off-state current other than an OS transistor can be used. For example, a transistor including a wide-bandgap semiconductor may be used. In some cases, the wide-bandgap semiconductor refers to a semiconductor with a bandgap of 2.2 eV or greater. Examples of the wide-bandgap semiconductor include silicon carbide, gallium nitride, and diamond.

By using the transistor having a low off-state current in the pixel 10, the gate drivers 62 and 63 and the source driver IC 64 can be temporarily stopped (the temporary stop is referred to as idling stop or IDS driving, which are mentioned above) in the case where display image rewriting by the display unit 60 is not necessary, that is, a still image is displayed.

<Touch Sensor Unit>

The touch sensor unit 70 illustrated in FIG. 1 includes a sensor array 71 and a touch sensor IC 72.

The sensor array 71 forms a region where the touch sensor unit 70 can sense a touch and a user of the display device 100 performs input on this region with a finger, a stylus, or the like. The sensor array 71 is provided in a region overlapping with the pixel array 61. The display device 100 displays an image on the display region of the display unit 60 and can obtain information of the position in the display region indicated by the user.

Figure 2:
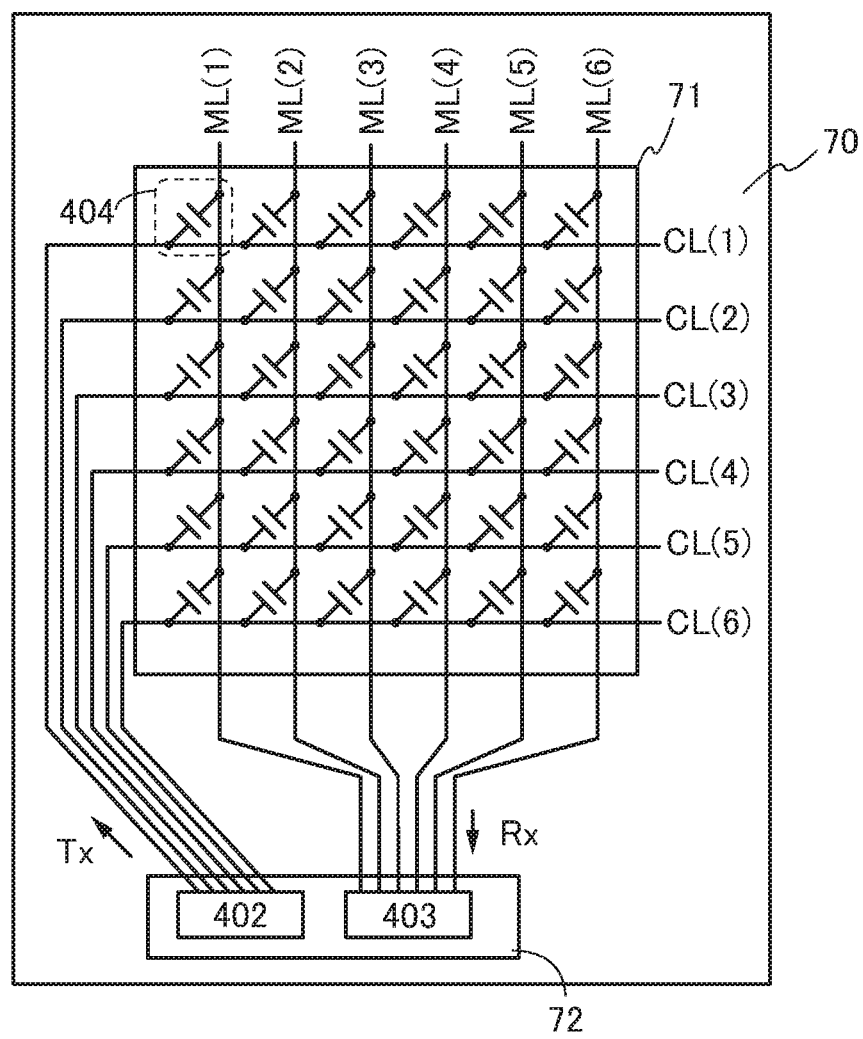
FIG. 2 is a block diagram illustrating a structure example of a touch sensor unit.

FIG. 2 is a block diagram illustrating a structure example of the touch sensor unit 70. Here, an example in which the touch sensor unit 70 is a projected capacitive (mutual capacitive) touch sensor unit is illustrated. However, the touch sensor unit 70 can be of any detection type, for example, a projected capacitive type, a surface capacitive type, a resistive type, an ultrasonic surface acoustic wave type, an optical type, or an electromagnetic induction type.

The sensor array 71 includes wirings CL, wirings ML, and a plurality of capacitors 404. The capacitors 404 are formed by the wirings CL and ML overlapping with each other or the wirings CL and ML provided close to each other.

In FIG. 2, as an example, six wirings CL(1) to CL(6) represent the wirings CL, and six wirings ML(1) to ML(6) represent the wirings ML; however, the number of wirings is not limited thereto. The wirings CL are each supplied with a pulse voltage and the wirings ML each sense a change in current.

When proximity or contact of an object (e.g., a finger or a stylus) to the sensor array 71 is sensed, the capacitance value of the capacitor 404 is changed and the touch sensor unit 70 senses a touch.

The sensor array 71 is electrically connected to the touch sensor IC 72 through the wirings CL and ML. The touch sensor IC 72 includes a driver circuit 402 and a sensing circuit 403.

The driver circuit 402 is electrically connected to the sensor array 71 through the wirings CL. The driver circuit 402 has a function of outputting a signal Tx. As the driver circuit 402, a shift register circuit and a buffer circuit can be used in combination, for example.

The sensing circuit 403 is electrically connected to the sensor array 71 through the wirings ML. The sensing circuit 403 senses a touch on the touch sensor unit 70 by sensing a signal Rx. The sensing circuit 403 can include an amplifier circuit and an analog-digital converter (ADC), for example. The sensing circuit 403 has a function of converting an analog signal output from the sensor array 71 into a digital signal and outputting the digital signal to the application processor 80.

Note that a more specific structure example of the touch sensor unit 70 is described in Embodiment 2.

<Application Processor>

The application processor 80 is electrically connected to the source driver IC 64 and the touch sensor IC 72.

The application processor 80 has a function of supplying image data to be displayed on the display unit 60 to the source driver IC 64. In addition, the application processor 80 has a function of calculating a change between image data displayed on the display unit 60 at present and image data displayed next.

The application processor 80 has a function of giving an instruction on the time at which the display unit 60 rewrites a display image and the time at which the touch sensor unit 70 performs a sensing operation. The data of the time at which the display unit 60 rewrites a display image is transmitted from the application processor 80 to the source driver IC 64, and the source driver IC 64 has a function of controlling the operation of the gate drivers 62 and 63. The data of the time at which the touch sensor unit 70 performs a sensing operation is transmitted from the application processor 80 to the touch sensor IC 72.

In the block diagram illustrated in FIG. 1, signals for driving the gate drivers 62 and 63 are not necessarily supplied through the source driver IC 64. A block diagram in that case is illustrated in FIG. 3.

Figure 3:
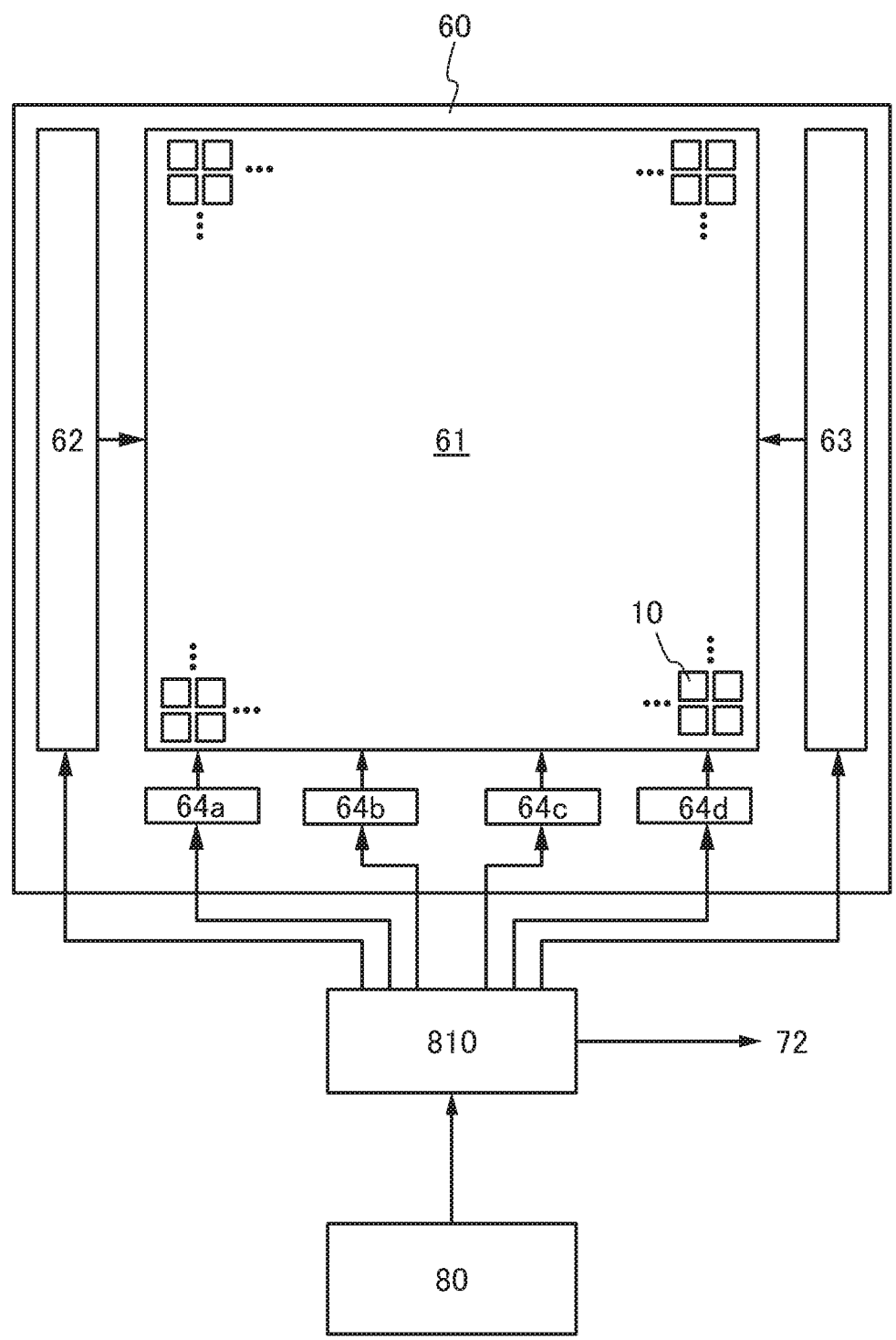
FIG. 3 is a block diagram illustrating a structure example of a display device.

In FIG. 3, the application processor 80 supplies signals to source driver ICs 64a to 64d and the gate drivers 62 and 63 through a timing controller 810. The timing controller 810 may be included in the application processor 80.

The structure illustrated in FIG. 3 includes a plurality of source driver ICs. The number of source driver ICs may be set in accordance with the number of pixels of the pixel array 61.

In the structure illustrated in FIG. 3, the number of pixels in the pixel array 61 is preferably larger, for example, 4K (3840×2160) or 8K (7680×4320). When a plurality of source driver ICs are provided and a circuit provided outside the source driver ICs has a function of controlling the gate drivers, the number of terminals of the source driver ICs can be reduced. In the case where the number of the terminals of the source driver ICs is large, a large amount of force is applied to the source driver ICs when the source driver ICs are crimped to a substrate, which leads to damage to the source driver ICs. Accordingly, the structure illustrated in FIG. 3 can prevent damage to the source driver ICs.

<Pixel Array>

Figure 4:
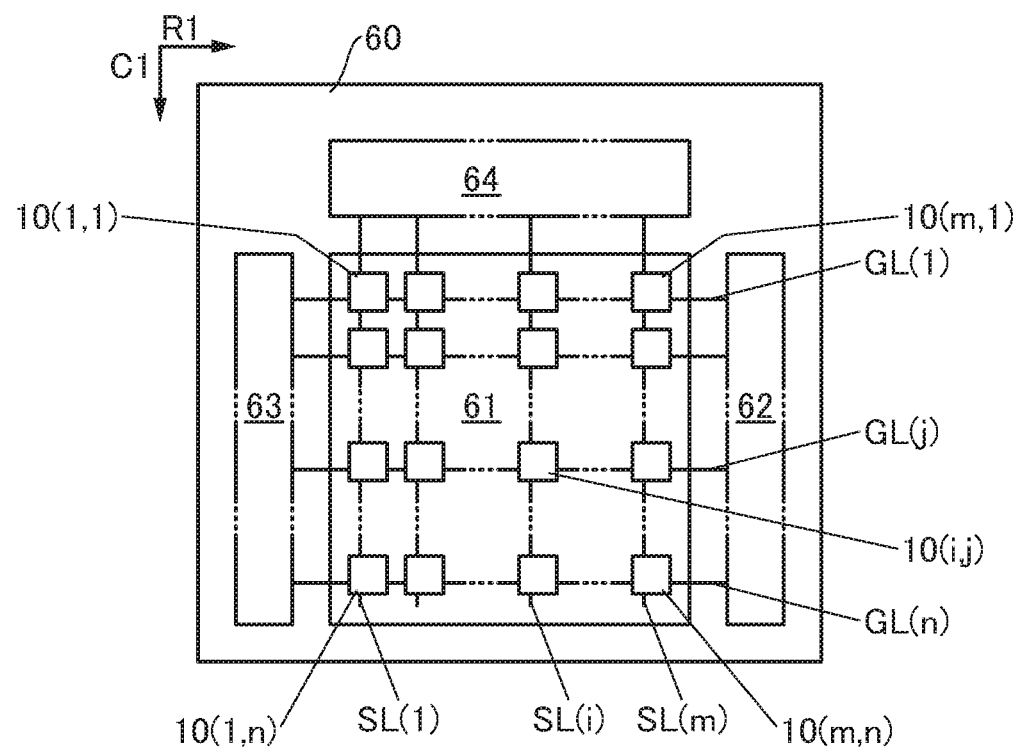
FIG. 4 is block diagram illustrating a structure example of a display unit.

FIG. 4 is a block diagram illustrating a structure example of the display unit 60.

The pixel array 61 includes pixels 10(1,1) to 10(m,n), source lines SL(1) to SL(m), and gate lines GL(1) to GL(n). Note that m and n are each an integer greater than or equal to 1, i is an integer greater than or equal to 1 and less than or equal to m, and j is an integer greater than or equal to 1 and less than or equal to n. In FIG. 4, a constant potential line and the like for forming a power source line or a capacitor are not illustrated.

The gate drivers 62 and 63 are electrically connected to the pixel array 61 through the gate lines GL(1) to GL(n), and the source driver IC 64 is electrically connected to the pixel array 61 through the source lines SL(1) to SL(m).

A group of pixels 10(i,1) to 10(i,n) arranged in the direction indicated by an arrow C1 are electrically connected to the source line SL(i), and a group of pixels 10(1,j) to 10(m,j) arranged in the direction indicated by an arrow R1 are electrically connected to the gate line GL(j).

The gate drivers 62 and 63 drive the gate line GL(j) to select the pixels 10(1,j) to 10(m,j). The source driver IC 64 supplies image data supplied from the application processor 80 as a data signal to the pixels 10(1,j) to 10(m,j) through the source lines SL(1) to SL(m). By repeating this operation from the gate line GL(1) to the gate line GL(n), the display unit 60 can display an image on the pixel array 61.

Various display elements such as a liquid crystal element, electronic paper, an organic electroluminescent (EL) element, and a quantum-dot light-emitting diode (QLED) can be used in the pixel 10.

<Gate Driver>

The gate drivers 62 and 63 included in the display unit 60 have a function of driving a plurality of regions into which the display region of the display unit 60 is divided. In other words, the gate drivers 62 and 63 have a function of driving a plurality of pixel groups into which the pixel array 61 is divided.

The gate drivers 62 and 63 each include a first circuit and a second circuit. The second circuit includes first to N-th shift registers (N is an integer of 2 or more). The K-th shift register (K is an integer more than or equal to 1 and less than or equal to N) outputs a signal to the gate line GL electrically connected to a K-th pixel group.

In the second circuit, it is possible that only the K-th shift register outputs a signal to the gate line GL. Furthermore, it is possible that the first to N-th shift registers operate as one shift register and a signal is output therefrom to the gate lines GL. In the case where only the K-th shift register outputs a signal to the gate line GL in the second circuit, the value K is determined in accordance with the signal output from the first circuit.

In this embodiment, for easy understanding, an example in which n is 1024, m is 768, and the pixels divided into 16 pixel groups in the direction indicated by the arrow C1 are separately driven in FIG. 4 is described. The 16 pixel groups each include an equal number of pixels 10, that is, 64×768 pixels 10.

Here, the first pixel group is electrically connected to the gate lines GL(1) to GL(64), the second pixel group is electrically connected to the gate lines GL(65) to GL(128), and the following pixel groups are electrically connected to the following gate lines GL in the same way. The sixteenth pixel group is electrically connected to the gate lines GL(961) to GL(1024).

FIG. 5 is a circuit diagram illustrating a structure example of a gate driver which can be applied to the gate drivers 62 and 63. The gate drivers 62 and 63 include fifteen shift registers 21, a shift register 22, and a shift register 23. Here, the fifteen shift registers 21 and the shift register 22 correspond to the second circuit, and the shift register 23 corresponds to the first circuit.

To the gate drivers 62 and 63, a start pulse G_SP, clock signals G_CLK[1:4], pulse width control signals G_PWC[1:4], a reset signal GINI_RES, a selection control signal G_SEL, a start pulse U_SP, and clock signals U_CLK[1:2] are input.

Furthermore, the gate drivers 62 and 63 output signals to the above-described gate lines GL(1) to GL(1024) to drive the gate lines GL. Note that the signals input to and output from the gate drivers 62 and 63 are digital signals and thus have either of two states, High or Low.

The start pulse U_SP, the clock signals U_CLK[1:2], and the reset signal G_INI_RES are input to the shift register 23. The shift register 23 outputs signals U[01] to U[16] to the shift registers 21 and 22.

To the shift registers 21 and 22, the start pulse G_SP, the clock signals G_CLK[1:4], the pulse width control signals GPWC[1:4], the reset signal GINI_RES, the selection control signal G_SEL, and the signals U[01] to U[16] are input. Each of the shift registers 21 and 22 is electrically connected to sixty-four gate lines GL to drive the gate lines GL.

Figure 13:
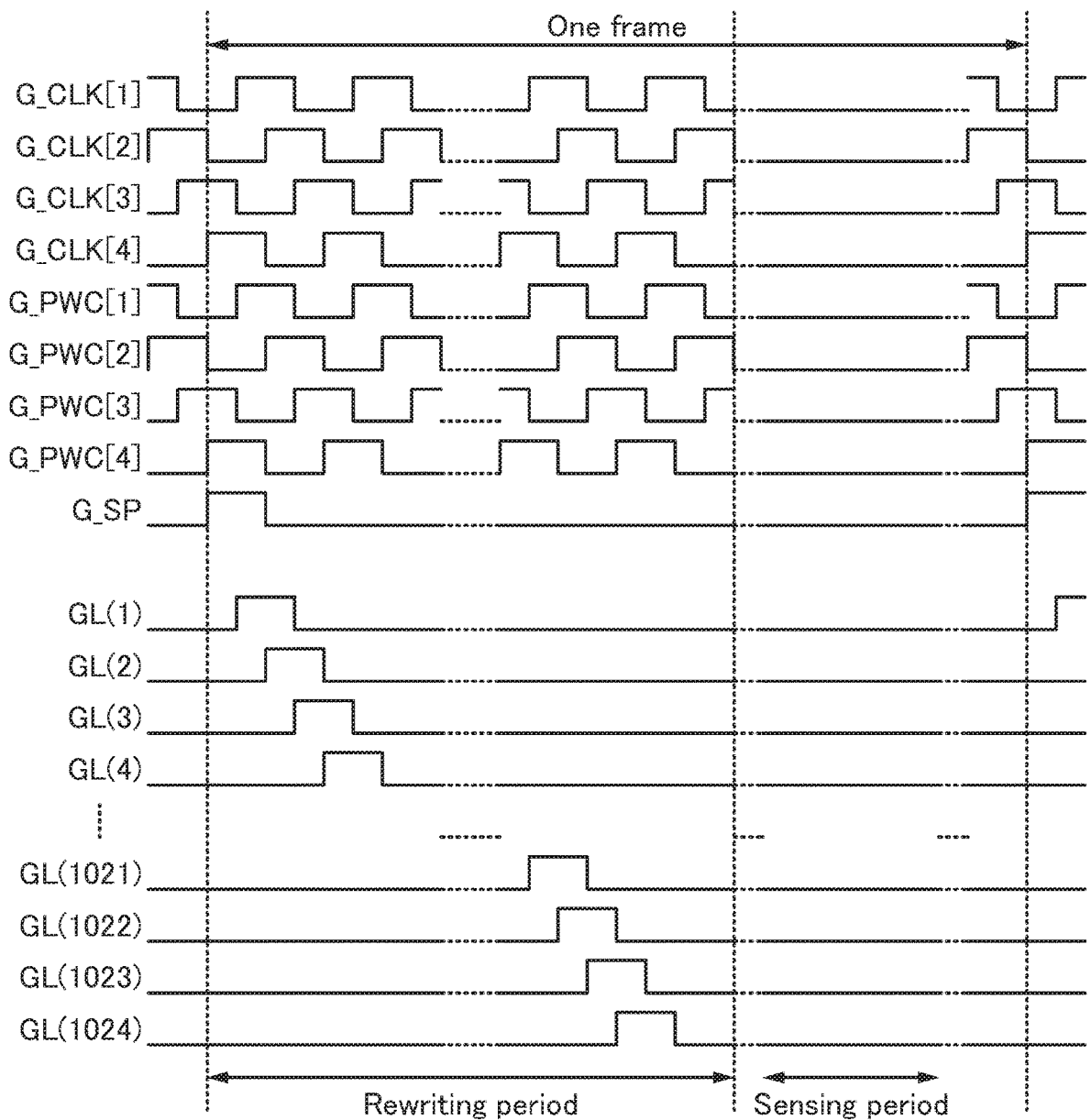
FIG. 13 is a timing chart for an operation of gate drivers.

The fifteen shift registers 21 and the shift register 22 can operate as one shift register, using the start pulse G_SP as a trigger. In other words, as illustrated in FIG. 13, which will be described later, the start pulse G_SP can trigger the output of signals to the gate lines GL(1) to GL(1024) so that the gate lines GL can be driven.

Furthermore, only any one of the fifteen shift registers 21 and the shift register 22 can output a signal to the gate line GL. In this case, the shift register to output a signal can be selected in accordance with the signals U[01] to U[16] output from the shift register 23.

FIGS. 6A and 6B, FIGS. 7A and 7B, and FIGS. 8A and 8B are circuit diagrams illustrating structure examples of the shift registers. FIGS. 6A and 6B, FIGS. 7A and 7B, and FIGS. 8A and 8B illustrate the structure examples of the shift register 21, the shift register 22, and the shift register 23, respectively.

Figure 6A:
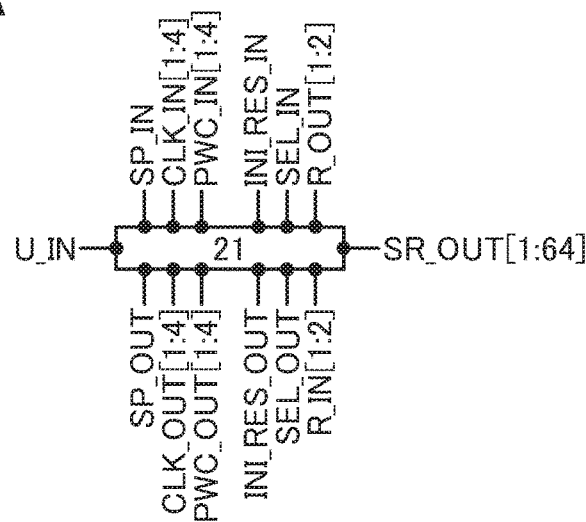
FIGS. 6A and 6B are circuit diagrams illustrating a structure example of a shift register.

FIG. 6A illustrates a symbol for the shift register 21, showing the input and output to/from the shift register 21. The shift register 21 includes input terminals U_IN, SP_IN, CLK_IN[1:4], PWC_IN[1:4], INI_RES_IN, SEL_IN, and R_IN[1:2] and output terminals SP_OUT, CLK_OUT[1:4], PWC_OUT[1:4], INI_RES_OUT, SEL_OUT, R_OUT[1:2], and SR_OUT[1:64]. From SR_OUT[1:64], signals are output to sixty-four gate lines GL.

Figure 6B:
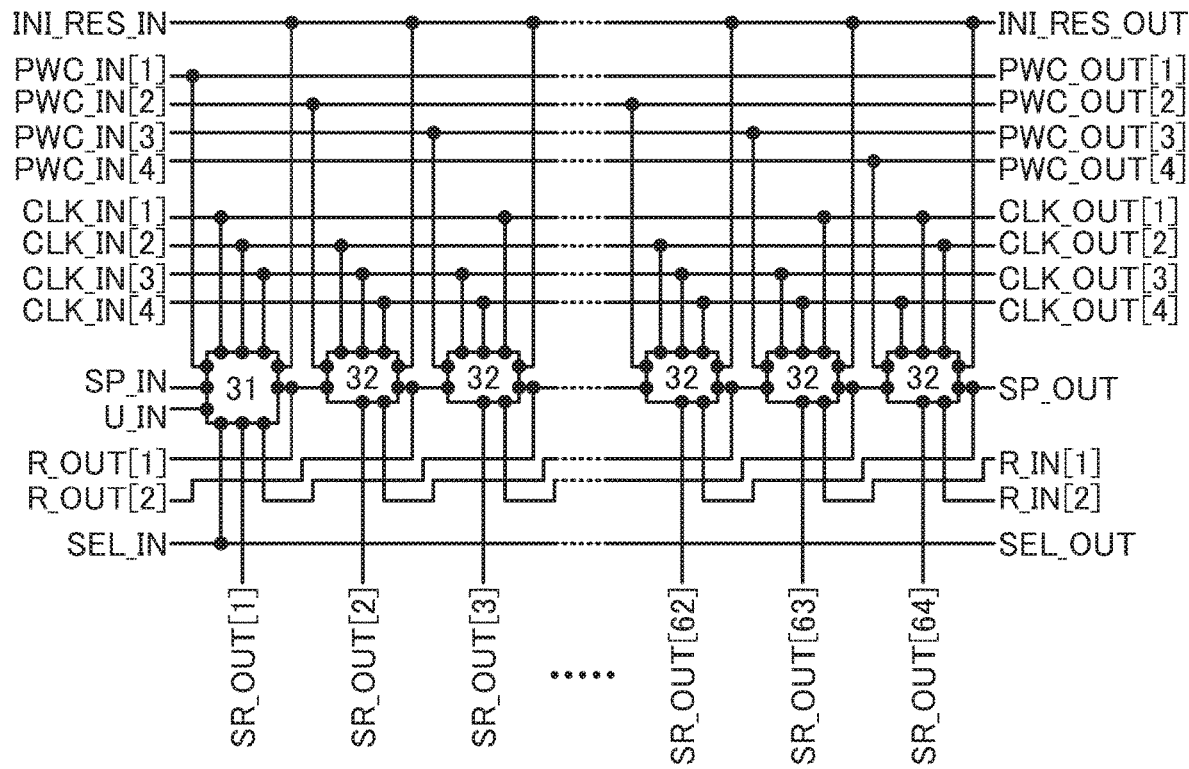

FIG. 6B is a circuit diagram corresponding to the symbol for the shift register 21. The shift register 21 includes a register 31 and sixty-three registers 32. The register 31 and sixty-three registers 32 are each electrically connected to any three of CLK_IN[1] to CLK_IN[4], any one of PWC_IN[1] to PWC_IN[4], and INI_RES_IN, through which signals are input. Furthermore, SR_OUT[1] is electrically connected to the register 31, and each of SR_OUT[2] to SR_OUT[64] is electrically connected to one of the sixty-three registers 32 in order. The register 31 is electrically connected to U_IN, SP_IN, and SEL_IN, through which signals are input.

Figure 7A:
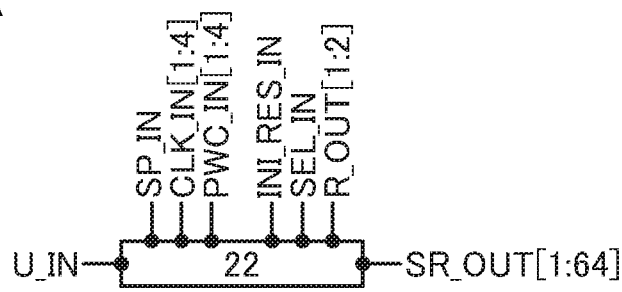
FIGS. 7A and 7B are circuit diagrams illustrating a structure example of a shift register.

FIG. 7A illustrates a symbol for the shift register 22, showing the input and output to/from the shift register 22. The shift register 22 includes input terminals U_IN, SP_IN, CLK_IN[1:4], PWC_IN[1:4], INI_RES_IN, and SEL_IN and output terminals R_OUT[1:2] and SR_OUT[1:64].

Figure 7B:
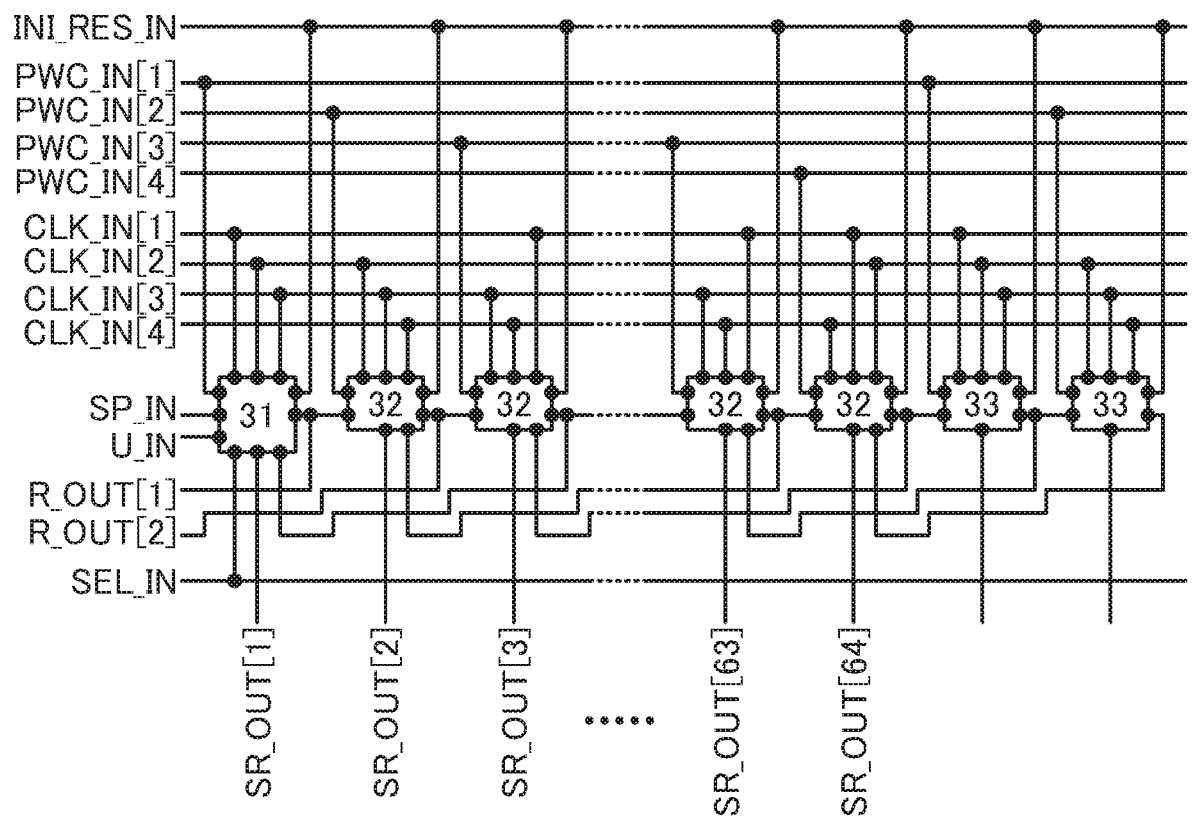

FIG. 7B is a circuit diagram corresponding to the symbol for the shift register 22. The shift register 22 includes a register 31, sixty-three registers 32, and two registers 33. The registers 31, 32, and 33 are each electrically connected to any three of CLK_IN[1] to CLK_IN[4], any one of PWC_IN[1] to PWC_IN[4], and INI_RES_IN, through which signals are input. Furthermore, SR_OUT[1] is electrically connected to the register 31, and each of SR_OUT[2] to SR_OUT[64] is electrically connected to one of the sixty-three registers 32 in order. The register 31 is electrically connected to U_IN, SP_IN, and SEL_IN, through which signals are input.

Figure 8A:
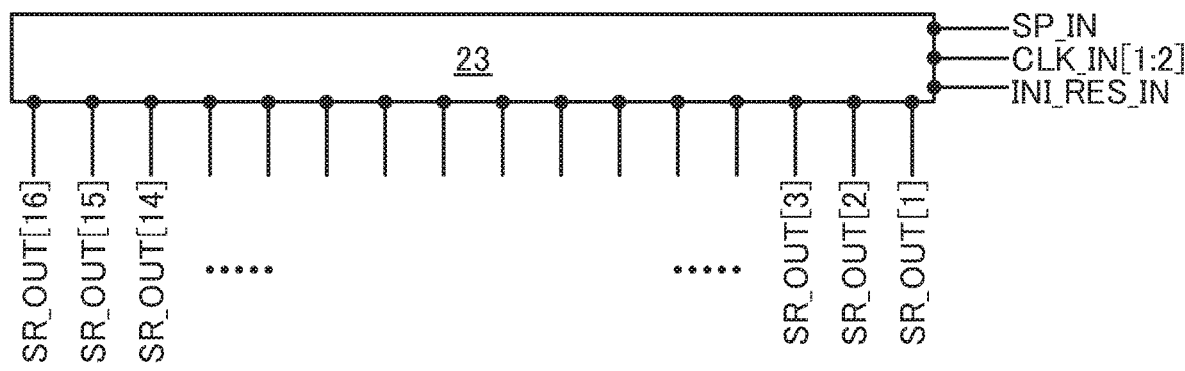
FIGS. 8A and 8B are circuit diagrams illustrating a structure example of a shift register.

FIG. 8A illustrates a symbol for the shift register 23, showing the input and output to/from the shift register 23. The shift register 23 includes input terminals SP_IN, CLK_IN[1:2], and INI_RES_IN and output terminals SR_OUT[1] to SROUT[16].

Figure 8B:
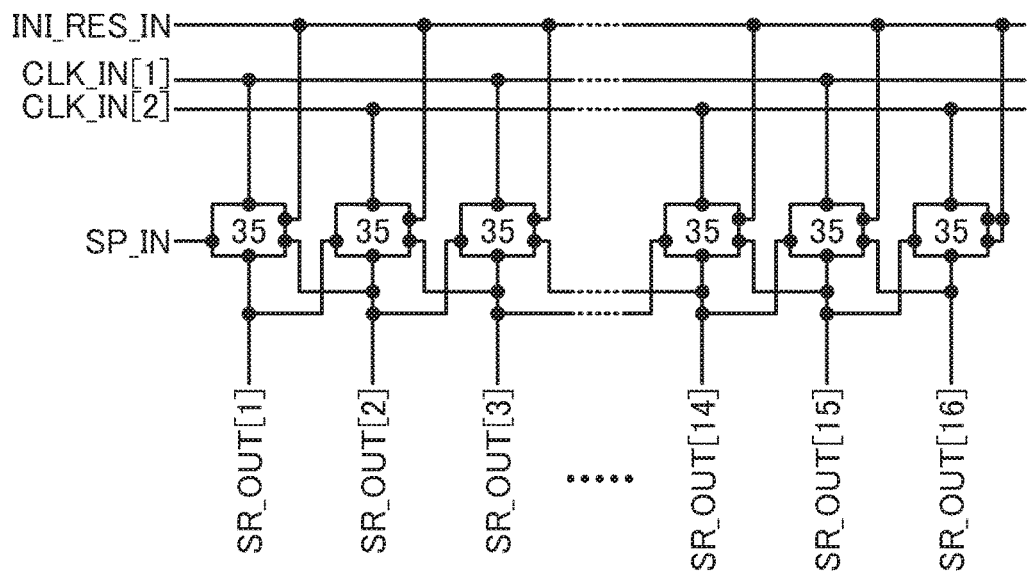

FIG. 8B is a circuit diagram corresponding to the symbol for the shift register 23. The shift register 23 includes sixteen registers 35. The registers 35 are each electrically connected to CLK_IN[1] or CLK_IN[2] and INI_RES_IN, through which signals are input. The registers 35 are each electrically connected to any of SR_OUT[1] to SR_OUT[16], through which signals are input.

FIGS. 9A and 9B, FIGS. 10A and 10B, FIGS. 11A and 11B, and FIGS. 12A and 12B are circuit diagrams illustrating structure examples of the registers. FIGS. 9A and 9B, FIGS. 10A and 10B, FIGS. 11A and 11B, and FIGS. 12A and 12B illustrate the structure examples of the register 31, the register 32, the register 33, and the register 35, respectively.

Figure 9A:
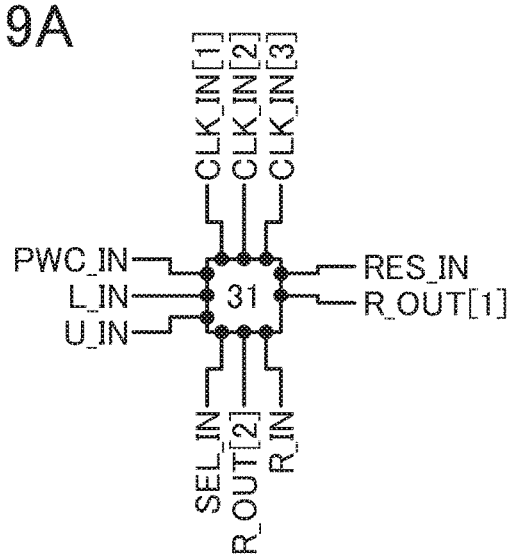
FIGS. 9A and 9B are circuit diagrams illustrating a structure example of a register.

FIG. 9A illustrates a symbol for the register 31, showing the input and output to/from the register 31. The register 31 includes input terminals U_IN, L_IN, CLK_IN[1] to CLK_IN[3], PWC_IN, RES_IN, SEL_IN, and R_IN and output terminals R_OUT[1] and R_OUT[2]. Here, a start pulse is input to L_IN, an output from the register which is in two stages after the register 31 is input to R_IN, and any of the signals U[01] to U[16] output from the shift register 23 is input to U_IN (see FIG. 5, FIGS. 6A and 6B, and FIGS. 7A and 7B).

Figure 9B:
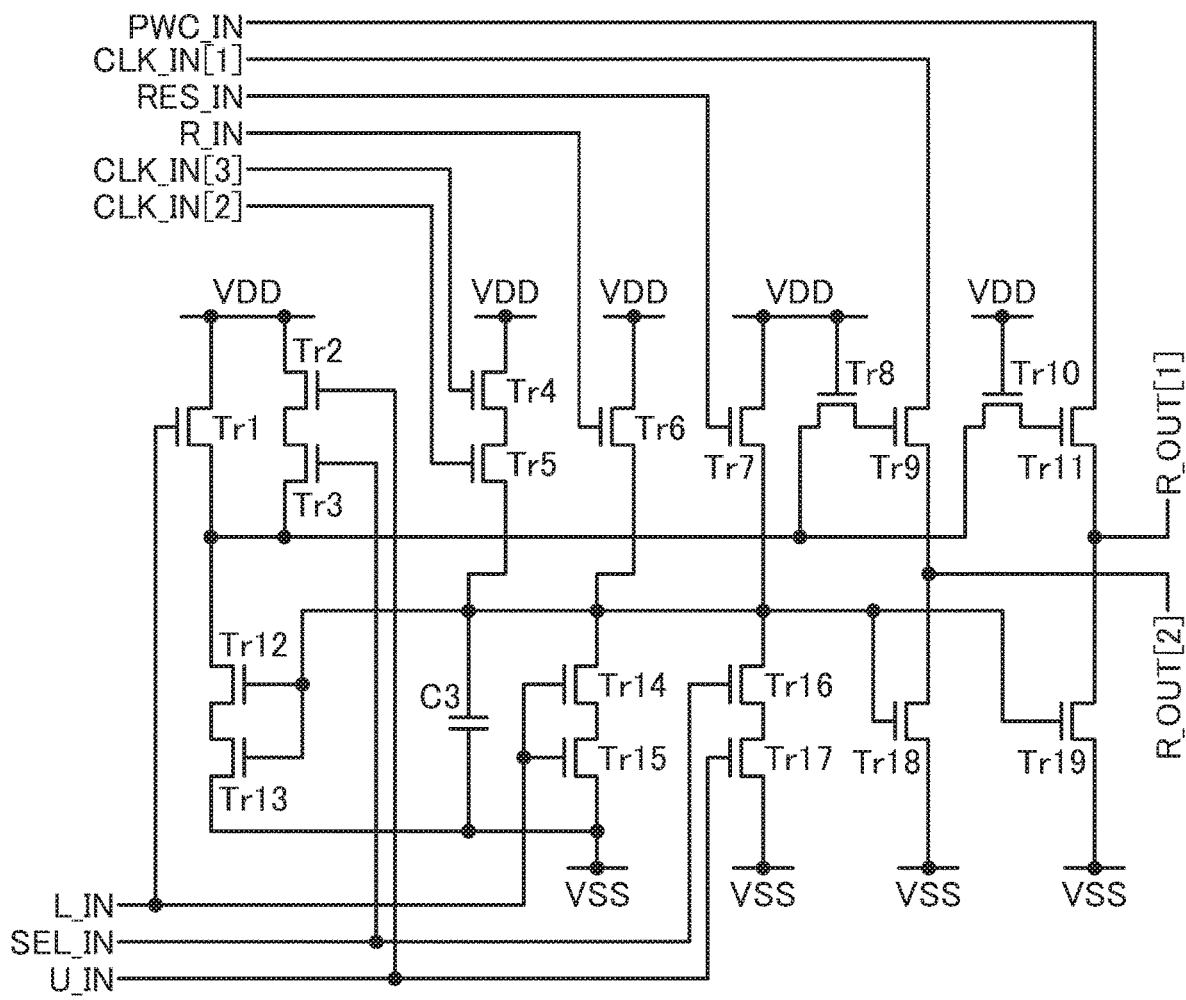

FIG. 9B is a circuit diagram corresponding to the symbol for the register 31. The register 31 includes transistors Tr1 to Tr19 and a capacitor C3. Note that VDD is a high power supply potential, and VSS is a lower power supply potential.

Figure 10A:
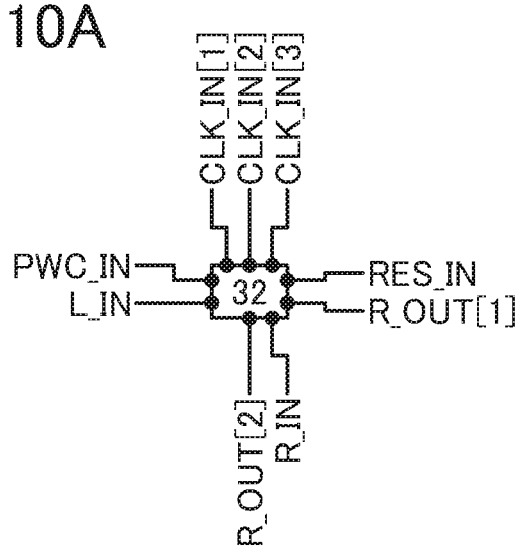
FIGS. 10A and 10B are circuit diagrams illustrating a structure example of a register.

FIG. 10A illustrates a symbol for the register 32, showing the input and output to/from the register 32. The register 32 includes input terminals L_IN, CLK_IN[1] to CLK_IN[3], PWC_IN, RES_IN, and R_IN and output terminals R_OUT[1] and R_OUT[2]. Here, an output from the register in a previous stage is input to L_IN, and an output from the register which is in two stages after the register 32 is input to R_IN (see FIGS. 6A and 6B and FIGS. 7A and 7B).

Figure 10B:
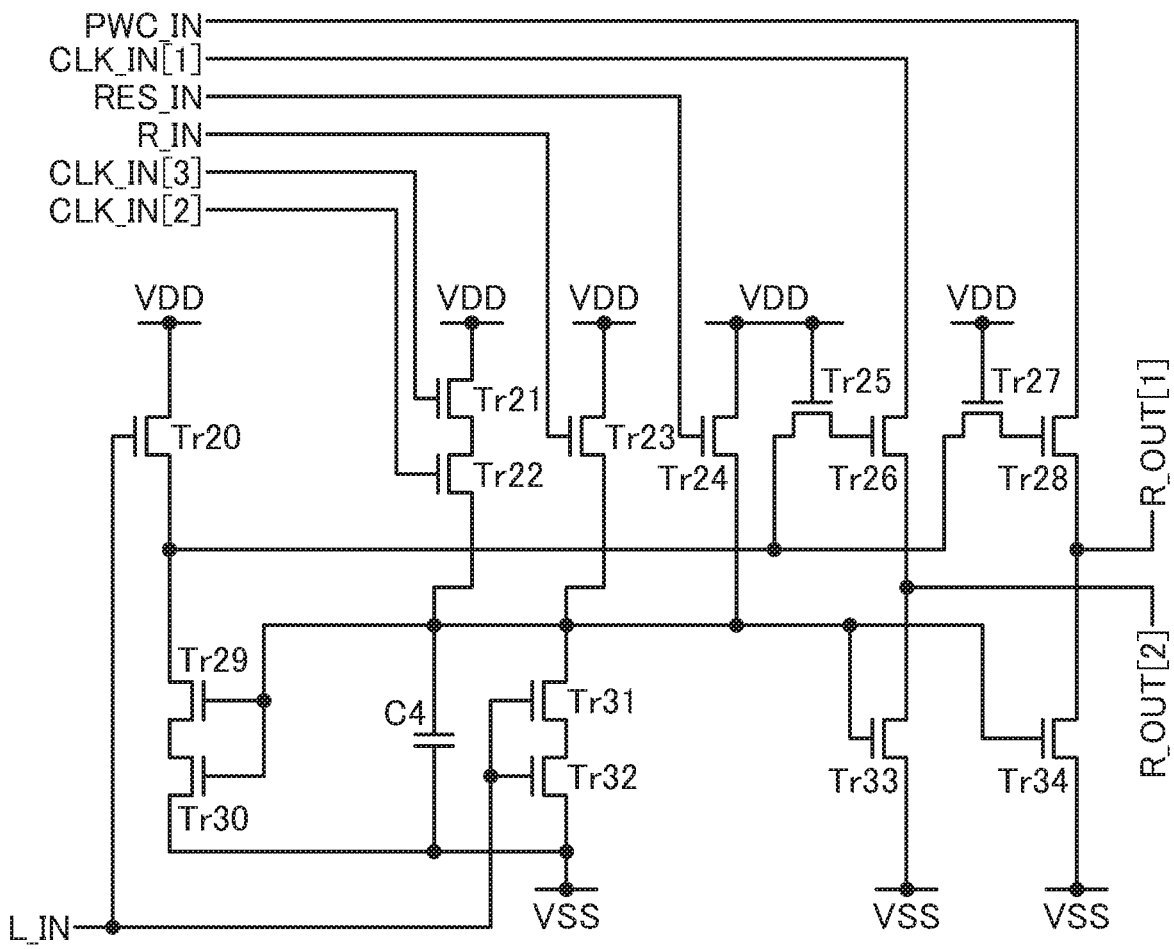

FIG. 10B is a circuit diagram corresponding to the symbol for the register 32. The register 32 includes transistors Tr20 to Tr34 and a capacitor C4. Note that VDD is a high power supply potential, and VSS is a lower power supply potential.

Figure 11A:
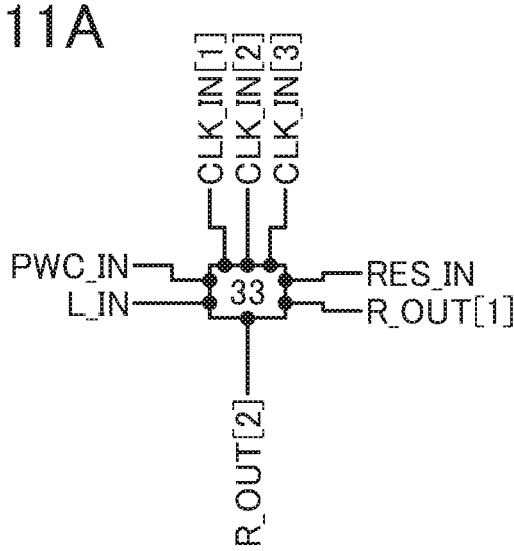
FIGS. 11A and 11B are circuit diagrams illustrating a structure example of a register.

FIG. 11A illustrates a symbol for the register 33, showing the input and output to/from the register 33. The register 33 includes input terminals L_IN, CLK_IN[1] to CLK_IN[3], PWC_IN, and RES_IN and output terminals R_OUT[1] and R_OUT[2]. An output from the register in a previous stage is input to L_IN. Because the register 33 is used in the last two stages in the shift register 22, the register 33 does not include the input terminal R_IN (see FIGS. 7A and 7B).

Figure 11B:
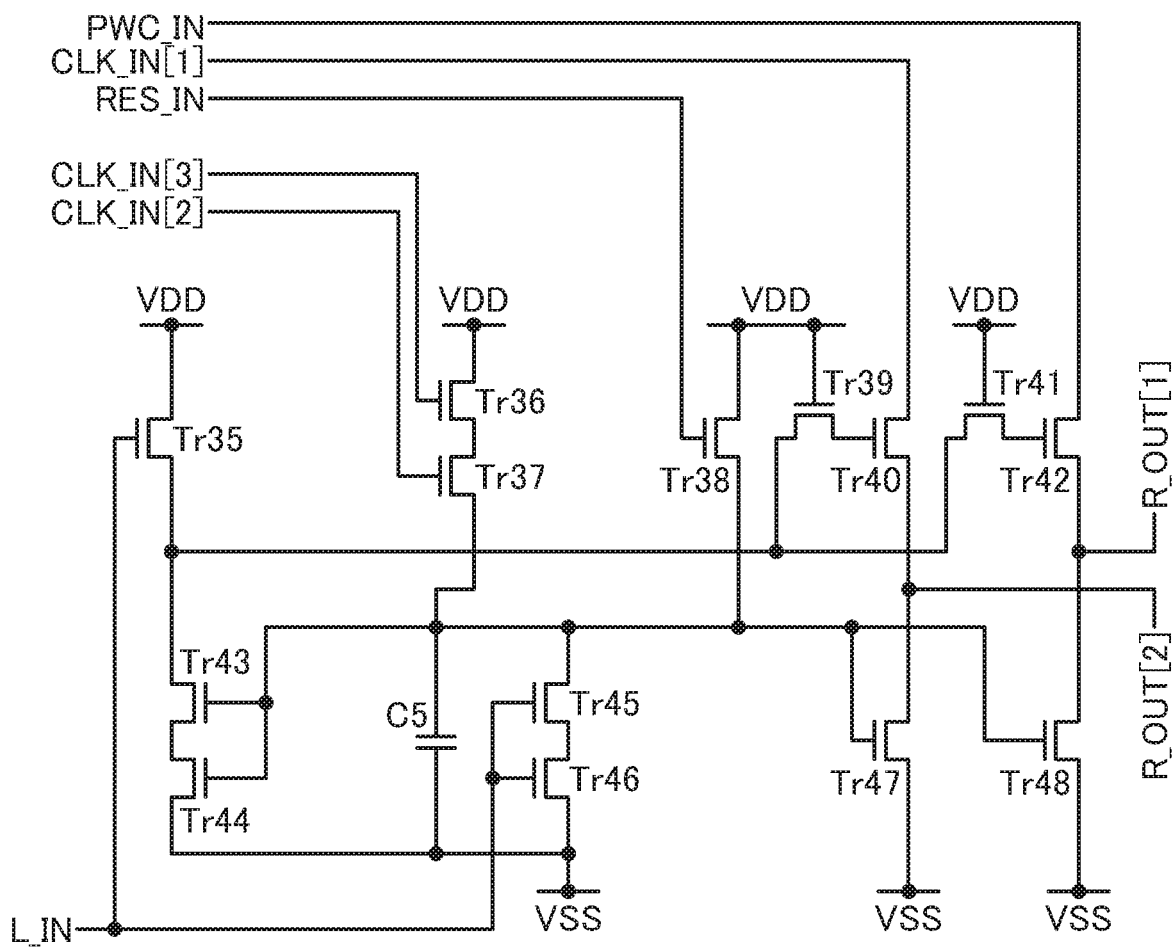

FIG. 11B is a circuit diagram corresponding to the symbol for the register 33. The register 33 includes transistors Tr35 to Tr48 and a capacitor C5. Note that VDD is a high power supply potential, and VSS is a lower power supply potential.

Figure 12A:
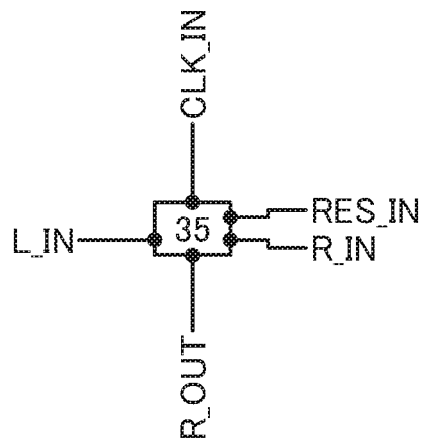
FIGS. 12A and 12B are circuit diagrams illustrating a structure example of a register.

FIG. 12A illustrates a symbol for the register 35, showing the input and output to/from the register 35. The register 35 includes input terminals L_IN, CLK_IN, RES_IN, and R_IN and output terminals R_OUT. Here, an output from the register in a previous stage or a start pulse is input to L_IN, and an output from the register in the next stage is input to R_IN (see FIGS. 8A and 8B).

Figure 12B:
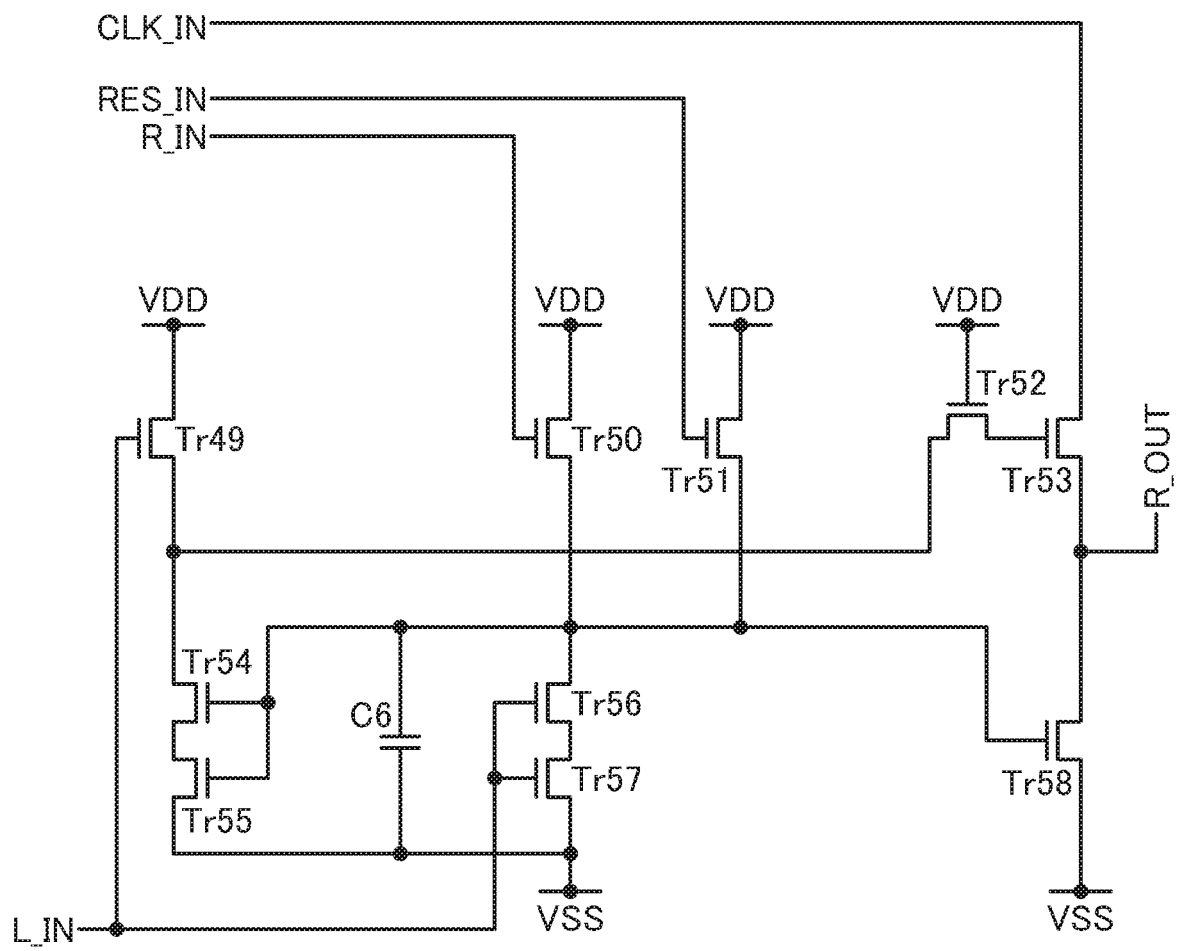

FIG. 12B is a circuit diagram corresponding to the symbol for the register 35. The register 35 includes transistors Tr49 to Tr58 and a capacitor C6. Note that VDD is a high power supply potential, and VSS is a lower power supply potential.

The transistors Tr1 to Tr58 are preferably OS transistors. Although the transistors Tr1 to Tr58 are illustrated as single-gate transistors in FIGS. 9A and 9B, FIGS. 10A and 10B, FIGS. 11A and 11B, and FIGS. 12A and 12B, they may be dual-gate transistors with backgates. When the transistors Tr1 to Tr58 are OS transistors, the off-state currents of the transistors are low, leading to a reduction in power consumption of the gate drivers.

<Timing Chart>

FIG. 13, FIG. 14, FIG. 15, and FIG. 16 are timing charts for the operation of the gate drivers 62 and 63.

The display unit 60 operates in any of three modes in terms of rewriting of the display image. The first operation mode is for rewriting an image in the entire display region (referred to as "normal driving" below), the second operation mode is for rewriting an image in part of the display region (referred to as "partial IDS driving" below), and the third operation mode is for not rewriting an image in the display region at all (referred to as "IDS driving" below). The three operation modes are described in detail below.

FIG. 13 is a timing chart for normal driving, showing a relationship between the start pulse G_SP, clock signals G_CLK[1] to G_CLK[4], and pulse width control signals G_PWC[1] to G_PWC[4] which are input to the gate drivers 62 and 63 and the gate lines GL(1) to GL(1024) to which the gate drivers 62 and 63 output signals.

In FIG. 13, the start pulse G_SP serves as a trigger, and the gate drivers 62 and 63 sequentially output signals to the gate lines GL(1) to GL(1024) in accordance with the clock signals G_CLK[1] to G_CLK[4]. Because the signals are sequentially output to the gate lines GL(1) to GL(1024) by the gate drivers 62 and 63, an image in the entire display region can be rewritten in the display unit 60 (indicated by "rewriting period" in FIG. 13).

Note that the gate drivers 62 and 63 stop the operation when driving of the gate lines GL(1) to GL(1024) is finished. The period when the gate drivers 62 and 63 are in a non-operating state causes little noise and can be suitably used as a period when the touch sensor unit 70 senses a touch. By performing the touch sensing operation in this period, the touch sensor unit 70 can achieve the sensing operation with high precision (indicated by "sensing period" in FIG. 13).

Thus, one frame of normal driving includes the operation of rewriting an image in the entire display region of the display unit 60 by the gate drivers 62 and 63 and the operation of sensing a touch by the touch sensor unit 70. By repetition of these operations, the display device 100 can perform the highly accurate sensing operation while displaying a moving image or the like.

Figure 14:
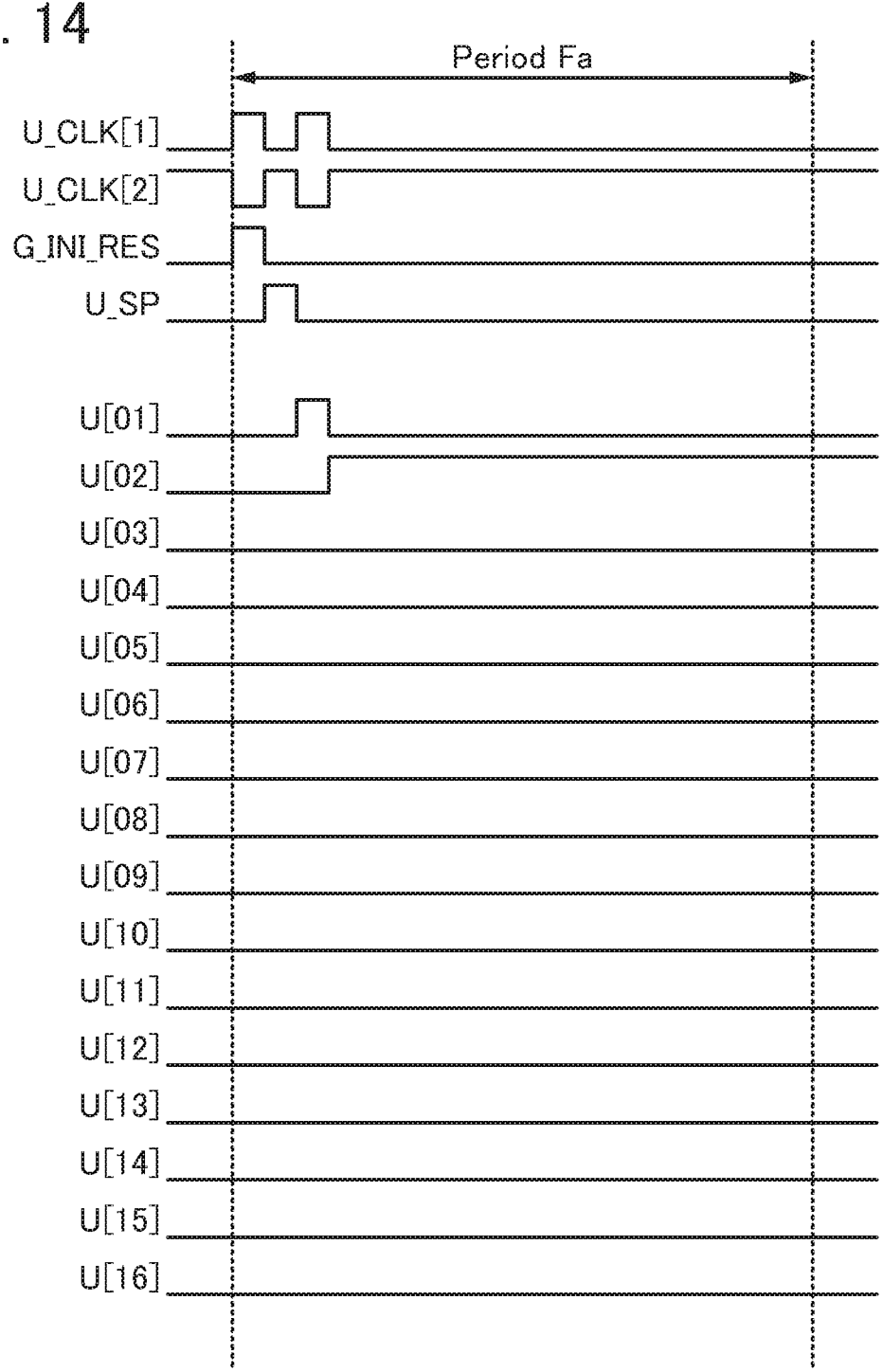
FIG. 14 is a timing chart for an operation of gate drivers.
Figure 15:
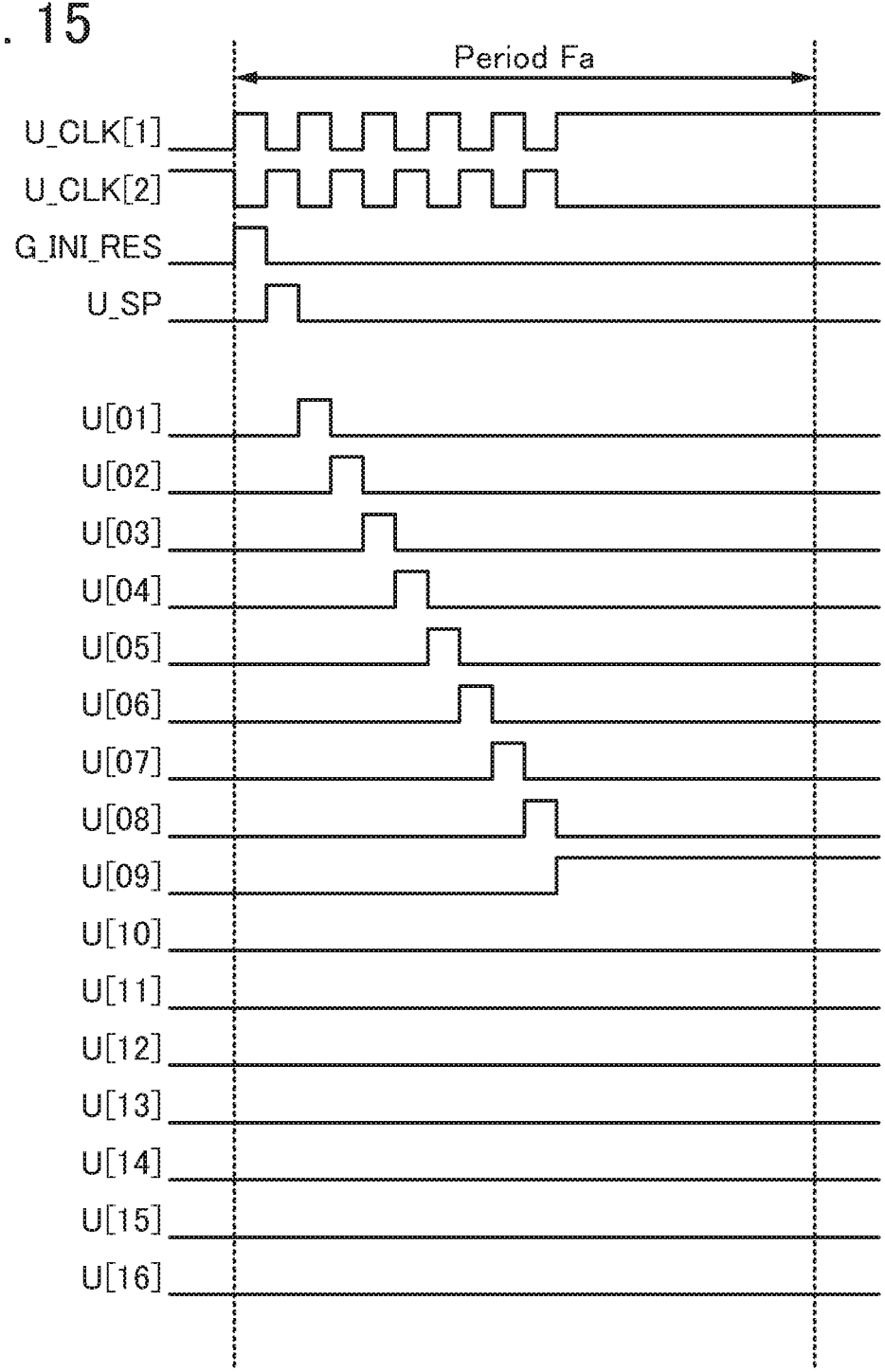
FIG. 15 is a timing chart for an operation of gate drivers.
Figure 16:
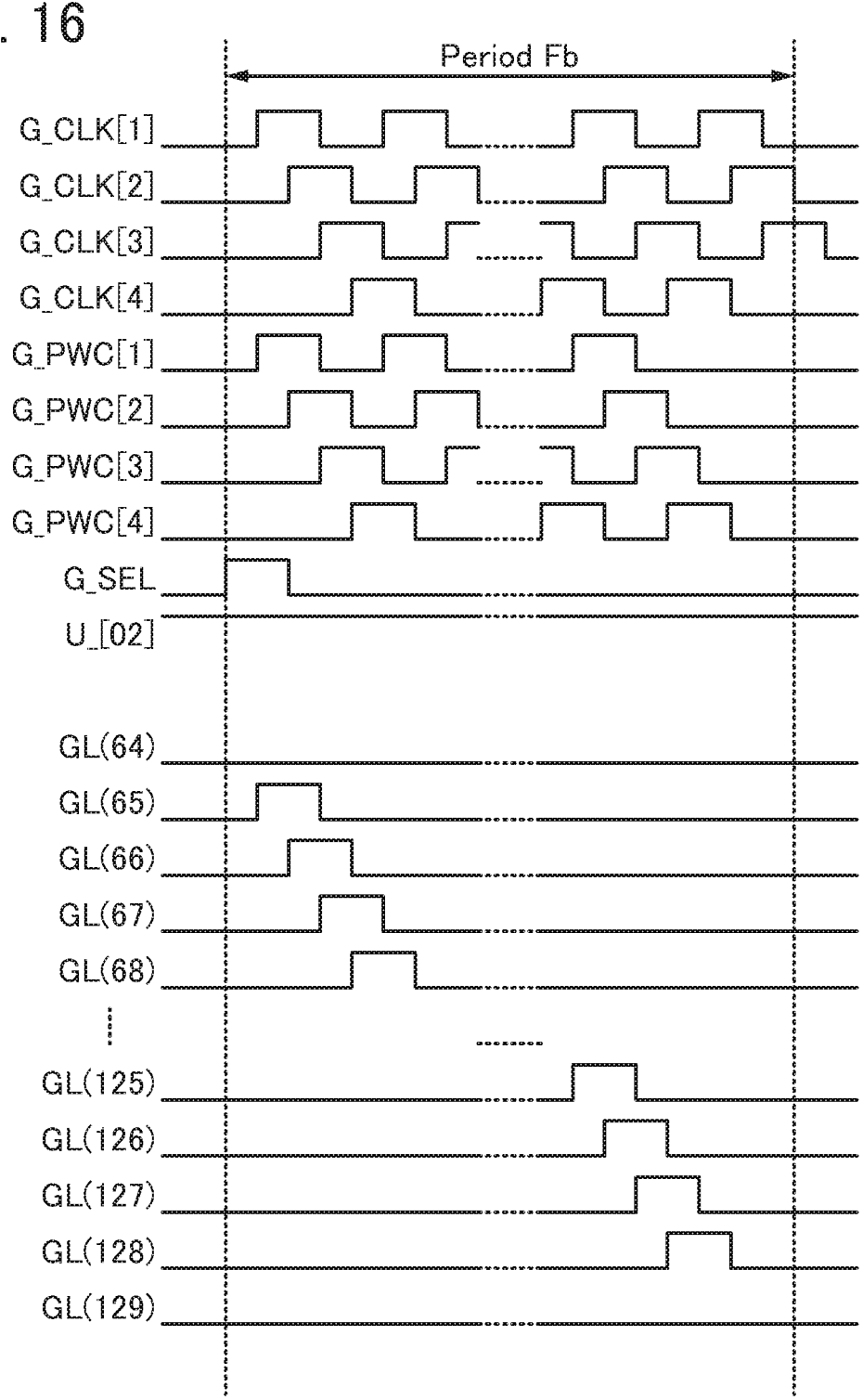
FIG. 16 is a timing chart for an operation of gate drivers.

FIG. 14, FIG. 15, and FIG. 16 are the timing charts for partial IDS driving. In partial IDS driving, only any one of the fifteen shift registers 21 and the shift register 22 can output a signal to the gate line GL. In this case, the shift register to output a signal can be selected in accordance with the signals U[01] to U[16] output from the shift register 23.

FIG. 14 and FIG. 15 each show a relationship between the signals U[01] to U[16] output from the shift register 23 and the start pulse U_SP, clock signals U_CLK[1] and U_CLK[2], and the reset signal GINI_RES. Furthermore, FIG. 14 is a timing chart for the case of rewriting an image on the second pixel group, which is a part of the display region (electrically connected to the gate lines GL(65) to GL(128)). FIG. 15 is a timing chart for the case of rewriting an image on the ninth pixel group (electrically connected to the gate lines GL(513) to GL(576)).

In FIG. 14, the start pulse U_SP triggers the shift register 23 to operate in accordance with the clock signals U_CLK[1] and U_CLK[2]. On the output of a High signal as the signal U[02], the input of the clock signals U_CLK[1] and U_CLK[2] stops. By the stop of the input of the clock signals U_CLK[1] and U_CLK[2], the shift register 23 keeps the High state of the signal U[02].

In FIG. 15, the start pulse U_SP triggers the shift register 23 to sequentially output the signals U[01] to U[08] in accordance with the clock signals U_CLK[1] and U_CLK[2]. On the output of a High signal as the signal U[09], the input of the clock signals U_CLK[1] and U_CLK[2] stops. By the stop of the input of the clock signals U_CLK[1] and U_CLK[2], the shift register 23 keeps the High state of the signal U[09].

FIG. 16 shows the case of rewriting an image on the second pixel group, showing a relationship between the gate lines GL(64) to GL(129) and the signal U[02], the selection control signal G_SEL, the clock signals G_CLK[1] to G_CLK[4], and the pulse width control signals G_PWC[1] to G_PWC[4].

The signal U[02] keeps the High state owing to the operation of the shift register 23 in FIG. 14. The input of the selection control signal G_SEL can create the same state as inputting a start pulse to any one of the shift registers 21 and 22 to which the signal U[02] is input. In other words, the shift register 21 electrically connected to the gate lines GL(65) to GL(128) start the operation.

Using the selection control signal G_SEL as a trigger, the shift register 21 electrically connected to the gate lines GL(65) to GL(128) sequentially output signals to the gate lines GL(65) to GL(128) in accordance with the clock signals G_CLK[1] to G_CLK[4]. By the sequential signal output to the gate lines GL(65) to GL(128), the display unit 60 can rewrite an image on the second pixel group.

Because an output from the register which is in two stages after the register 32 is input to the input terminal R_IN of the register 32 in the shift register 21, it is necessary in FIG. 16 to input the clock signals G_CLK[1] to G_CLK[4] for operating the first two registers included in the shift register 21 electrically connected to the gate lines GL(129) to GL(192). By the input of the clock signals G_CLK[1] to G_CLK[4], the shift register 21 electrically connected to the gate lines GL(129) to GL(192) also partly operate. However, because the pulse width control signals G_PWC[1] to G_PWC[4] are kept at a Low state, signals are not output to the gate lines GL(129) to GL(192).

The description of the case of rewriting an image on the ninth pixel group is omitted because the shift register 21 operates in a similar manner. The period in which the shift register 23 operates as shown in FIG. 14 and FIG. 15 is referred to as "period Fa", and the period in which the shift registers 21 and 22 operate as shown in FIG. 16 is referred to as "period Fb." Part of the region is selected in the period Fa and an image in the selected region is rewritten in the period Fb; thus, an image in part of the display region can be rewritten. Since the number of registers 35 included in the shift register 23 is sixteen, which is smaller than the number of registers included in the shift registers 21 and 22, the period Fa is shorter than the period Fb and the layout area of the shift register 23 can be smaller than those of the shift registers 21 and 22.

<<Operation Mode>>

Next, a relationship between the aforementioned three operation modes of the display unit 60 and the touch sensing operation of the touch sensor unit 70 (sensing operation) is described with reference to FIGS. 17A to 17C and FIGS. 18A to 18C.

Figure 17A:
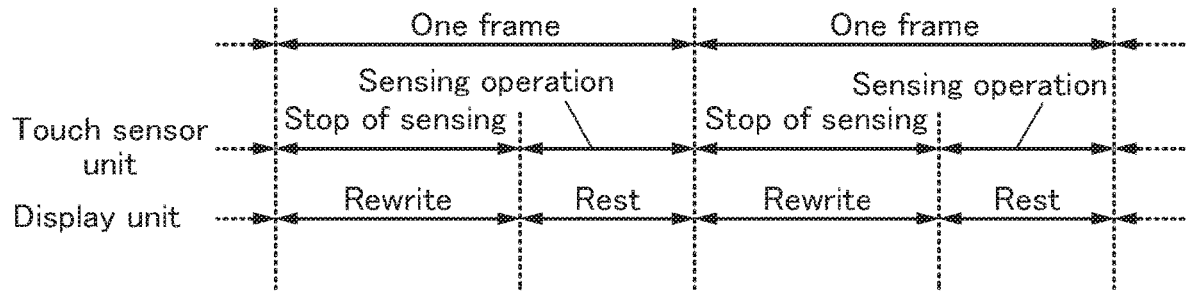
FIGS. 17A to 17C each show an operational relationship between a display unit and a touch sensor unit.
Figure 17B:
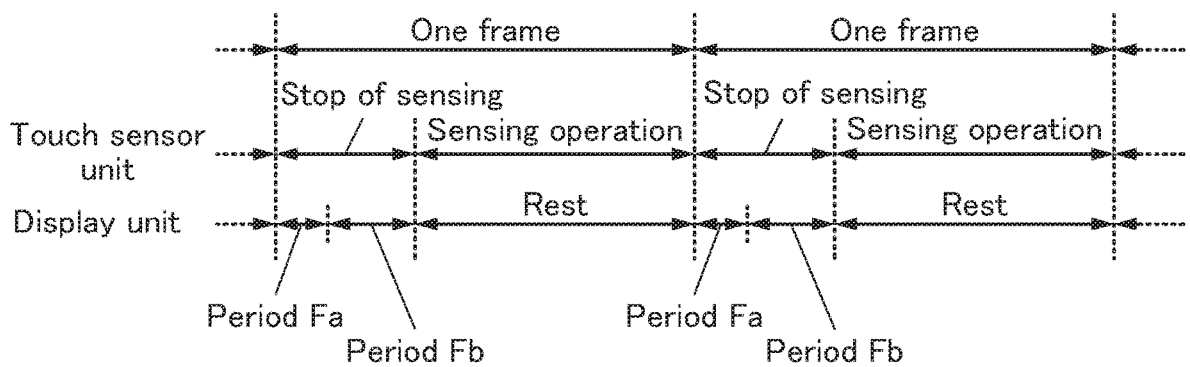
Figure 17C:
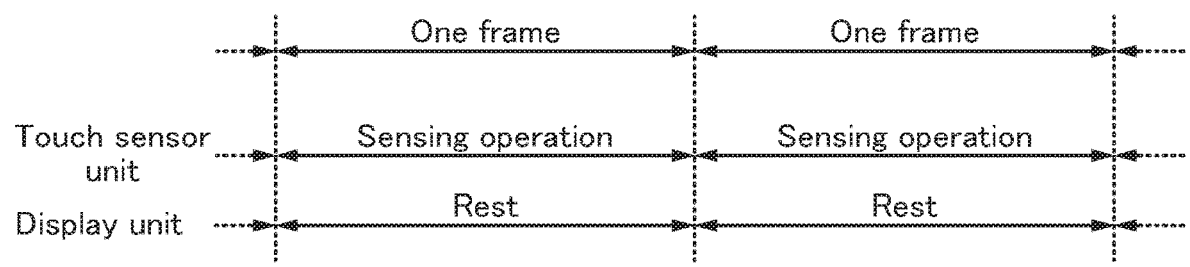
Figure 18A:
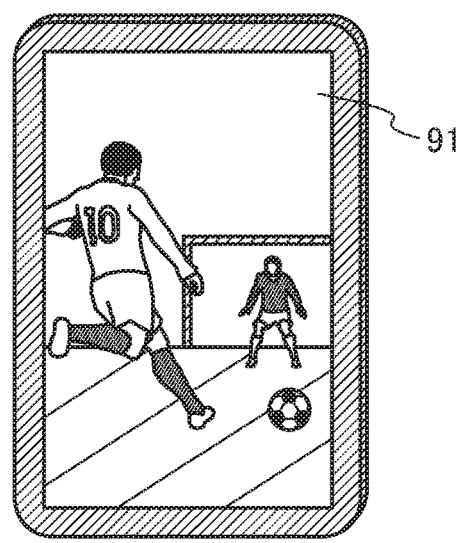
FIGS. 18A to 18C are external views each illustrating an embodiment and a usage example of a tablet information terminal
Figure 18B:
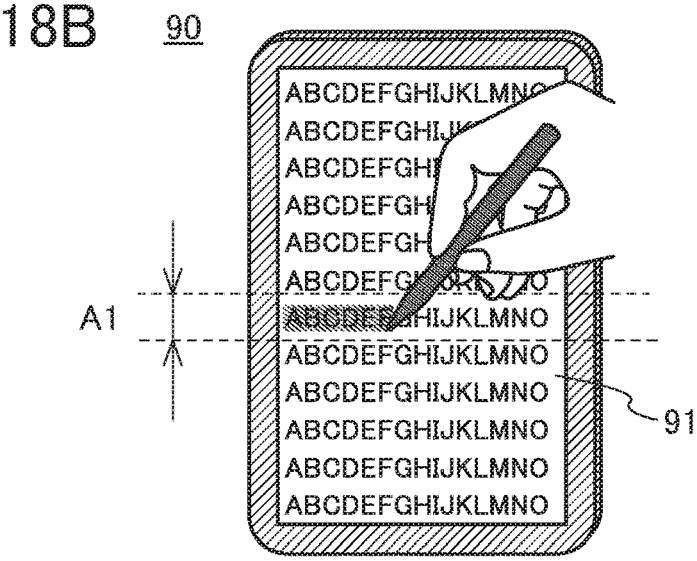
Figure 18C:
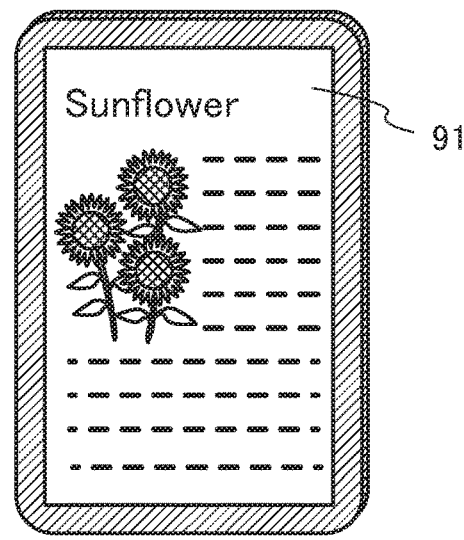

FIGS. 17A to 17C each illustrate an operational relationship between a display unit and a touch sensor unit, and FIGS. 18A to 18C illustrate examples of using the display device 100 in a tablet information terminal 90. The tablet information terminal 90 includes a display region 91 which also serves as an input region. The display device 100 of one embodiment of the present invention is used in the display region 91.

<Normal Driving>

FIG. 17A and FIG. 18A illustrate an example of the normal driving. Normal driving is performed when an image in an entire display region needs to be rewritten, for example, when a moving image is displayed in the entire display region. FIG. 18A illustrates an example of displaying a moving image in which the tablet information terminal 90 shows a soccer match.

In FIG. 17A, the touch sensor unit 70 stops the sensing operation while the display unit 60 rewrites the display image. This is because noise caused by driving of the gate lines GL(1) to GL(1024), noise caused by supply of data signals to the source lines SL(1) to SL(768), noise caused by the operation of the gate drivers 62 and 63, and the like in the period are unsuitable for the sensing operation of the touch sensor unit 70.

After the completion of the display image rewriting by the display unit 60, the operation of the display unit 60 is stopped, and then the sensing operation by the touch sensor unit 70 starts. The above-described noise is caused little during a period in which the operation of the display unit 60 is stopped; thus, the touch sensor unit 70 can perform a high-accuracy sensing operation. As described above, the display image rewriting operation of the display unit 60 and the sensing operation of the touch sensor unit 70 are performed in one frame, and these operations are repeated, so that a high-accuracy sensing operation can be performed while a moving image or the like is displayed.

Note that in FIG. 17A, although the period in which the display unit 60 rewrites the display image (when the touch sensor unit 70 stops the sensing operation) and the period in which the display unit 60 stops the operation (when the touch sensor unit 70 performs the sensing operation) are illustrated, another period may be included in FIG. 17A. For example, a period in which the source driver IC 64 changes the operation state (standby/active), a synchronization period for the input and output of signals, or the like may be included.

<Partial IDS Driving>

FIG. 17B and FIG. 18B illustrate an example of the partial IDS driving. The partial IDS driving is performed when an image in part of the display region needs to be rewritten, such as when a moving image is displayed in part of the display region.

FIG. 18B illustrates an example in which the user of the tablet information terminal 90 highlights particular letters using a stylus as a marker. In this case, only a display image in a region A1 in the drawing needs to be rewritten. The gate drivers 62 and 63 drive only the gate lines GL in the pixel group including the region A1.

The operational relationship between the display unit and the touch sensor unit in this case is as in FIG. 17B, i.e., the display unit 60 rewrites only a region whose image needs to be rewritten. In FIG. 17B, a region whose image needs to be rewritten is selected in the period Fa, and the display image in the selected region is rewritten in the period Fb. Here, one frame may include one period Fa and one period Fb, or two or more periods Fa and two or more periods Fb.

When the display unit 60 rewrites only an image of a region that needs to be rewritten, the time for touch sensing by the touch sensor unit 70 can be lengthened. Accordingly, the sensing operation can be performed more than once in one frame. For example, in the case where the sensing operation is performed once in one frame in normal driving, the sensing operation can be performed twice in one frame in partial IDS driving. In this manner, the partial IDS driving enables a smooth sensing operation and thus is suitable for handwriting input, for example. In addition, the number of times of the display image rewriting can be reduced, leading to a reduction in power consumption of the display unit 60.

<Ids Driving>

FIG. 17C and FIG. 18C illustrate an example of the IDS driving. The IDS driving is performed when an image in none of the display region needs to be rewritten, such as when a still image is displayed in the entire display region. FIG. 18C illustrates an example of displaying an illustration of a flower and its caption (indicated by dotted lines in the drawing) as a still image. The operational relationship between the display unit and the touch sensor unit in this case is as in FIG. 17C, i.e., the rewriting operation of the display unit 60 is stopped and thus the touch sensor unit 70 can perform the sensing operation.

In the IDS driving and the partial IDS driving, a displayed image on a region where a still image is displayed does not need to be rewritten; however, in practice, the time during which the pixel 10 including a transistor having a low off-state current can hold charges, inversion driving occurring when a display element of the pixel 10 is a liquid crystal element, or the like should be taken into consideration.

As described above, the IDS driving enables a smooth sensing operation as in the partial IDS driving. In addition, the power consumption of the display unit 60 can be reduced; thus, the IDS driving is suitable for a portable information terminal.

Whether there is a region whose image needs to be rewritten is determined by calculating a change between image data displayed on the display unit 60 by the application processor 80 at present and image data displayed next. In the case where no change is found from the image data, IDS driving is employed. In the case where a change is found in part of the image data, partial IDS driving is employed. In the partial IDS driving, the application processor 80 selects the region driven by the gate drivers 62 and 63 and calculates necessary signals for the gate drivers 62 and 63.

<<Variation of Gate Drivers>>

Figure 19:
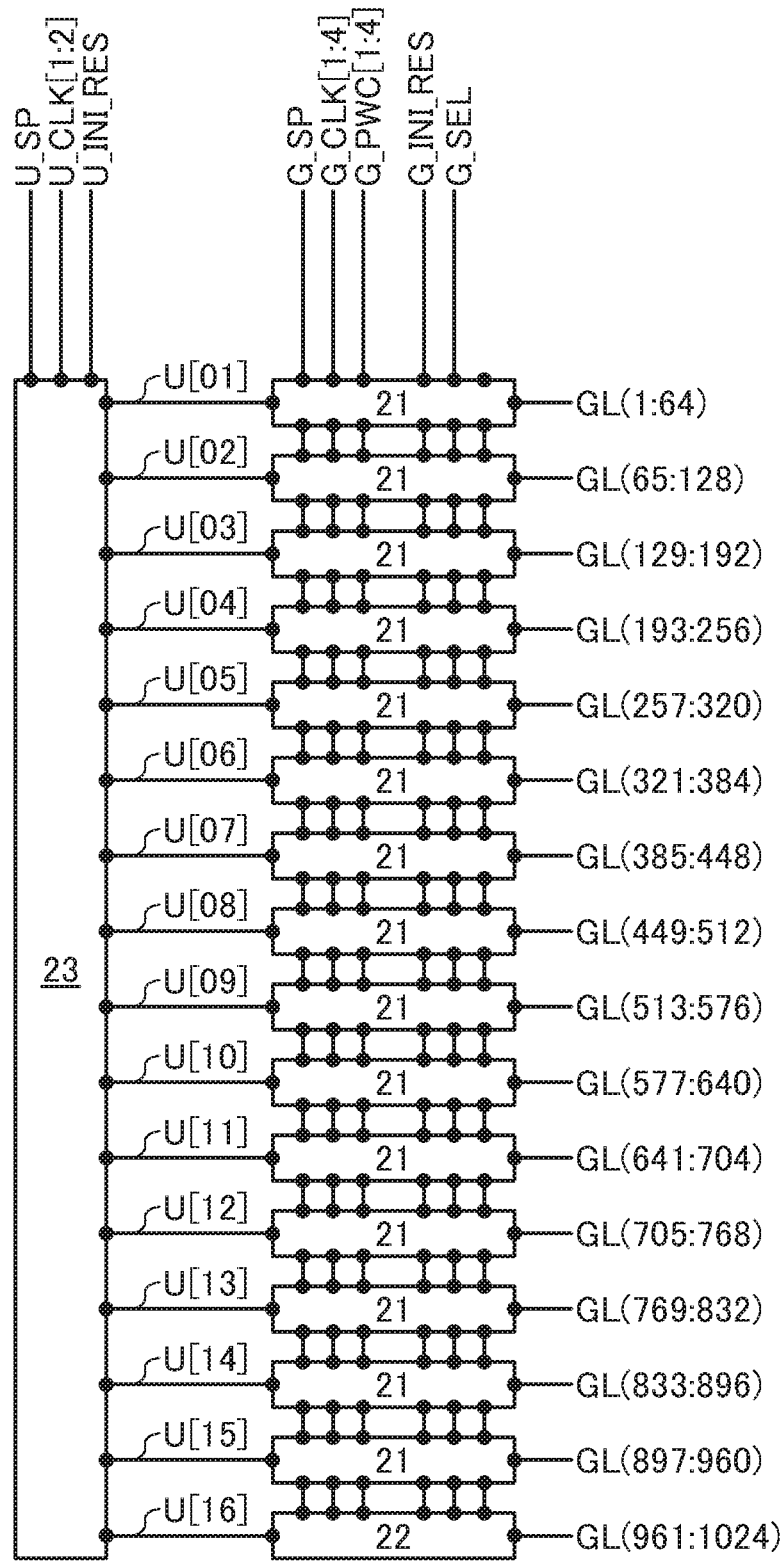
FIG. 19 is a circuit diagram illustrating a structure example of gate drivers.

Although the same reset signal GINI_RES is input to the shift register 21 and the shift register 23 in the gate drivers 62 and 63 illustrated in FIG. 5, different reset signals may be input thereto. FIG. 19 is a circuit diagram illustrating a structure example of the gate driver in the case where the reset signal G_INI_RES is input to the shift register 21 and a reset signal U_INI_RES is input to the shift register 22.

By inputting different reset signals from each other to the shift register 21 and the shift register 23, the first circuit and the second circuit can independently operate. This can increase the operation efficiency in the case where there are a plurality of sets of the period Fa and the period Fb in one frame.

Figure 20A:
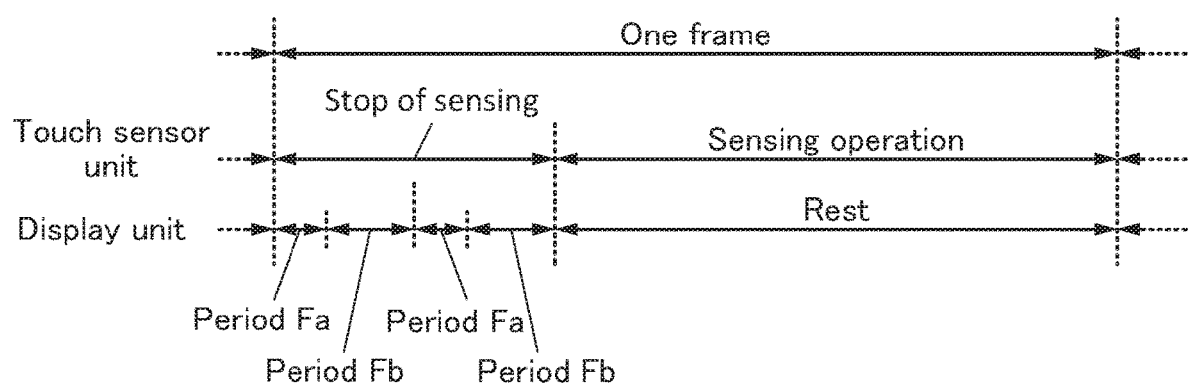
FIGS. 20A and 20B each show an operational relationship between a display unit and a touch sensor unit.
Figure 20B:
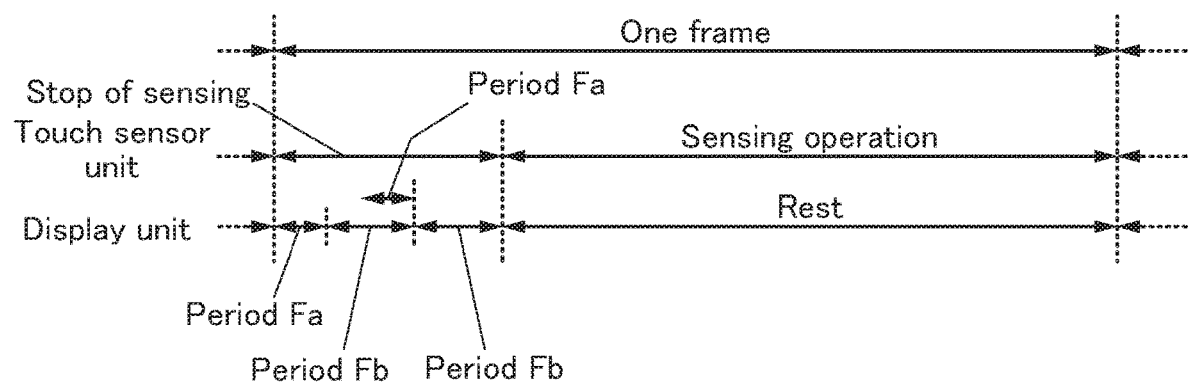

FIGS. 20A and 20B each show an operational relationship between the display unit and the touch sensor unit. FIG. 20A shows an example including two sets of periods Fa and Fb in one frame in the partial IDS driving illustrated in FIG. 17B. In the case where the same reset signal G_INI_RES is input to the shift register 21 and the shift register 23, the period Fa and the period Fb need to be sequentially performed as illustrated in FIG. 20A. In the case where different reset signals are input to the shift register 21 and the shift register 23, the operation for the period Fa can be performed in a period overlapping with the period Fb as illustrated in FIG. 20B. Because the second period Fa needs to be finished before the second period Fb starts, the second period Fa may overlap with the first period Fb.

This can be utilized for the operation which needs steady rewriting. An example of the operation which needs steady rewriting is a refresh operation performed in consideration of the time for the pixel 10 to hold charges. Here, it is assumed that the pixel 10 can hold charges for one second and the display unit has sixty frames per second. In this case, one pixel group may be refreshed per frame because the entire display region is only required to be refreshed in a second. This case is illustrated in FIG. 21.

Figure 21:
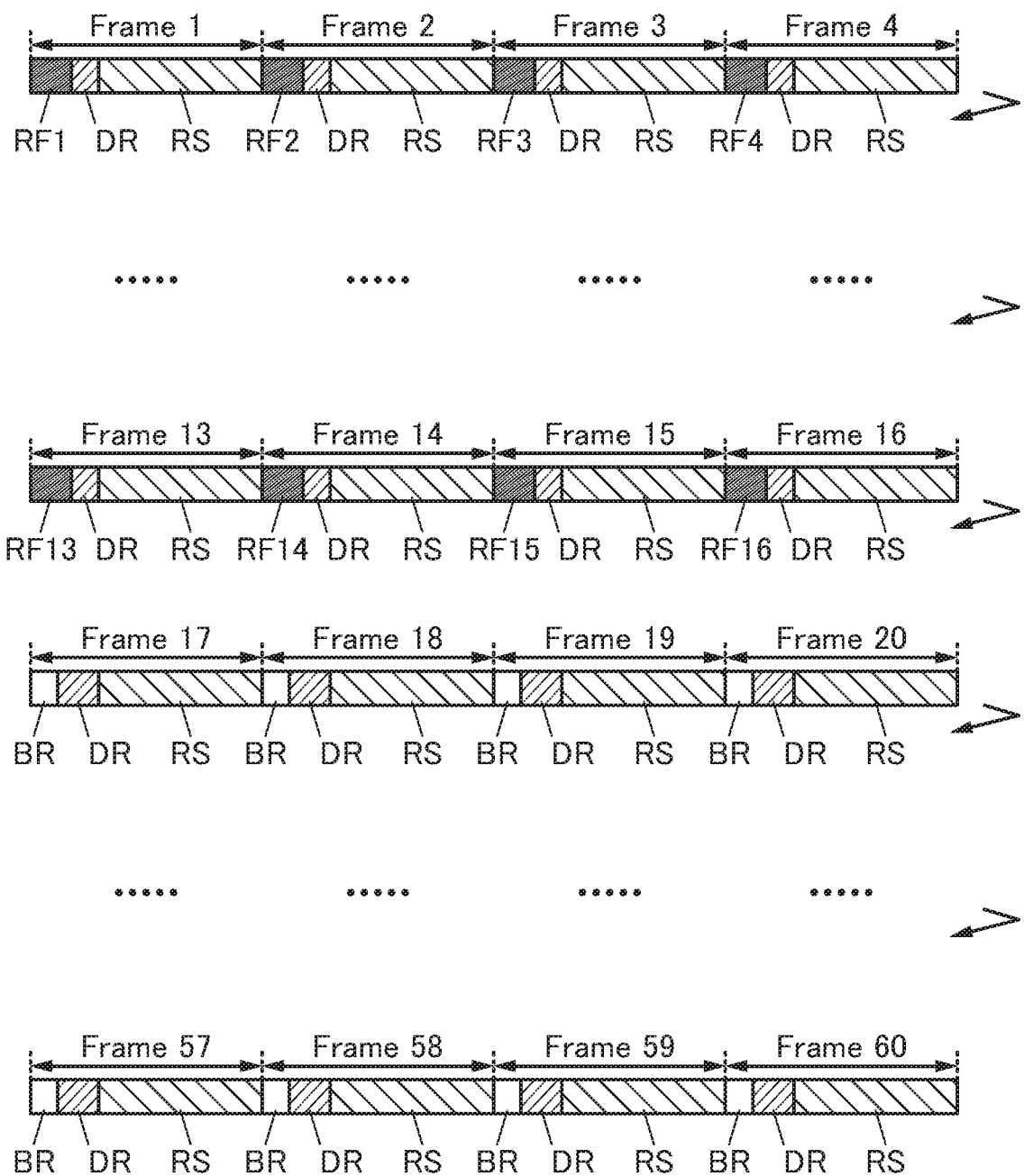
FIG. 21 illustrates an operation of a display unit.

FIG. 21 illustrates an operation of the display unit in partial IDS driving.

FIG. 21 illustrates the operation of the display unit 60 in Frame 1 to Frame 60. Here, RF1 to RF16 each represent a period for refreshing one pixel group, DR represents a period for rewriting part of the display region, and RS represents a rest period of the display unit (the sensing period of the touch sensor unit). Since the display unit 60 includes sixteen pixel groups, the entire display region is refreshed in sixteen frames.

In Frames 1 to 16, the refresh operation and the operation of rewriting an image in part of the region are performed. Thus, each of Frames 1 to 16 includes DR and any of RF1 to RF16. RF1 to RF16 and DR each include the period Fa and the period Fb, and the period Fa in DR overlaps with the period Fb in RF1 to RF16. Thus, part of DR overlaps with any of RF1 to RF16.

In Frames 17 to 60, the refresh operation is not performed. BR represents a blank period. BR may be combined with the rest period RS. Furthermore, DR in each of Frames 17 to 60 is the sum of the period Fa and the period Fb.

Thus, by assigning the steadily necessary operations to the frames, an operation in partial IDS driving can be performed efficiently.

As described above, the display device 100 can achieve a highly accurate sensing operation by performing the display image rewriting operation of the display unit 60 and the touch sensing operation of the touch sensor unit 70 at different times. Moreover, the display unit 60 can rewrite only the display image of a region that needs to be rewritten, which can reduce power consumption of the display unit 60 and enables a smooth sensing operation of the touch sensor unit 70. The operating of rewriting only the display image of a region that needs to be rewritten in the display unit 60 can be achieved with a small number of signals by the usage of the gate drivers 62 and 63 described in this embodiment.

This embodiment can be implemented in combination with any of the other embodiments as appropriate.

Embodiment 2

In this embodiment, a structure example of the touch sensor unit 70 mentioned in the above embodiment is described with reference to FIGS. 22A to 22C and FIGS. 23A and 23B.

A specific structure example of the touch sensor unit 70 is described with reference to FIGS. 22A to 22C and FIGS. 23A and 23B.

Figure 22A:
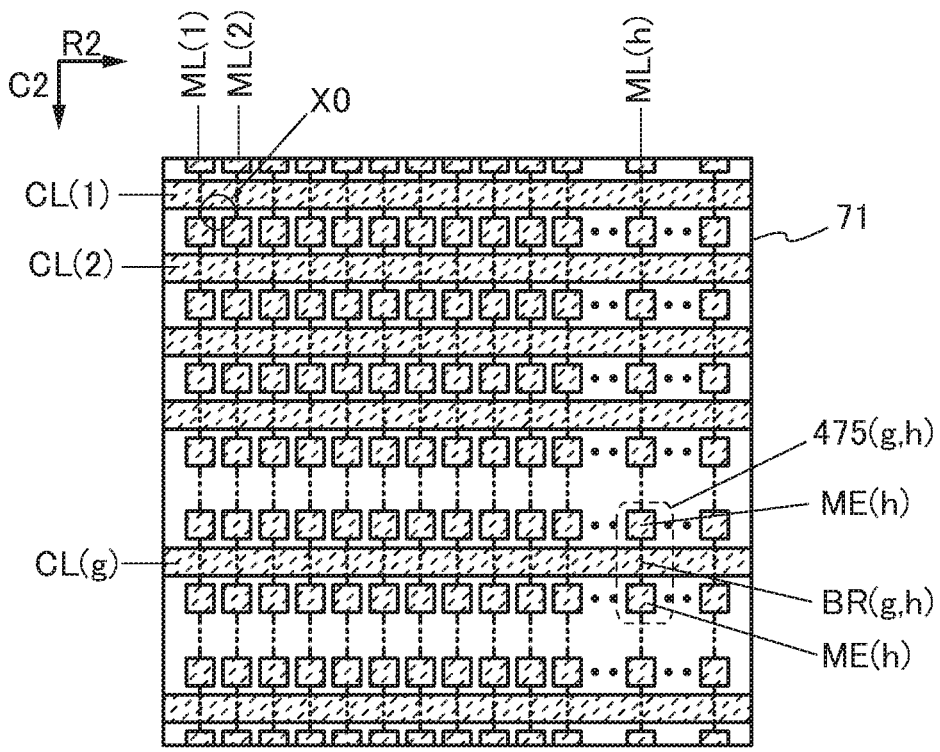
FIGS. 22A to 22C are a top view and projection views illustrating a structure example of a touch sensor unit.
Figure 22B:
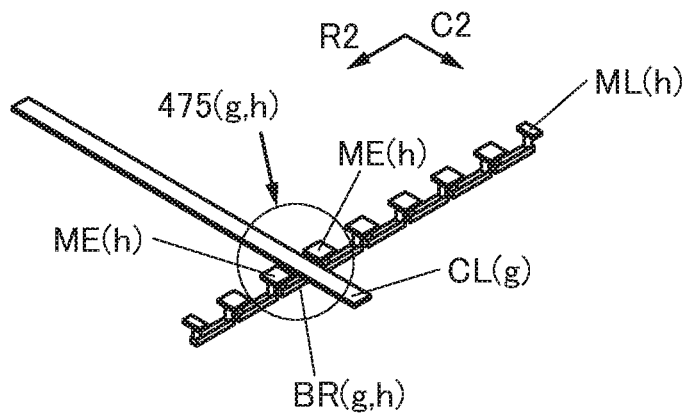
Figure 22C:
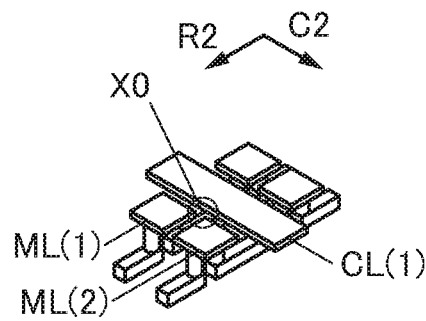

FIG. 22A is a top view of the touch sensor unit 70. FIGS. 22B and 22C are each a projection view illustrating part of FIG. 22A.

Figure 23A:
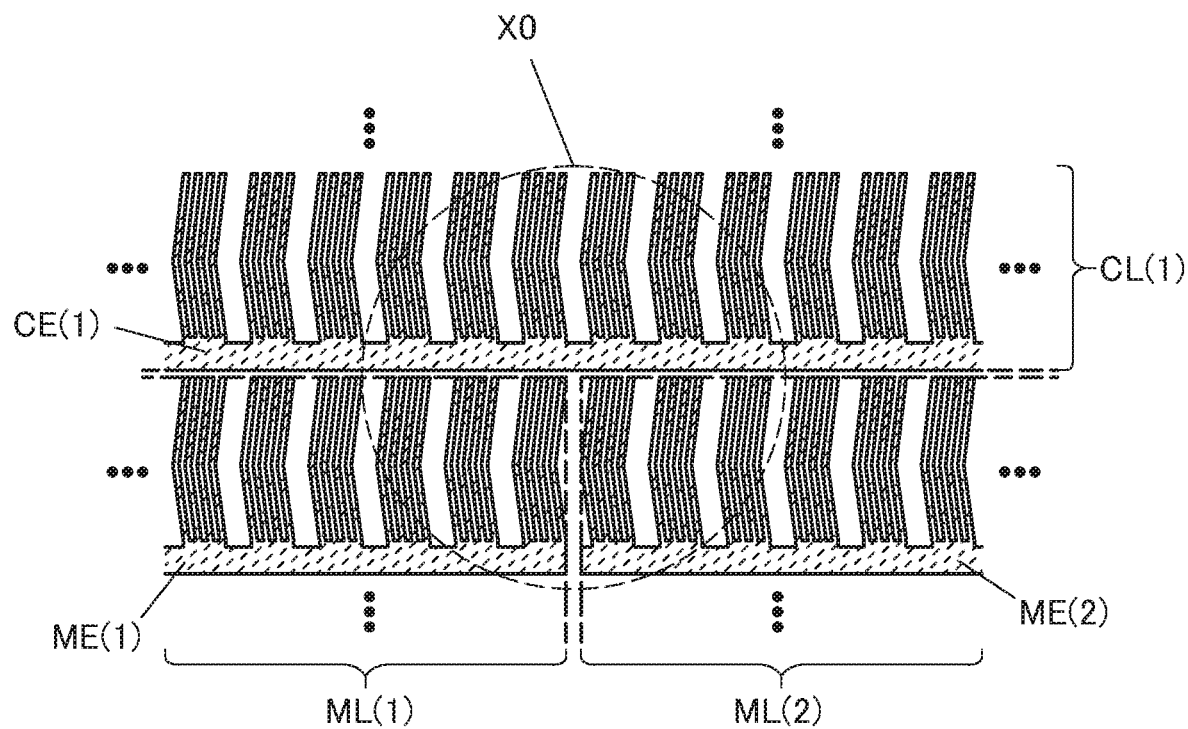
FIGS. 23A and 23B are a top view and a projection view illustrating a structure example of a touch sensor unit.
Figure 23B:
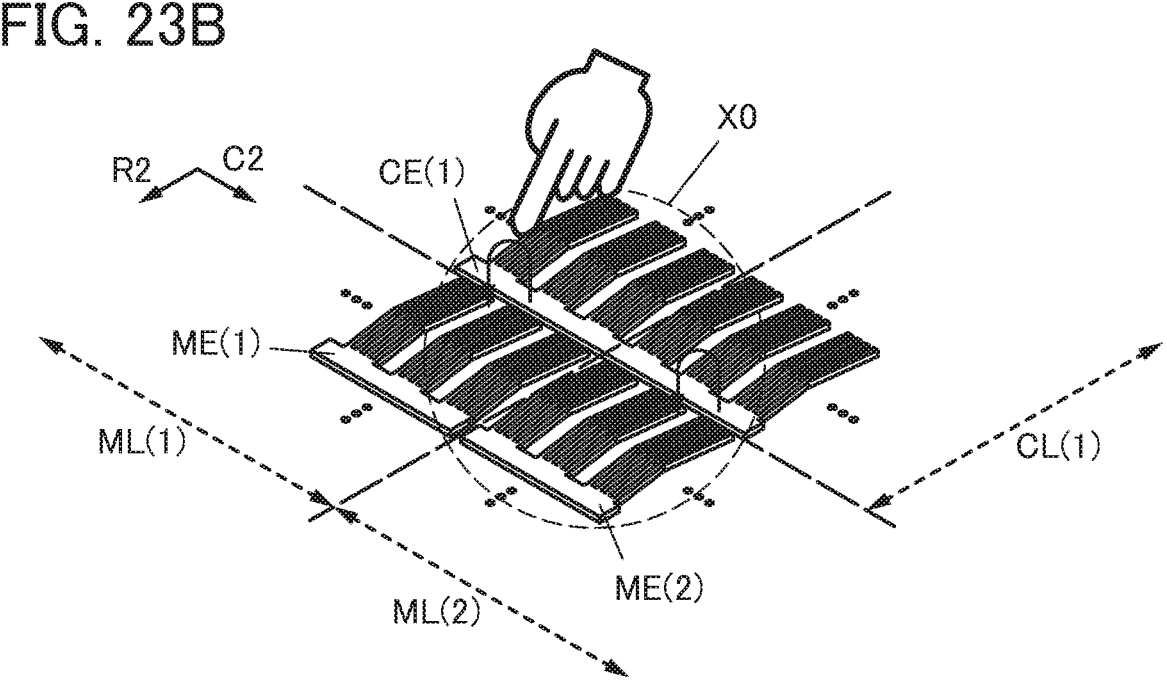

FIG. 23A is a top view of a portion in which a control line and a sensing signal line are adjacent to each other. FIG. 23B is a projection view that schematically illustrates an electric field generated in the adjoining portion.

The touch sensor unit 70 includes the sensor array 71. The sensor array 71 includes a wiring CL(g), a wiring ML(h), and a conductive film (see FIG. 22A). Note that g and h are each an integer of 2 or more.

For example, a conductive film divided into a plurality of regions can be used for the sensor array 71 (see FIG. 22A). This enables the same potential or different potentials to be supplied to the plurality of regions.

Specifically, a conductive film divided into a conductive film that can be used as the wiring CL(g) and a conductive film that can be used as the wiring ML(h) can be used for the sensor array 71. The conductive films obtained by dividing a conductive film into a plurality of regions can each have a comb-like shape, for example (see an electrode CE(1), an electrode ME(1), and an electrode ME(2) in FIGS. 23A and 23B). In this manner, the divided conductive films can be used as electrodes of sensing elements.

For example, a conductive film that can be used as the wiring CL(1), a conductive film that can be used as the wiring ML(1), and a conductive film that can be used as the wiring ML(2), which are obtained by dividing a conductive film, are adjacent to each other in an adjoining portion X0 (see FIG. 22A, FIG. 22C or FIGS. 23A and 23B).

A sensing element 475(g,h) is electrically connected to the wiring CL(g) and the wiring ML(h) (see FIG. 22A).

The wiring CL(g) has a function of supplying the signal Tx, and the wiring ML(h) has a function of receiving the signal Rx.

The wiring ML(h) includes a conductive film BR(g,h) (see FIG. 22B). The conductive film BR(g,h) includes a region overlapping with the wiring CL(g).

Note that the sensing element 475(g,h) includes an insulating film. The insulating film includes a region positioned between the wiring ML(h) and the conductive film BR(g,h). Thus, a short circuit between the wiring ML(h) and the conductive film BR(g,h) can be prevented.

The electrode CE(1) is electrically connected to the wiring CL(1), and the electrode ME(1) is electrically connected to the wiring ML(1) (see FIGS. 23A and 23B).

In a similar manner, an electrode CE(g) is electrically connected to the wiring CL(g), and an electrode ME(h) is electrically connected to the wiring ML(h).

A sensing element 475(1,1) detects a touch by detecting a change in the value of the capacitance formed between the electrode CE(1) and the electrode ME(1) (see FIGS. 22A to 22C and FIGS. 23A and 23B).

In a similar manner, the sensing element 475(g,h) detects a touch by detecting a change in the value of the capacitance formed between the electrode CE(g) and the electrode ME(h).

Conductive films which can be formed in the same process can be used as the wiring CL(1) and the electrode CE(1). Conductive films which can be formed in the same process can be used as the wiring ML(1) and the electrode ME(1) (see FIGS. 23A and 23B).

In a similar manner, conductive films which can be formed in the same process can be used as the wiring CL(g) and the electrode CE(g). Conductive films which can be formed in the same process can be used as the wiring ML(h) and the electrode ME(h).

For example, a light-transmitting conductive film can be used as each of the electrodes CE(g) and ME(h). Alternatively, a conductive film having an opening or a comb-like shape in a region overlapping with the pixel can be used as each of the electrodes CE(g) and ME(h). Accordingly, an object that approaches the region overlapping with the display panel can be sensed without disturbing display on the display panel.

Note that this embodiment can be combined with any of the other embodiments in this specification as appropriate.

Embodiment 3

In this embodiment, a structure example of the source driver IC 64 mentioned in the above embodiment is described with reference to FIGS. 24A and 24B.

Figure 24A:
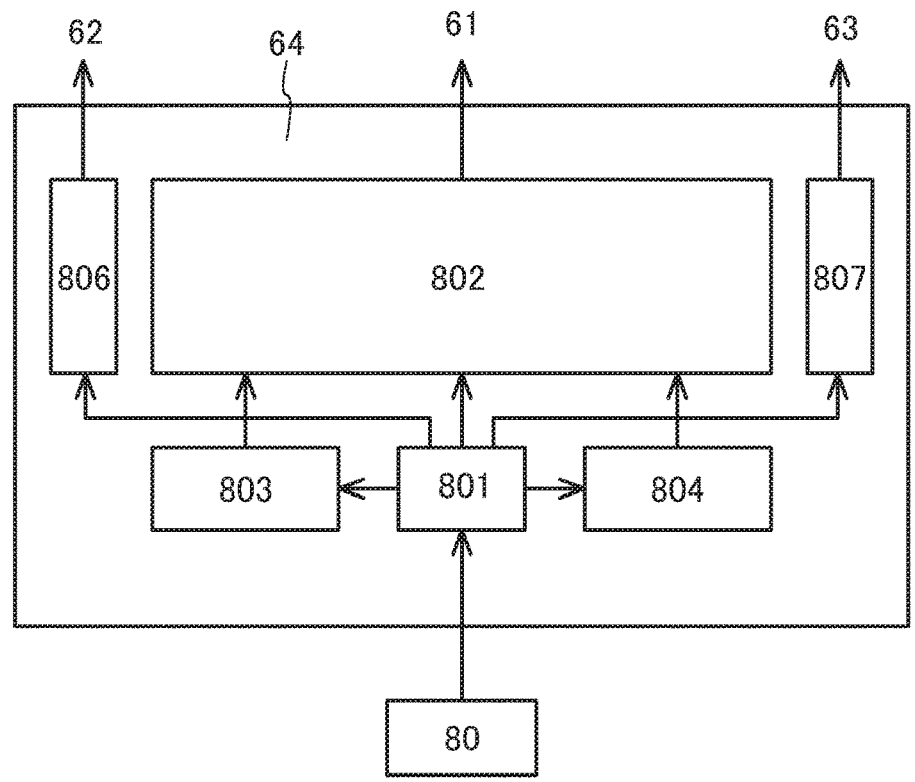
FIGS. 24A and 24B are block diagrams each illustrating a structure example of a source driver.
Figure 24B:
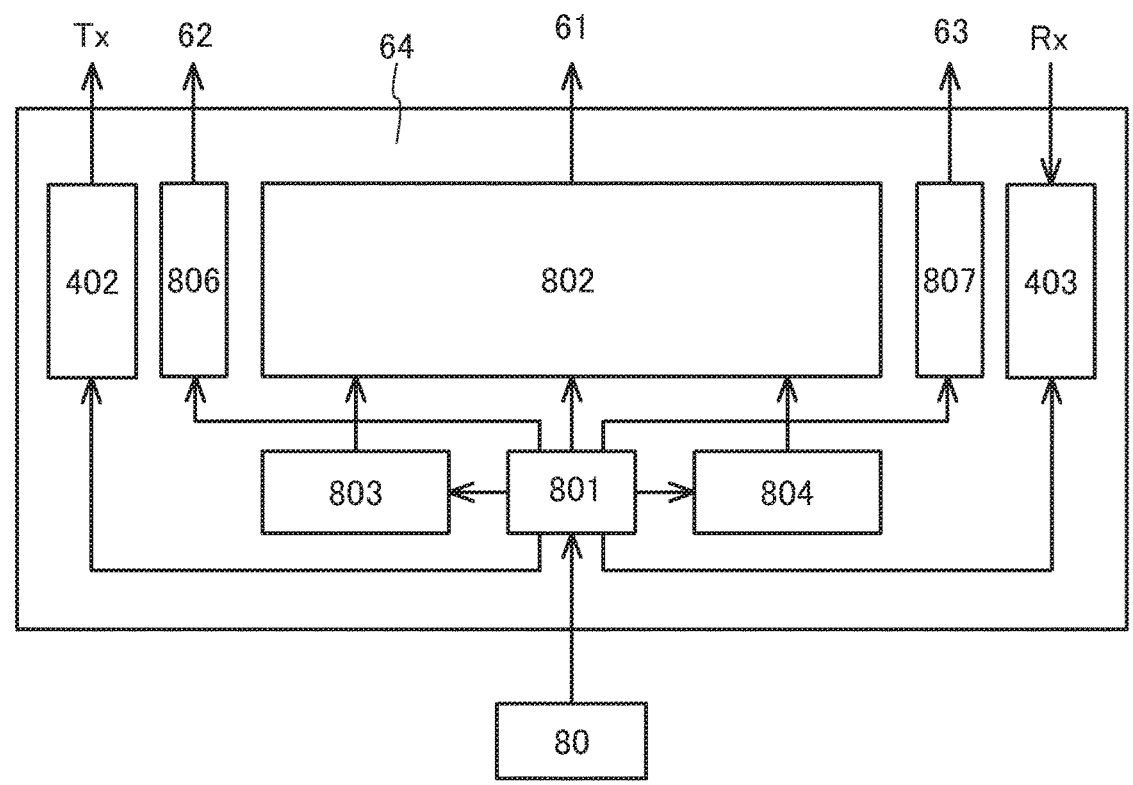

FIGS. 24A and 24B are block diagrams of the source driver IC 64 in the case where a hybrid element including a reflective element and a light-emitting element is used for the pixel 10.

The source driver IC 64 illustrated in FIG. 24A includes a control circuit 801, a driver 802, a frame memory 803, a frame memory 804, a gate driver signal generation circuit 806, and a gate driver signal generation circuit 807.

The control circuit 801 has a function of receiving a signal from the application processor 80 and transmitting the signal to each circuit included in the source driver IC 64. Examples of interface standards of the signal transmitted from the application processor 80 to the control circuit 801 include a mobile industry processor interface (MIPI) and a serial peripheral interface (SPI).

The driver 802 has a function of supplying an image signal to the pixel array 61.

The frame memory 803 has a function of storing the image signal temporarily.

The gate driver signal generation circuit 806 and the gate driver signal generation circuit 807 have a function of supplying a signal to the gate driver 62 and the gate driver 63, respectively.

One of the gate driver signal generation circuit 806 and the gate driver signal generation circuit 807 has a function of generating a signal for driving the reflective element of the pixel 10 and the other of the gate driver signal generation circuit 806 and the gate driver signal generation circuit 807 has a function of generating a signal for driving the light-emitting element of the pixel 10.

The source driver IC 64 may also function as the touch sensor IC 72 illustrated in FIG. 1. FIG. 24B shows a block diagram in that case.

In the source driver IC 64 illustrated in FIG. 24B, the driver circuit 402 and the detection circuit 403 illustrated in FIG. 2 are added to the block diagram of FIG. 24A. When the touch sensor IC 72 is included in the source driver IC 64 in this manner, manufacturing costs of the display device can be reduced.

In the case where the driver circuit 402 and the detection circuit 403 are included in one IC, those two circuits are preferably apart from each other. When the driver circuit 402 is near the detection circuit 403, the detection sensitivity of the detection circuit 403 deteriorates by the influence of noise generated by the driver circuit 402 and detection of a touch becomes difficult in some cases. Therefore, the driver circuit 402 and the detection circuit 403 are preferably positioned with a circuit such as the gate driver signal generation circuit 806 or 807 or the driver 802 provided therebetween.

Here, it is assumed that the gate driver 62 and the gate driver 63 drive the liquid crystal element and the light-emitting element, respectively. That is, it is assumed that the gate driver signal generation circuit 806 generates a signal for driving the liquid crystal element and the gate driver signal generation circuit 807 generates a signal for driving the light-emitting element. At this time, the driver circuit 402 and the detection circuit 403 are preferably near the gate driver signal generation circuit 806 and the gate driver signal generation circuit 807, respectively.

The drive voltage of a light-emitting element is generally lower than that of a liquid crystal element. Thus, the amplitude of a voltage output from the gate driver signal generation circuit 807 is lower than that of a voltage output from the gate driver signal generation circuit 806. It can be said that noise generated by the gate driver signal generation circuit 807 is smaller than that generated by the gate driver signal generation circuit 806. Therefore, the detection circuit 403 is preferably provided at a position that is closer to the gate driver signal generation circuit 807 than to the gate driver signal generation circuit 806.

Note that this embodiment can be combined with any of the other embodiments in this specification as appropriate.

Embodiment 4

In this embodiment, examples of the display unit 60 described in Embodiment 1 are described with reference to FIG. 25, FIGS. 26A1, 26A2, and 26B, and FIGS. 27A1, 27A2, and 27B.

Figure 25:
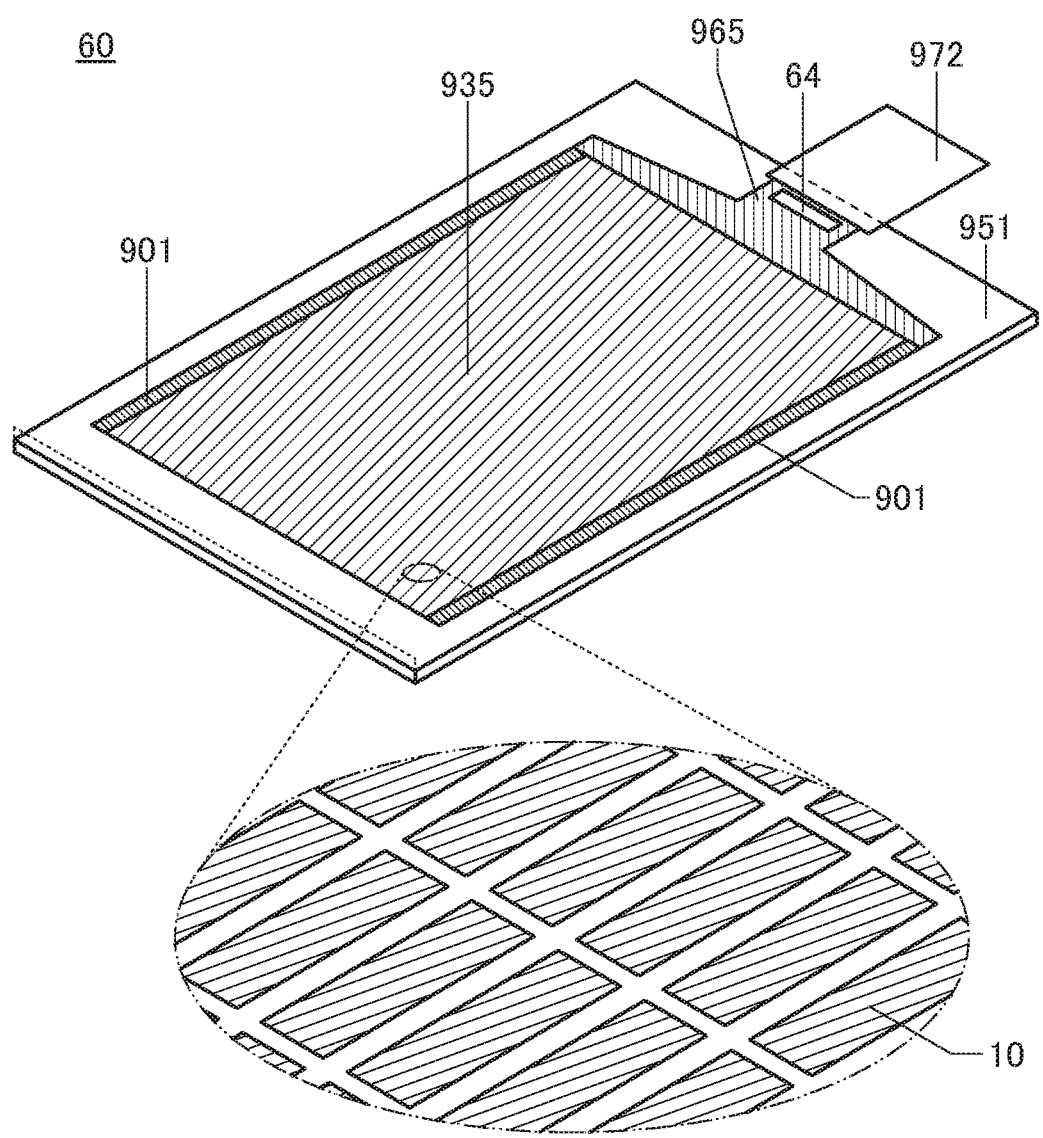
FIG. 25 is a schematic perspective view illustrating an example of a display unit.

FIG. 25 is a schematic perspective view of the display unit 60. The display unit 60 includes a display region 935, a peripheral circuit region 901, and a wiring 965 that are over a substrate 951. FIG. 25 shows an example where the source driver IC 64 and the FPC 972 are mounted on the display unit 60.

The peripheral circuit region 901 includes a circuit for supplying a signal to the display region 935. The circuit included in the peripheral circuit region 901 is, for example, a gate driver.

The wiring 965 has a function of supplying a signal and power to the display region 935 and the peripheral circuit region 901. The signal and power are input to the wiring 965 from the outside through the FPC 972 or from the source driver IC 64.

In the example of FIG. 25, the source driver IC 64 is provided over the substrate 951 by a COG method. The source driver IC 64 here corresponds to the source driver IC 64 in Embodiment 1. An IC including a scan line driver circuit, a signal line driver circuit, or the like can be used, for example. Note that the source driver IC 64 may be mounted on an FPC by a COF method or the like.

FIG. 25 also illustrates an enlarged view of part of the display region 935. In the display region 935, a plurality of pixels 10 are arranged in a matrix.

Next, the pixel 10 is described with reference to FIGS. 26A1, 26A2, and 26B.

FIG. 26A1 is a schematic top view of the pixel 10 seen from the display surface side. The pixel 10 in FIG. 26A1 includes three subpixels. Each of the subpixels includes a light-emitting element 940 (not illustrated in FIGS. 26A1 and 26A2), a transistor 910, and a transistor 912. In FIG. 26A1, each of the subpixels has a light-emitting region (a light-emitting region 916R, a light-emitting region 916G, or a light-emitting region 916B) of the light-emitting element 940. The light-emitting element 940 emits light toward the transistors 910 and 912; that is, it is a bottom-emission light-emitting element.

In addition, the pixel 10 includes a wiring 902, a wiring 904, a wiring 906, and the like. The wiring 902 serves as a scan line, for example. The wiring 904 serves as a signal line, for example. The wiring 906 serves as a power source line for supplying a potential to the light-emitting element, for example. The wiring 902 intersects with the wiring 904. The wiring 902 intersects with the wiring 906. Although the example here shows the structure where the wiring 902 intersects with the wirings 904 and 906, the structure is not limited thereto, and the wiring 904 may intersect with the wiring 906.

The transistor 910 serves as a selection transistor. A gate of the transistor 910 is electrically connected to the wiring 902. One of a source and a drain of the transistor 910 is electrically connected to the wiring 904.

The transistor 912 controls a current flowing to the light-emitting element. A gate of the transistor 912 is electrically connected to the other of the source and the drain of the transistor 910. One of a source and a drain of the transistor 912 is electrically connected to the wiring 906, and the other is electrically connected to one of a pair of electrodes of the light-emitting element 940.

In FIG. 26A1, the light-emitting regions 916R, 916G, and 916B each have a stripe shape long in the vertical direction, and they are arranged in the horizontal direction to form a striped pattern.

The wirings 902, 904, and 906 each have a light-blocking property. Layers included in the transistor 910, the transistor 912, a wiring connected to the transistor, a contact, a capacitor, and the like, that is, layers other than the layers included in the above wirings, are each preferably a light-transmitting film. In FIG. 26A2, a transmissive region 10*t* that transmits visible light and a light-blocking region 10*s* that blocks visible light, which are included in the pixel 10 of FIG. 26A1, are separately shown. As shown in the drawing, when the transistor is formed with a light-transmitting film, a portion other than the area where the wirings are provided can be the transmissive region 10*t*. Furthermore, the light-emitting region of the light-emitting element can overlap with the transistor, the wiring connected to the transistor, the contact, the capacitor, and the like, and thus the aperture ratio of the pixel can be increased.

The higher the proportion of the area of the transmissive region to the area of the pixel is, the higher the light extraction efficiency of the light-emitting element is. The proportion of the area of the transmissive region to the area of the pixel is, for example, greater than or equal to 1% and less than or equal to 95%, preferably greater than or equal to 10% and less than or equal to 90%, more preferably greater than or equal to 20% and less than or equal to 80%. A particularly preferable proportion is greater than or equal to 40% or greater than or equal to 50%, still preferably greater than or equal to 60% and less than or equal to 80%.

FIG. 26B is a cross-sectional view corresponding to a cross section along dashed-dotted line A-B in FIG. 26A2. FIG. 26B illustrates also cross sections of the light-emitting element 940, a capacitor 913, the peripheral circuit region 901, and the like that are not illustrated in the top views. The peripheral circuit region 901 can be used as a scan line driver circuit portion or a signal line driver circuit portion. The peripheral circuit region 901 includes a transistor 911.

As shown in FIG. 26B, the light-emitting element 940 emits light in the direction of a dashed arrow. The light from the light-emitting element 940 goes through the transistor 910, the transistor 912, the capacitor 913, and the like, and is extracted to the outside. Thus, a film included in the capacitor 913 or the like also preferably has a light-transmitting property. The increased area of the light-transmitting region of the capacitor 913 can decrease attenuation of light emitted from the light-emitting element 940.

The transistor 911 in the peripheral circuit region 901 may have a light-blocking property. When the transistor 911 and the like in the peripheral circuit region 901 have light-blocking properties, the reliability of a driver circuit portion and the drive capability can be heightened. Thus, it is preferable to use light-blocking conductive films for a gate electrode, a source electrode, and a drain electrode of the transistor 911. Wirings connected to them are also preferably formed with light-blocking conductive films.

Another example of the pixel 10 is described with reference to FIGS. 27A1, 27A2, and 27B.

FIG. 27A1 is a schematic top view of the pixel 10. The pixel 10 in FIG. 27A1 includes four subpixels. In the example of FIG. 27A1, the subpixels are arranged in two rows and two columns. Each of the subpixels includes a transmissive liquid-crystal element 930 (not illustrated in FIGS. 27A1 and 27A2), a transistor 914, and the like. In FIG. 27A1, the two wirings 902 and the two wirings 904 are provided in the pixel 10. In FIG. 27A1, each of the subpixels has a display region (a display region 918R, a display region 918G, a display region 918B, or a display region 918W) of the liquid crystal element. Light emitted from a backlight unit (BLU) enters the liquid-crystal element 930 through the transistor 914 and the like.

In addition, the pixel 10 includes the wiring 902, the wiring 904, and the like. The wiring 902 serves as a scan line, for example. The wiring 904 serves as a signal line, for example. The wiring 902 intersects with the wiring 904.

The transistor 914 serves as a selection transistor. A gate of the transistor 914 is electrically connected to the wiring 902. One of a source and a drain of the transistor 914 is electrically connected to the wiring 904, and the other is electrically connected to the liquid-crystal element 930.

The wirings 902 and 904 each have a light-blocking property. Layers included in the transistor 914, a wiring connected to the transistor 914, a contact, a capacitor, and the like, that is, layers other than the layers included in the above wirings, are each preferably a light-transmitting film. In FIG. 27A2, the transmissive region 10*t* that transmits visible light and the light-blocking region 10*s* that blocks visible light, which are included in the pixel 10 of FIG. 27A1, are separately shown. As shown in the drawing, when the transistor is formed with a light-transmitting film, a portion other than the area where the wirings are provided can be the transmissive region 10*t*. Furthermore, the transmissive region of the liquid crystal element can overlap with the transistor, the wiring connected to the transistor, the contact, the capacitor, and the like, and thus the aperture ratio of the pixel can be increased.

The higher the proportion of the area of the transmissive region to the area of the pixel is, the larger the amount of transmitted light is. The proportion of the area of the transmissive region to the area of the pixel is, for example, greater than or equal to 1% and less than or equal to 95%, preferably greater than or equal to 10% and less than or equal to 90%, more preferably greater than or equal to 20% and less than or equal to 80%. A particularly preferable proportion is greater than or equal to 40% or greater than or equal to 50%, still preferably greater than or equal to 60% and less than or equal to 80%.

FIG. 27B is a cross-sectional view corresponding to a cross section along dashed-dotted line C-D in FIG. 27A2. FIG. 27B illustrates also cross sections of the liquid-crystal element 930, a coloring film 931, a light-blocking film 932, a capacitor 915, the peripheral circuit region 901, and the like that are not illustrated in the top views. The peripheral circuit region 901 can be used as a scan line driver circuit portion or a signal line driver circuit portion. The peripheral circuit region 901 includes the transistor 911.

As shown in FIG. 27B, the BLU emits light in the direction of a dashed arrow. The light from the BLU goes through the transistor 914, the capacitor 915, and the like, and is extracted to the outside. Thus, films included in the transistor 914 and the capacitor 915 also preferably have a light-transmitting property. The increased area of the light-transmitting region of the transistor 914, the capacitor 915, and the like enables further efficient use of light from the BLU.

The light from the BLU may be extracted through the coloring film 931 to the outside, as shown in FIG. 27B. The light through the coloring film 931 can be colored in a desired color. The coloring film 931 has a color selected from red (R), green (G), blue (B), cyan (C), magenta (M), yellow (Y), and the like.

Materials described below can be used for the substrates, transistors, wirings, capacitors, and the like shown in FIGS. 26A1, 26A2, and 26B and FIGS. 27A1, 27A2, and 27B.

The substrate 951 preferably has a light-transmitting property. For example, a glass substrate of barium borosilicate glass, aluminoborosilicate glass, or the like, a quartz substrate, or a sapphire substrate can be used as the substrate 951. Alternatively, a flexible substrate, an attachment film, a base film, or the like may be used.

A semiconductor film in the transistor can be formed with a light-transmitting semiconductor material. Examples of the light-transmitting semiconductor material include a metal oxide and an oxide semiconductor. An oxide semiconductor preferably contains at least indium. In particular, it preferably contains indium and zinc. In addition, one or more kinds of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

A conductive film in the transistor can be formed with a light-transmitting conductive material. The light-transmitting conductive material preferably contains one or more kinds of indium, zinc, and tin. Specifically, an In oxide, an In—Sn oxide (also referred to as an indium tin oxide or ITO), an In—Zn oxide, an In—W oxide, an In—W—Zn oxide, an In—Ti oxide, an In—Sn—Ti oxide, an In—Sn—Si oxide, a Zn oxide, a Ga—Zn oxide, or the like can be used.

The conductive film of the transistor may be an oxide semiconductor that includes an impurity element, for example, and has reduced resistance. The oxide semiconductor with the reduced resistance can be regarded as an oxide conductor (OC).

For example, to form an oxide conductor, oxygen vacancies are formed in an oxide semiconductor and then hydrogen is added to the oxygen vacancies, so that a donor level is formed in the vicinity of the conduction band. The oxide semiconductor having the donor level has an increased conductivity and becomes a conductor.

An oxide semiconductor has a large energy gap (e.g., an energy gap of 2.5 eV or larger), and thus has a visible light transmitting property. The oxide conductor also has a visible light transmitting property almost equivalent to that of the oxide semiconductor.

The oxide conductor preferably includes one or more kinds of metal elements included in the semiconductor film of the transistor. When two or more layers included in the transistor are formed using the oxide semiconductors including the same metal element, the same manufacturing apparatus (e.g., deposition apparatus or processing apparatus) can be used in two or more steps and thus manufacturing cost can be reduced.

The structures of the pixel in the display device shown in this embodiment enables efficient use of light emitted from one or both of the light-emitting element and the BLU. Thus, the excellent display device with reduced power consumption can be provided.

At least part of this embodiment can be implemented in appropriate combination with any of the other embodiments.

Embodiment 5

In this embodiment, a data processor in which the display device of any of the above embodiments can be used is described with reference to FIGS. 28A to 28E and FIGS. 29A to 29E.

Figure 28A:
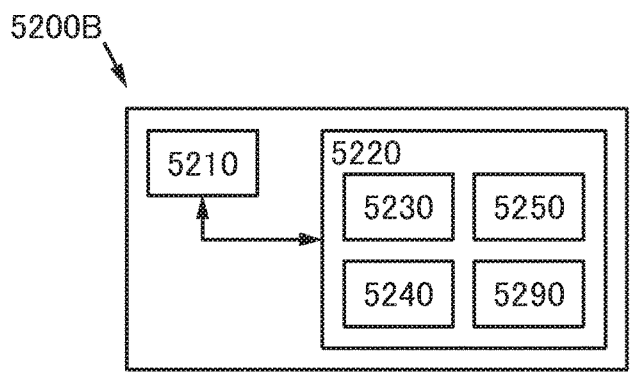
FIGS. 28A to 28E illustrate structures of a data processor.

FIGS. 28A to 28E and FIGS. 29A to 29E illustrate structures of the data processor of one embodiment of the present invention. FIG. 28A is a block diagram of the data processor, and FIGS. 28B to 28E are perspective views illustrating the structures of the data processor.

<Data Processor>

A data processor 5200B described in this embodiment includes an arithmetic device 5210 and an input/output device 5220 (see FIG. 28A).

The arithmetic device 5210 has a function of receiving operation data and a function of supplying image data on the basis of the operation data.

The input/output device 5220 includes a display portion 5230, an input portion 5240, a sensor portion 5250, and a communication portion 5290, and has a function of supplying operation data and a function of receiving image data. The input/output device 5220 also has a function of supplying sensing data, a function of supplying communication data, and a function of receiving communication data.

The input portion 5240 has a function of supplying operation data. For example, the input portion 5240 supplies operation data on the basis of operation by the user of the data processor 5200B.

Specifically, a keyboard, a hardware button, a pointing device, a touch sensor, an audio input device, an eye-gaze input device, or the like can be used for the input portion 5240.

The display portion 5230 includes a display panel and has a function of displaying image data. For example, the display device 100 described in the above embodiment can be used for the display portion 5230.

The sensor portion 5250 has a function of supplying sensing data. For example, the sensor portion 5250 has a function of sensing a surrounding environment where the data processor is used and supplying sensing data.

Specifically, an illuminance sensor, an imaging device, an attitude determination device, a pressure sensor, a human motion sensor, or the like can be used as the sensor portion 5250.

The communication portion 5290 has a function of receiving and supplying communication data. For example, the communication portion 5290 has a function of being connected to another electronic device or a communication network through wireless communication or wired communication. Specifically, the communication portion 5290 has a function of wireless local area network communication, telephone communication, or near field communication, for example.

Structure Example 1 of Data Processor

Figure 28B:
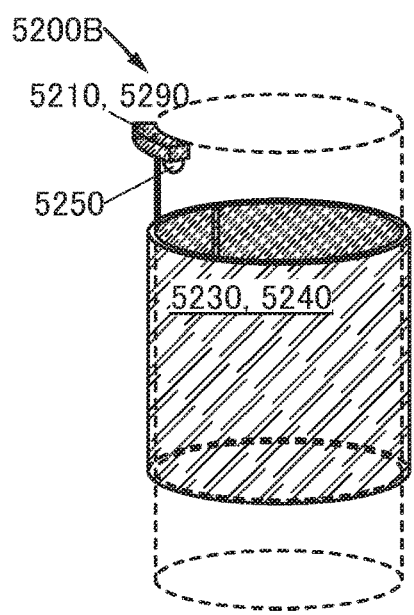

For example, the display portion 5230 can have an outer shape along a cylindrical column (see FIG. 28B). The display portion 5230 can change its display method in accordance with the illuminance of a usage environment. In addition, the display portion 5230 can change the displayed content in response to sensed existence of a person. This allows the data processor 5200B to be provided on a column of a building, for example. The data processor 5200B can display advertising, guidance, or the like. The data processor 5200B can be used for digital signage or the like.

Structure Example 2 of Data Processor

Figure 28C:
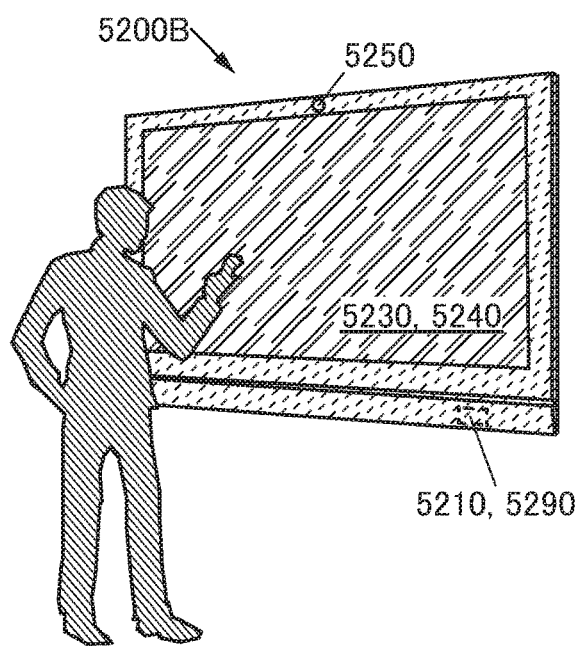

For example, the data processor 5200B has a function of generating image data on the basis of the path of a pointer used by a user (see FIG. 28C). Specifically, the display panel with a diagonal line of 20 inches or longer, preferably 40 inches or longer, further preferably 55 inches or longer can be used. Alternatively, a plurality of display panels can be arranged in one display region. Alternatively, a plurality of display panels can be arranged and used for multiscreen. Thus, the data processor 5200B can be used for an electronic blackboard, an electronic bulletin board, or a digital signage, or the like, for example.

Structure Example 3 of Data Processor

Figure 28D:
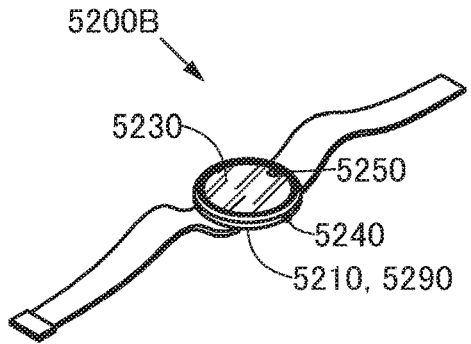

For example, the data processor 5200B has a function of changing a display method in accordance with the illuminance of a usage environment (see FIG. 28D). Thus, for example, the power consumption of a smartwatch can be reduced. Alternatively, for example, a smartwatch can display an image in such a manner that the smartwatch can be suitably used in an environment under strong external light, e.g., outdoors in fine weather.

Structure Example 4 of Data Processor

Figure 28E:
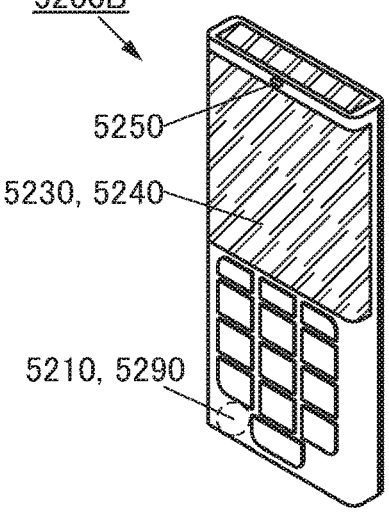

For example, the display portion 5230 has a surface gently curved along a side surface of a housing (see FIG. 28E). The display portion 5230 includes a display panel that can display an image on the front surface, the side surfaces, and the top surface, for example. Accordingly, image data can be displayed on the side surfaces and the top surface of a mobile phone in addition to the front surface, for example.

Structure Example 5 of Data Processor

Figure 29A:
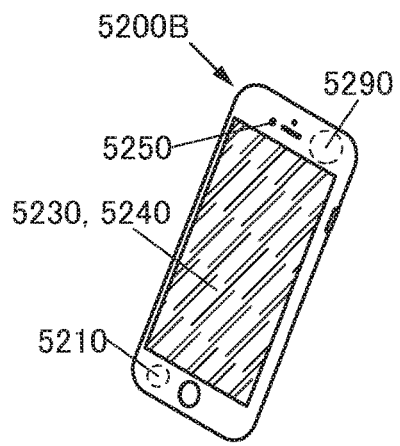
FIGS. 29A to 29E illustrate structures of a data processor.

For example, the data processor 5200B has a function of changing a display method in accordance with the illuminance of a usage environment (see FIG. 29A). Thus, the power consumption of a smartphone can be reduced. Alternatively, for example, a smartphone can display an image in such a manner that the smartphone can be suitably used in an environment under strong external light, e.g., outdoors in fine weather.

Structure Example 6 of Data Processor

Figure 29B:
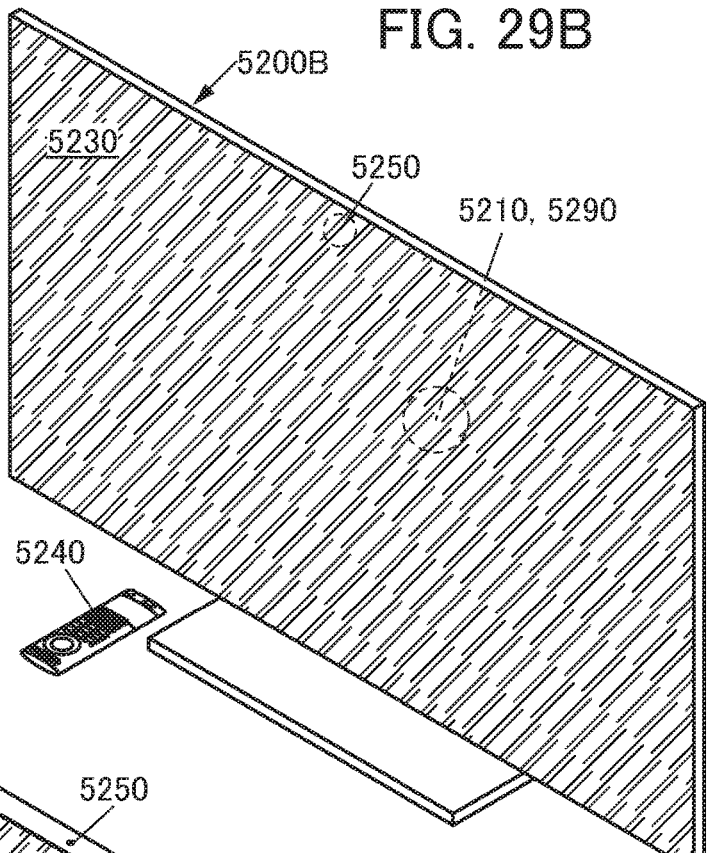

For example, the data processor 5200B has a function of changing a display method in accordance with the illuminance of a usage environment (see FIG. 29B). Accordingly, a television system can display an image in such a manner that the television system can be suitably used even when irradiated with strong external light that enters the room from the outside in fine weather.

Structure Example 7 of Data Processor

Figure 29C:
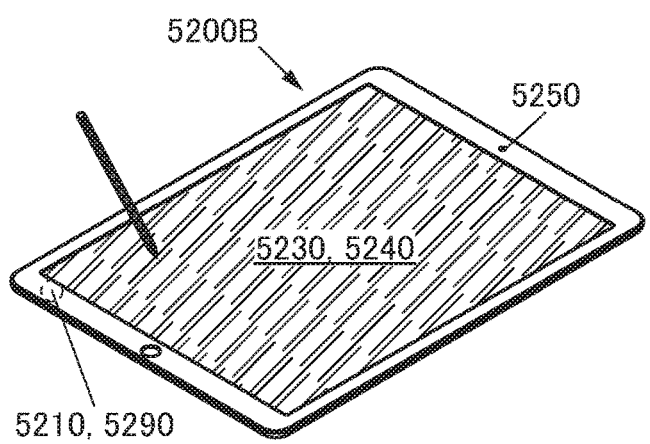

For example, the data processor 5200B has a function of changing a display method in accordance with the illuminance of a usage environment (see FIG. 29C). Accordingly, for example, a tablet computer can display an image in such a manner that the tablet computer can be suitably used in an environment under strong external light, e.g., outdoors in fine weather.

Structure Example 8 of Data Processor

Figure 29D:
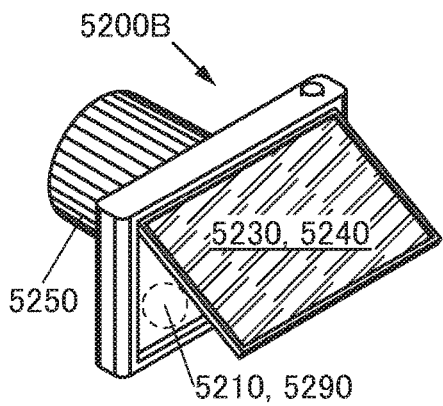

For example, the data processor 5200B has a function of changing a display method in accordance with the illuminance of a usage environment (see FIG. 29D). Accordingly, for example, a digital camera can display an image of an object to be captured in such a manner that the displayed image can be clearly seen in an environment under strong external light, e.g., outdoors in fine weather.

Structure Example 9 of Data Processor

Figure 29E:
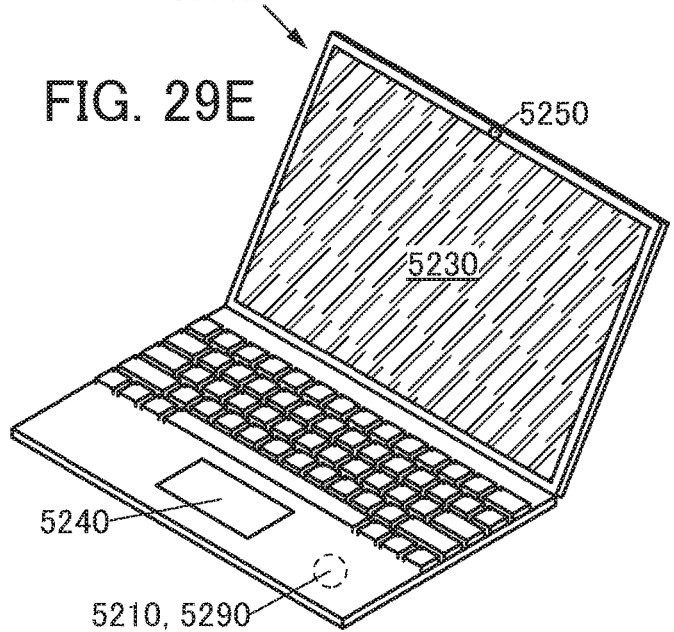

For example, the data processor 5200B has a function of changing a display method in accordance with the illuminance of a usage environment (see FIG. 29E). Accordingly, for example, a personal computer can display an image in such a manner that the personal computer can be suitably used in an environment under strong external light, e.g., outdoors in fine weather.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, and a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected when a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X through at least Z1 on a first connection path, the first connection path does not include a second connection path, the second connection path includes a connection path on which the transistor is present, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Embodiment 6

In this embodiment, a structure example of the OS transistor described in the above embodiment will be described.

Structure Example 1 of OS Transistor

Figure 30A:
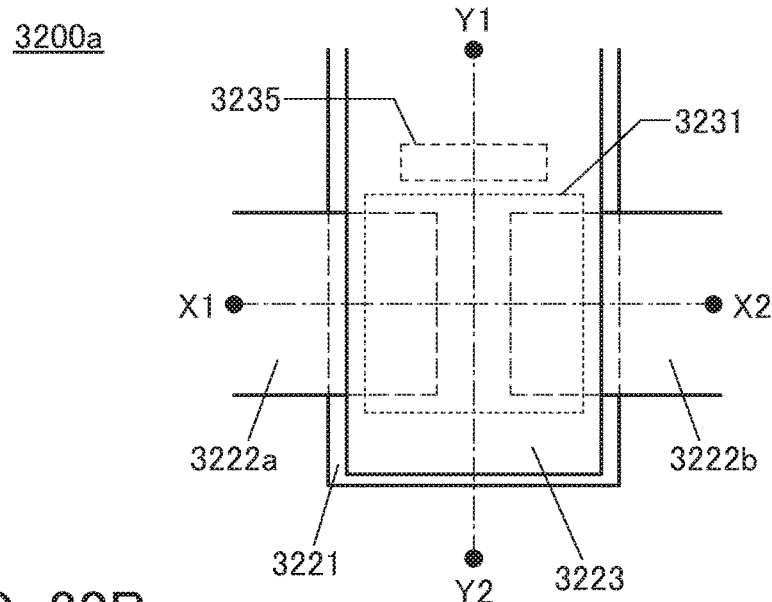
FIGS. 30A to 30C are a top view and cross-sectional views illustrating an example of a transistor used in a display device.
Figure 30B:
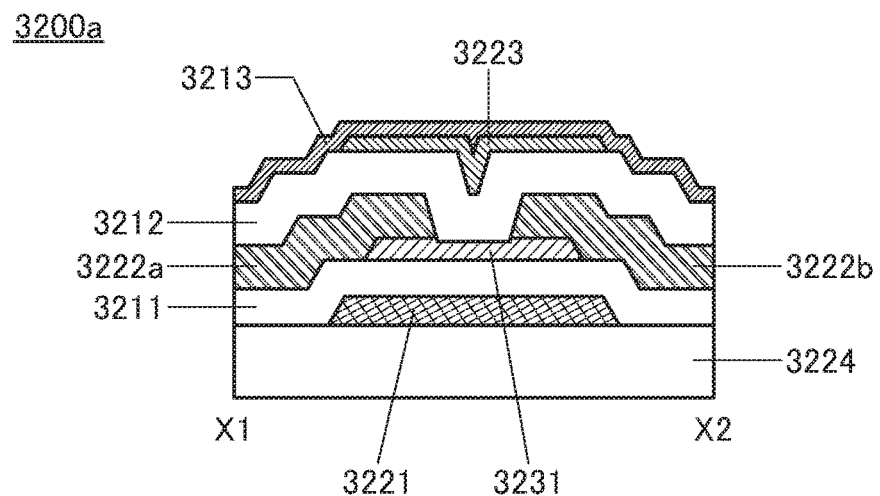
Figure 30C:
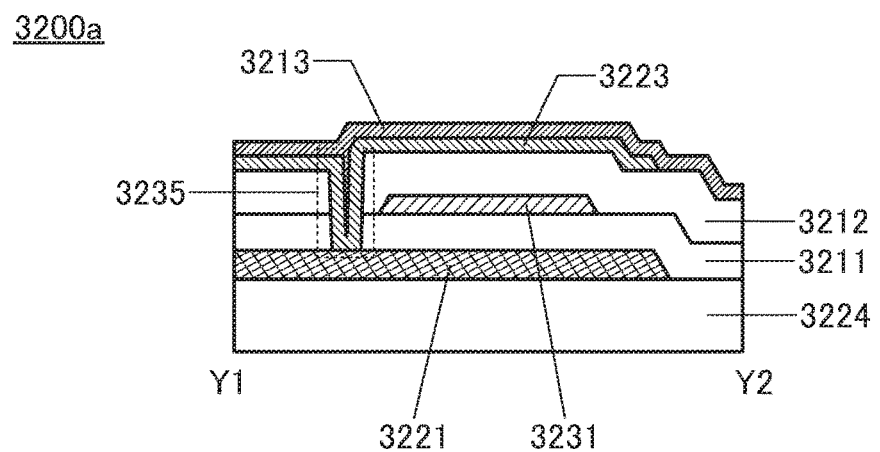

To show a structure example of a transistor, a transistor 3200a is described with reference to FIGS. 30A to 30C. FIG. 30A is a top view of the transistor 3200a. FIG. 30A is a top view of the transistor 3200a. FIG. 30B is a cross-sectional view taken along the dashed-dotted line X1-X2 in FIG. 30A, and FIG. 30C is a cross-sectional view taken along the dashed-dotted line Y1-Y2 in FIG. 30A. Note that in FIG. 30A, some components of the transistor 3200a (e.g., an insulating layer serving as a gate insulating layer) are not illustrated to avoid complexity. Note that hereinafter, the direction of the dashed-dotted line X1-X2 may be called the channel length direction, and the direction of the dashed-dotted line Y1-Y2 may be called the channel width direction. As in FIG. 30A, some components are not illustrated in some cases in top views of transistors described below.

The transistor 3200a includes a conductive layer 3221 over an insulating layer 3224; an insulating layer 3211 over the insulating layer 3224 and the conductive layer 3221; a metal oxide layer 3231 over the insulating layer 3211; a conductive layer 3222a over the metal oxide layer 3231; a conductive layer 3222b over the metal oxide layer 3231; an insulating layer 3212 over the metal oxide layer 3231, the conductive layer 3222a, and the conductive layer 3222b; a conductive layer 3223 over the insulating layer 3212; and an insulating layer 3213 over the insulating layer 3212 and the conductive layer 3223.

The insulating layers 3211 and 3212 have an opening 3235. The conductive layer 3223 is electrically connected to the conductive layer 3221 through the opening 3235.

The insulating layer 3211 serves as a first gate insulating layer of the transistor 3200a. The insulating layer 3212 serves as a second gate insulating layer of the transistor 3200a. The insulating layer 3213 serves as a protective insulating layer of the transistor 3200a. The conductive layer 3221 serves as a first gate of the transistor 3200a. The conductive layer 3222a serves as one of a source and a drain of the transistor 3200a and the conductive layer 3222b serves as the other of the source and the drain. The conductive layer 3223 serves as a second gate of the transistor 3200a.

Note that the transistor 3200a is a channel-etched transistor, and has a dual-gate structure.

The transistor 3200a without the conductive layer 3223 is also available. In that case, the transistor 3200a is a channel-etched transistor, and has a bottom-gate structure.

As illustrated in FIGS. 30B and 30C, the metal oxide layer 3231 faces the conductive layer 3221 and the conductive layer 3223, and is between the conductive layers serving as the two gates. The length of the conductive layer 3223 in the channel length direction is longer than the length of the metal oxide layer 3231 in the channel length direction. The length of the conductive layer 3223 in the channel width direction is longer than the length of the metal oxide layer 3231 in the channel width direction. The whole metal oxide layer 3231 is covered with the conductive layer 3223 with the insulating layer 3212 positioned therebetween.

In other words, the conductive layers 3221 and 3223 are connected to each other through the opening 3235 provided in the insulating layers 3211 and 3212, and have a region located outside a side end portion of the metal oxide layer 3231.

With this structure, the metal oxide layer 3231 included in the transistor 3200a can be electrically surrounded by electric fields of the conductive layers 3221 and 3223. A device structure of a transistor in which electric fields of a first gate and a second gate electrically surround a metal oxide layer where a channel region is formed, like in the transistor 3200a, can be referred to as a surrounded channel (S-channel) structure.

Since the transistor 3200a has the S-channel structure, an electric field for inducing a channel can be effectively applied to the metal oxide layer 3231 by the conductive layer 3221 functioning as the first gate; therefore, the current drive capability of the transistor 3200a can be improved and high on-state current characteristics can be obtained. Since the on-state current can be increased, it is possible to reduce the size of the transistor 3200a. In addition, since the transistor 3200a has a structure in which the metal oxide layer 3231 is surrounded by the conductive layer 3221 serving as the first gate and the conductive layer 3223 serving as the second gate, the mechanical strength of the transistor 3200a can be increased.

For example, it is preferable that the metal oxide layer 3231 contain In, M (M is gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, or magnesium), and Zn.

The metal oxide layer 3231 preferably includes a region where the atomic proportion of In is larger than the atomic proportion of M. For example, the atomic ratio of In to M and Zn in the metal oxide layer 3231 is preferably In:M:Zn=4:2:3 or in the neighborhood thereof. As for the range expressed by the term "neighborhood" here, when In is 4, M is greater than or equal to 1.5 and less than or equal to 2.5, and Zn is greater than or equal to 2 and less than or equal to 4. Alternatively, the atomic ratio of In to M and Zn in the metal oxide layer 3231 is preferably In:M:Zn=5:1:6 or in the neighborhood thereof.

The metal oxide layer 3231 is preferably a CAC-OS. When the metal oxide layer 3231 is a CAC-OS and has a region where the atomic proportion of In is higher than the atomic proportion of M, the transistor 3200a can have high field-effect mobility. Note that the details of the CAC-OS will be described later.

Since the transistor 3200a having the S-channel structure has high field-effect mobility and high driving capability, the use of the transistor 3200a in the driver circuit, a typical example of which is a gate driver that generates a gate signal, allows the display device to have a narrow bezel. The use of the transistor 3200a in a source driver (particularly in a demultiplexer connected to an output terminal of a shift register included in the source driver) that supplies a signal to a signal line included in the display device can reduce the number of wirings connected to the display device.

Furthermore, the transistor 3200a is a channel-etched transistor and thus can be fabricated through a smaller number of steps than a transistor formed using low-temperature polysilicon. In addition, unlike the transistor formed using low-temperature polysilicon, the transistor 3200a including the metal oxide layer in the channel region does not need a laser crystallization step. Accordingly, the manufacturing cost can be reduced even in the case of a display device formed using a large substrate. Transistors having high field-effect mobility like the transistor 3200a are preferably used in a driver circuit and a display portion of a large display device having high resolution such as ultra high definition (4K resolution, 4K2K, or 4K) or super high definition (8K resolution, 8K4K, or 8K), in which case writing can be performed in a short time and display defects can be reduced.

The insulating layers 3211 and 3212 in contact with the metal oxide layer 3231 are preferably oxide insulating films, and further preferably include a region containing oxygen in excess of the stoichiometric composition (oxygen-excess region). In other words, the insulating layers 3211 and 3212 are insulating films from which oxygen can be released. In order to provide the oxygen-excess region in the insulating layers 3211 and 3212, the insulating layers 3211 and 3212 are formed in an oxygen atmosphere, or the deposited insulating layers 3211 and 3212 are subjected to heat treatment in an oxygen atmosphere, for example.

An oxide semiconductor, which is a kind of metal oxide, can be used as the metal oxide layer 3231.

In the case where the metal oxide layer 3231 includes an In-M-Zn oxide, it is preferable that the atomic ratio of metal elements of a sputtering target used for forming the In-M-Zn oxide satisfy In>M. The atomic ratio of metal elements in such a sputtering target is, for example, In:M:Zn=2:1:3, InM:Zn=3:1:2, In:M:Zn=4:2:4.1, In:M:Zn=5:1:6, In:M:Zn=5:1:7, In:M:Zn=5:1:8, In:M:Zn=6:1:6, or In:M:Zn=5:2:5.

In the case where the metal oxide layer 3231 is formed using an In-M-Zn oxide, it is preferable to use a target including a polycrystalline In-M-Zn oxide as the sputtering target. The use of the target including a polycrystalline In-M-Zn oxide facilitates formation of the metal oxide layer 3231 having crystallinity. Note that the atomic ratio of metal elements in the formed metal oxide layer 3231 varies from the above atomic ratios of metal elements of the sputtering targets in a range of ±40%. For example, when a sputtering target with an atomic ratio of In:Ga:Zn=4:2:4.1 is used for forming the metal oxide layer 3231, the atomic ratio of In to Ga and Zn in the formed metal oxide layer 3231 may be 4:2:3 or in the neighborhood thereof.

The energy gap of the metal oxide layer 3231 is 2 eV or more, preferably 2.5 eV or more. The use of such an oxide semiconductor having a wide energy gap leads to a reduction in off-state current of a transistor.

Furthermore, the metal oxide layer 3231 preferably has a non-single-crystal structure. The non-single-crystal structure includes a c-axis aligned crystalline (CAAC) structure, a polycrystalline structure, a microcrystalline structure, or an amorphous structure, for example. Among the non-single-crystal structures, the amorphous structure has the highest density of defect states, whereas the CAAC structure has the lowest density of defect states.

The metal oxide layer 3231 formed with a metal oxide film with low impurity concentration and low density of defect states can give the transistor excellent electrical characteristics. Thus, the use of such a metal oxide film is preferable. Here, the state in which impurity concentration is low and density of defect states is low (the number of oxygen vacancies is small) is referred to as "highly purified intrinsic" or "substantially highly purified intrinsic". Note that impurities in the metal oxide film are typically water, hydrogen, and the like. In this specification and the like, reducing or removing water and hydrogen from the metal oxide film is referred to as dehydration or dehydrogenation in some cases. Moreover, adding oxygen to a metal oxide film or an oxide insulating film is referred to as oxygen addition in some cases, and a state in which oxygen in excess of the stoichiometric composition is contained due to the oxygen addition is referred to as an oxygen-excess state in some cases.

A highly purified intrinsic or substantially highly purified intrinsic metal oxide film has few carrier generation sources, and thus has a low carrier density. Thus, a transistor in which a channel region is formed in the metal oxide film rarely has a negative threshold voltage (is rarely normally on). The highly purified intrinsic or substantially highly purified intrinsic metal oxide film has a low density of defect states and accordingly has a low density of trap states in some cases. Furthermore, the highly purified intrinsic or substantially highly purified intrinsic metal oxide film has an extremely low off-state current; even when an element has a channel width of $1 \times 10^6$ µm and a channel length of 10 µm, the off-state current can be less than or equal to the measurement limit of a semiconductor parameter analyzer, that is, less than or equal to $1 \times 10^{-13}$ A, at a voltage (drain voltage) between a source electrode and a drain electrode of from 1 V to 10 V.

The insulating layer 3213 contains one or both of hydrogen and nitrogen. Alternatively, the insulating layer 3213 contains nitrogen and silicon. The insulating layer 3213 has a function of blocking oxygen, hydrogen, water, alkali metal, alkaline earth metal, or the like. The insulating layer 3213 can prevent outward diffusion of oxygen from the metal oxide layer 3231, outward diffusion of oxygen from the insulating layer 3212, and entry of hydrogen, water, or the like into the metal oxide layer 3231 from the outside.

The insulating layer 3213 can be a nitride insulating film, for example. The nitride insulating film is formed using silicon nitride, silicon nitride oxide, aluminum nitride, aluminum nitride oxide, or the like.

Structure Example 2 of OS Transistor

Figure 31A:
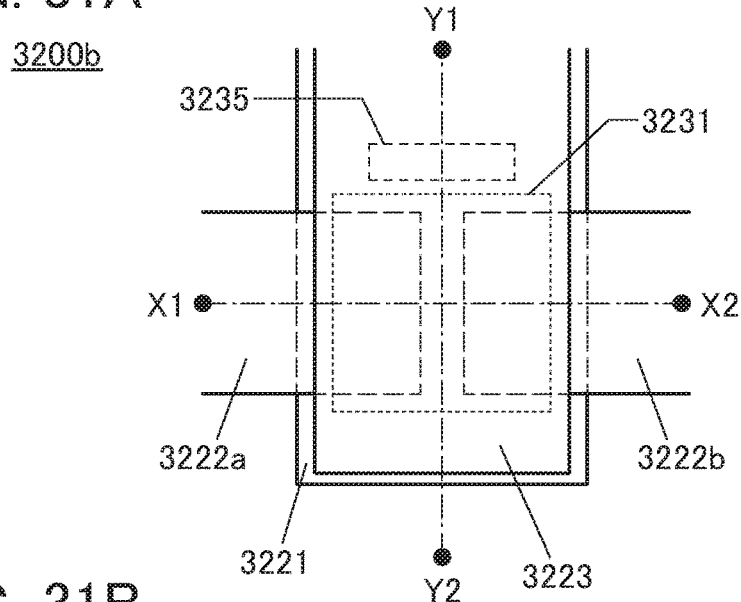
FIGS. 31A to 31C are a top view and cross-sectional views illustrating an example of a transistor used in a display device.
Figure 31B:
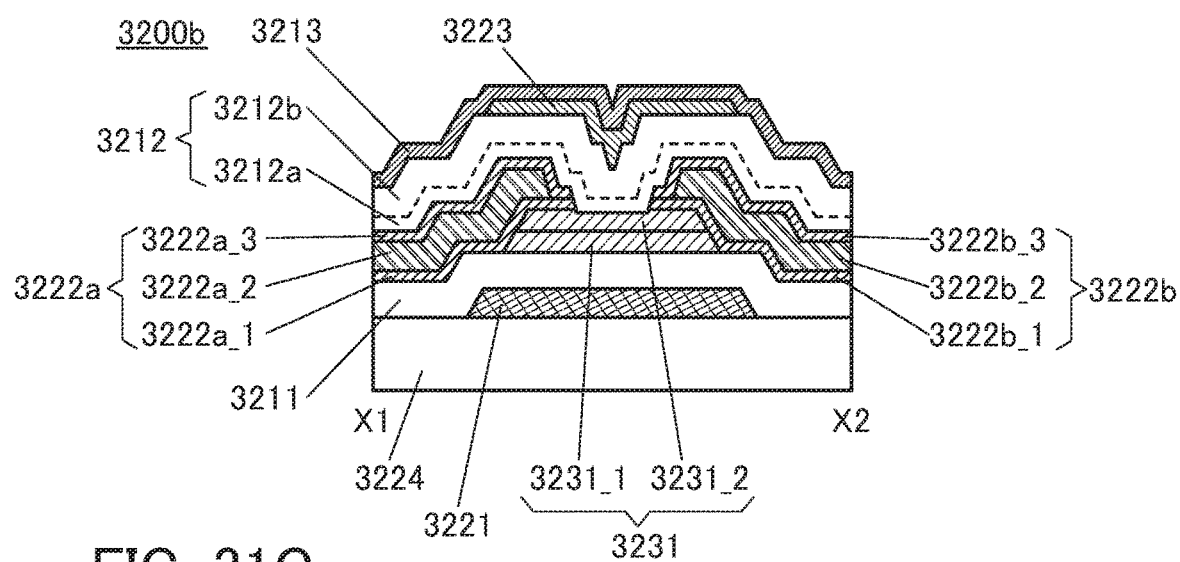
Figure 31C:
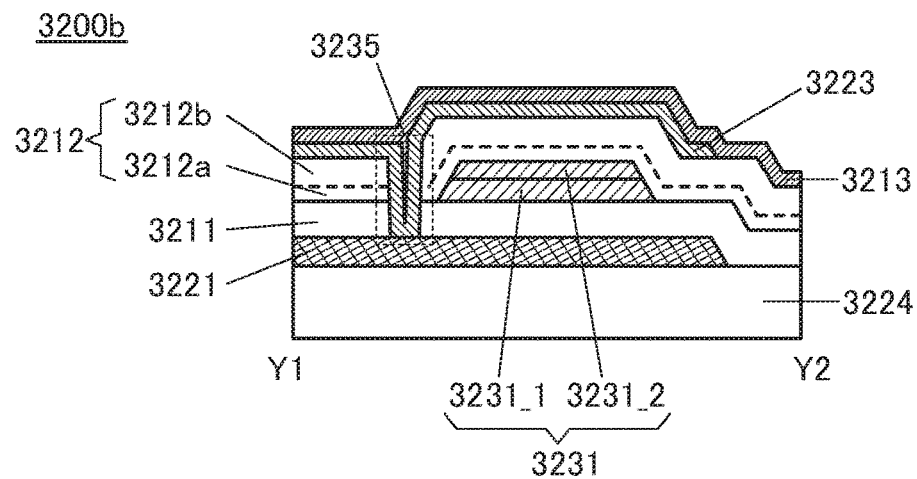

To show a structure example of a transistor, a transistor 3200b is described with reference to FIGS. 31A to 31C. FIG. 31A is a top view of the transistor 3200b. FIG. 31B is a cross-sectional view taken along the dashed-dotted line X1-X2 in FIG. 31A, and FIG. 31C is a cross-sectional view taken along the dashed-dotted line Y1-Y2 in FIG. 31A.

The transistor 3200b is different from the transistor 3200a in that the metal oxide layer 3231, the conductive layer 3222a, the conductive layer 3222b, and the insulating layer 3212 each have a multi-layer structure.

The insulating layer 3212 includes an insulating layer 3212a over the metal oxide layer 3231 and the conductive layers 3222a and 3222b, and an insulating layer 3212b over the insulating layer 3212a. The insulating layer 3212 has a function of supplying oxygen to the metal oxide layer 3231. That is, the insulating layer 3212 contains oxygen. The insulating layer 3212a is an insulating layer that allows oxygen to pass therethrough. Note that the insulating layer 3212a serves also as a film that relieves damage to the metal oxide layer 3231 at the time of forming the insulating layer 3212b in a later step.

A silicon oxide, a silicon oxynitride, or the like with a thickness greater than or equal to 5 nm and less than or equal to 150 nm, preferably greater than or equal to 5 nm and less than or equal to 50 nm can be used as the insulating layer 3212a.

Furthermore, it is preferable that the number of defects in the insulating layer 3212a be small and typically, the spin density of a signal that appears at g=2.001 due to a dangling bond of silicon be lower than or equal to $3 \times 10^{17}$ spins/cm$^3$ by electron spin resonance (ESR) measurement. This is because if the density of defects in the insulating layer 3212a is high, oxygen is bonded to the defects and the property of transmitting oxygen of the insulating layer 3212a is lowered.

Note that not all oxygen that has entered the insulating layer 3212a from the outside moves to the outside of the insulating layer 3212a but some oxygen remains in the insulating layer 3212a. In some cases, movement of oxygen occurs in the insulating layer 3212a in such a manner that oxygen enters the insulating layer 3212a and oxygen contained in the insulating layer 3212a moves to the outside of the insulating layer 3212a. When an oxide insulating layer that can transmit oxygen is formed as the insulating layer 3212a, oxygen released from the insulating layer 3212b provided over the insulating layer 3212a can be moved to the metal oxide layer 3231 through the insulating layer 3212a.

Note that the insulating layer 3212a can be formed using an oxide insulating layer having a low density of states due to nitrogen oxide. Note that the density of states due to nitrogen oxide can be formed between the valence band maximum (Ev_os) and the conduction band minimum (Ec_os) of the metal oxide film. A silicon oxynitride film that releases a small amount of nitrogen oxide, an aluminum oxynitride film that releases a small amount of nitrogen oxide, or the like can be used as the above oxide insulating layer.

Note that a silicon oxynitride film that releases a small amount of nitrogen oxide is a film which releases ammonia more than nitrogen oxide in thermal desorption spectroscopy (TDS) analysis; the amount of released ammonia is typically greater than or equal to $1 \times 10^{18}$/cm$^3$ and less than or equal to $5 \times 10^{19}$/cm$^3$. Note that the amount of released ammonia is the amount of ammonia released by heat treatment with which the surface temperature of the film becomes higher than or equal to 50° C. and lower than or equal to 650° C., preferably higher than or equal to 50° C. and lower than or equal to 550° C.

Nitrogen oxide ($NO_x$; x is greater than 0 and less than or equal to 2, preferably greater than or equal to 1 and less than or equal to 2), typically $NO_2$ or NO, forms levels in the insulating layer 3212a, for example. The level is positioned in the energy gap of the metal oxide layer 3231. Therefore, when nitrogen oxide is diffused to the interface between the insulating layer 3212a and the metal oxide layer 3231, an electron is in some cases trapped by the level on the insulating layer 3212a side. As a result, the trapped electron remains in the vicinity of the interface between the insulating layer 3212a and the metal oxide layer 3231; thus, the threshold voltage of the transistor is shifted in the positive direction.

Nitrogen oxide reacts with ammonia and oxygen in heat treatment. Since nitrogen oxide contained in the insulating layer 3212a reacts with ammonia contained in the insulating layer 3212b in heat treatment, nitrogen oxide contained in the insulating layer 3212a is reduced. Therefore, an electron is hardly trapped at the interface between the insulating layer 3212a and the metal oxide layer 3231.

By using the above oxide insulating layer for the insulating layer 3212a, a shift in the threshold voltage of the transistor can be reduced, which leads to reduced fluctuations in the electrical characteristics of the transistor.

The concentration of nitrogen of the above oxide insulating layer measured by SIMS is lower than or equal to $6 \times 10^{20}$ atoms/cm$^3$.

The above oxide insulating layer is formed by a PECVD method at a substrate temperature higher than or equal to 220° C. and lower than or equal to 350° C. using silane and dinitrogen monoxide, whereby a dense and hard film can be formed.

The insulating layer 3212b is an oxide insulating layer that contains oxygen at a higher proportion than the stoichiometric composition. Part of oxygen is released from the above oxide insulating layer by heating. The amount of oxygen released from the oxide insulating layer in TDS is more than or equal to $1.0 \times 10^{19}$ atoms/cm$^3$, preferably more than or equal to $3.0 \times 10^{20}$ atoms/cm$^3$. Note that the amount of released oxygen is the total amount of oxygen released by heat treatment in a temperature range of 50° C. to 650° C. or 50° C. to 550° C. in TDS. In addition, the amount of released oxygen is the total amount of released oxygen converted into oxygen atoms in TDS.

A silicon oxide film, a silicon oxynitride film, or the like with a thickness greater than or equal to 30 nm and less than or equal to 500 nm, preferably greater than or equal to 50 nm and less than or equal to 400 nm can be used for the insulating layer 3212b.

It is preferable that the number of defects in the insulating layer 3212b be small and typically, the spin density corresponding to a signal that appears at g=2.001 due to a dangling bond of silicon be lower than $1.5 \times 10^{18}$ spins/cm$^3$, preferably lower than or equal to $1 \times 10^{18}$ spins/cm$^3$ by ESR measurement. Note that the insulating layer 3212b is provided more apart from the metal oxide layer 3231 than the insulating layer 3212a is; thus, the insulating layer 3212b may have higher density of defects than the insulating layer 3212a.

Furthermore, the insulating layer 3212 can include insulating layers including the same kind of material; thus, a boundary between the insulating layer 3212a and the insulating layer 3212b cannot be clearly observed in some cases. Thus, in this embodiment, the boundary between the insulating layer 3212a and the insulating layer 3212b is shown by a dashed line. Although a two-layer structure including the insulating layers 3212a and 3212b is described in this embodiment, the present invention is not limited to this. For example, a single-layer structure including only the insulating layer 3212a or a multi-layer structure including three or more layers may be employed.

The metal oxide layer 3231 in the transistor 3200b includes a metal oxide layer 3231_1 over the insulating layer 3211 and a metal oxide layer 3231_2 over the metal oxide layer 3231_1. The metal oxide layers 3231_1 and 3231_2 contain the same kind of element. For example, it is preferable that the metal oxide layers 3231_1 and 3231_2 each independently contain the same element as the element in the metal oxide layer 3231 that is described above.

Each of the metal oxide layers 3231_1 and 3231_2 preferably contains a region where the atomic proportion of In is higher than the atomic proportion of M. For example, the atomic ratio of In to M and Zn in each of the metal oxide layers 3231_1 and 3231_2 is preferably In:M:Zn=4:2:3 or in the neighborhood thereof. As for the range expressed by the term "neighborhood" here, when In is 4, M is greater than or equal to 1.5 and less than or equal to 2.5, and Zn is greater than or equal to 2 and less than or equal to 4. Alternatively, the atomic ratio of In to M and Zn in each of the metal oxide layers 3231_1 and 3231_2 is preferably InM:Zn=5:1:6 or in the neighborhood thereof. The metal oxide layers 3231_1 and 3231_2 having substantially the same composition as described above can be formed using the same sputtering target; thus, the manufacturing cost can be reduced. When the same sputtering target is used, the metal oxide layers 3231_1 and 3231_2 can be formed successively in the same vacuum chamber. This can suppress entry of impurities into the interface between the metal oxide layers 3231_1 and 3231_2.

Here, the metal oxide layer 3231_1 may include a region whose crystallinity is lower than that of the metal oxide layer 3231_2. Note that the crystallinity of the metal oxide layers 3231_1 and 3231_2 can be determined by analysis by X-ray diffraction (XRD) or with a transmission electron microscope (TEM), for example.

The region with low crystallinity in the metal oxide layer 3231_1 serves as a diffusion path of excess oxygen, through which excess oxygen can be diffused into the metal oxide layer 3231_2 having higher crystallinity than the metal oxide layer 3231_1. When a multi-layer structure including the metal oxide layers having different crystal structures is employed and the region with low crystallinity is used as a diffusion path of excess oxygen as described above, the transistor can be highly reliable.

The metal oxide layer 3231_2 having a region with higher crystallinity than the metal oxide layer 3231_1 can prevent impurities from entering the metal oxide layer 3231. In particular, the increased crystallinity of the metal oxide layer 3231_2 can reduce damage at the time of processing into the conductive layers 3222a and 3222b. The surface of the metal oxide layer 3231, i.e., the surface of the metal oxide layer 3231_2 is exposed to an etchant or an etching gas at the time of processing into the conductive layers 3222a and 3222b. However, when the metal oxide layer 3231_2 has a region with high crystallinity, the metal oxide layer 3231_2 has higher etching resistance than the metal oxide layer 3231_1. Thus, the metal oxide layer 3231_2 serves as an etching stopper.

By including a region having lower crystallinity than the metal oxide layer 3231_2, the metal oxide layer 3231_1 sometimes has a high carrier density.

When the metal oxide layer 3231_1 has a high carrier density, the Fermi level is sometimes high relative to the conduction band of the metal oxide layer 3231_1. This lowers the conduction band minimum of the metal oxide layer 3231_1, so that the energy difference between the conduction band minimum of the metal oxide layer 3231_1 and the trap level, which might be formed in a gate insulating film (here, the insulating layer 3211), is increased in some cases. The increase of the energy difference can reduce trap of charges in the gate insulating film and reduce variation in the threshold voltage of the transistor, in some cases. In addition, when the metal oxide layer 3231_1 has a high carrier density, the metal oxide layer 3231 can have high field-effect mobility.

Although the metal oxide layer 3231 in the transistor 3200b has a multi-layer structure including two layers in this example, the structure is not limited thereto, and the metal oxide layer 3231 may have a multi-layer structure including three or more layers.

The conductive layer 3222a in the transistor 3200b includes a conductive layer 3222a_1, a conductive layer 3222a_2 over the conductive layer 3222a_1, and a conductive layer 3222a_3 over the conductive layer 3222a_2. The conductive layer 3222b in the transistor 3200b includes a conductive layer 3222b_1, a conductive layer 3222b_2 over the conductive layer 3222b_1, and a conductive layer 3222b_3 over the conductive layer 3222b_2.

For example, it is preferable that the conductive layers 3222a_1, 3222b_1, 3222a_3, and 3222b_3 contain one or more elements selected from titanium, tungsten, tantalum, molybdenum, indium, gallium, tin, and zinc. Furthermore, it is preferable that the conductive layers 3222a_2 and 3222b_2 contain one or more elements selected from copper, aluminum, and silver.

Specifically, the conductive layers 3222a_1, 3222b_1, 3222a_3, and 3222b_3 can contain an In—Sn oxide or an In—Zn oxide and the conductive layers 3222a_2 and 3222b_2 can contain copper.

An end portion of the conductive layer 3222a_1 has a region located outside an end portion of the conductive layer 3222a_2. The conductive layer 3222a_3 covers a top surface and a side surface of the conductive layer 3222a_2 and has a region that is in contact with the conductive layer 3222a_1. An end portion of the conductive layer 3222b_1 has a region located outside an end portion of the conductive layer 3222b_2. The conductive layer 3222b_3 covers a top surface and a side surface of the conductive layer 3222b_2 and has a region that is in contact with the conductive layer 3222b_1.

The above structure is preferred because the structure can reduce the wiring resistance of the conductive layers 3222a and 3222b and inhibit diffusion of copper to the metal oxide layer 3231.

Structure Example 3 of OS Transistor

Figure 32A:
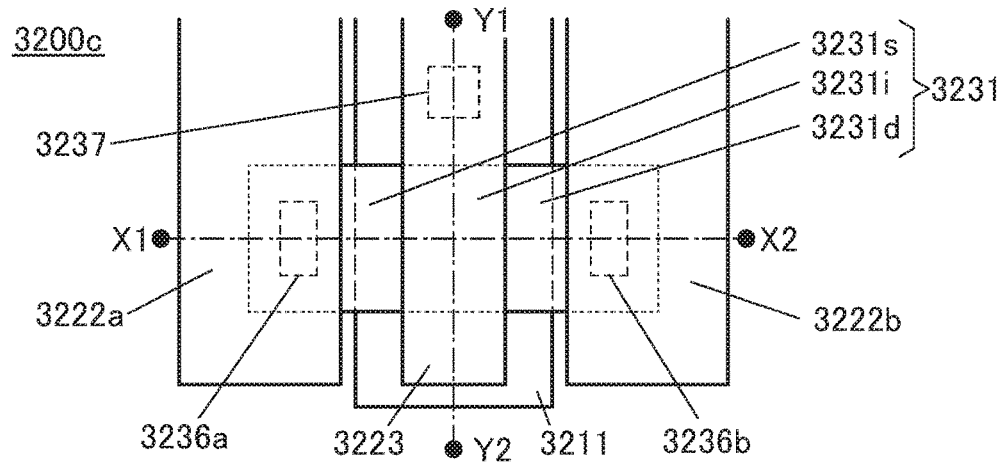
FIGS. 32A to 32C are a top view and cross-sectional views illustrating an example of a transistor used in a display device.
Figure 32B:
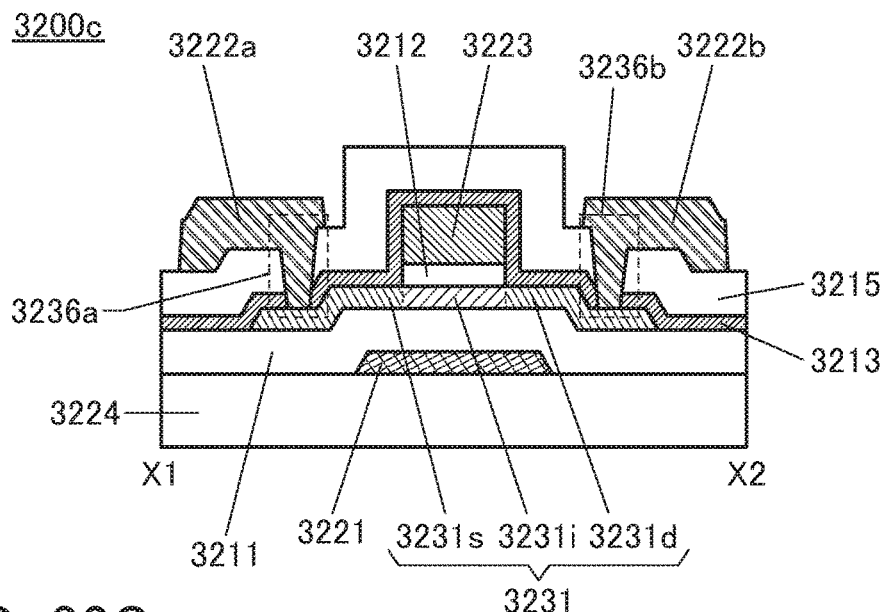

To show a structure example of a transistor, a transistor 3200c is described with reference to FIGS. 32A to 32C. FIG. 32A is a top view of a transistor 3200c. FIG. 32B is a cross-sectional view taken along the dashed-dotted line X1-X2 in FIG. 32A, and FIG. 32C is a cross-sectional view taken along the dashed-dotted line Y1-Y2 in FIG. 32A.

Figure 32C:
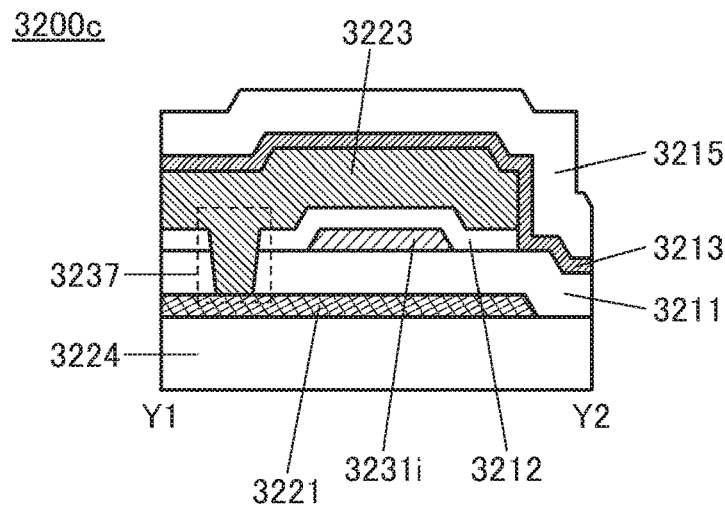

The transistor 3200c illustrated in FIGS. 32A to 32C includes the conductive layer 3221 over the insulating layer 3224; the insulating layer 3211 over the conductive layer 3221; the metal oxide layer 3231 over the insulating layer 3211; the insulating layer 3212 over the metal oxide layer 3231; the conductive layer 3223 over the insulating layer 3212; and the insulating layer 3213 over the insulating layer 3211, the metal oxide layer 3231, and the conductive layer 3223. The metal oxide layer 3231 includes a channel region 3231i overlapping with the conductive layer 3223, a source region 3231s in contact with the insulating layer 3213, and a drain region 3231d in contact with the insulating layer 3213.

The insulating layer 3213 contains nitrogen or hydrogen. The insulating layer 3213 is in contact with the source region 3231s and the drain region 3231d, so that nitrogen or hydrogen that is contained in the insulating layer 3213 is added to the source region 3231s and the drain region 3231d. The source region 3231s and the drain region 3231d each have a high carrier density when nitrogen or hydrogen is added thereto.

The transistor 3200c may further include an insulating layer 3215 over the insulating layer 3213, the conductive layer 3222a electrically connected to the source region 3231s through an opening 3236a provided in the insulating layers 3213 and 3215, and the conductive layer 3222b electrically connected to the drain region 3231d through an opening 3236b provided in the insulating layers 3213 and 3215.

The insulating layer 3215 can be an oxide insulating film. Alternatively, a multi-layer film including an oxide insulating film and a nitride insulating film can be used as the insulating layer 3215. The insulating layer 3215 can include, for example, silicon oxide, silicon oxynitride, silicon nitride oxide, aluminum oxide, hafnium oxide, gallium oxide, or Ga—Zn oxide. Furthermore, the insulating layer 3215 preferably functions as a barrier film against hydrogen, water, and the like from the outside.

The insulating layer 3211 serves as a first gate insulating film, and the insulating layer 3212 serves as a second gate insulating film. The insulating layers 3213 and 3215 serve as a protective insulating film.

The insulating layer 3212 includes an excess oxygen region. Since the insulating layer 3212 includes the excess oxygen region, excess oxygen can be supplied to the channel region 3231i included in the metal oxide layer 3231. As a result, oxygen vacancies that might be formed in the channel region 3231i can be filled with excess oxygen, which can provide a highly reliable semiconductor device.

To supply excess oxygen to the metal oxide layer 3231, excess oxygen may be supplied to the insulating layer 3211 that is formed below the metal oxide layer 3231. However, in that case, excess oxygen contained in the insulating layer 3211 might also be supplied to the source region 3231s and the drain region 3231d included in the metal oxide layer 3231. When excess oxygen is supplied to the source region 3231s and the drain region 3231d, the resistance of the source region 3231s and the drain region 3231d might be increased.

In contrast, in the structure in which the insulating layer 3212 formed over the metal oxide layer 3231 contains excess oxygen, excess oxygen can be selectively supplied only to the channel region 3231i. Alternatively, the carrier density of the source and drain regions 3231s and 3231d can be selectively increased after excess oxygen is supplied to the channel region 3231i and the source and drain regions 3231s and 3231d, in which case an increase in the resistance of the source and drain regions 3231s and 3231d can be prevented.

Furthermore, each of the source region 3231s and the drain region 3231d included in the metal oxide layer 3231 preferably contains an element that forms an oxygen vacancy or an element that is bonded to an oxygen vacancy. Typical examples of the element that forms an oxygen vacancy or the element that is bonded to an oxygen vacancy include hydrogen, boron, carbon, nitrogen, fluorine, phosphorus, sulfur, chlorine, titanium, and a rare gas. Typical examples of the rare gas element are helium, neon, argon, krypton, and xenon. In the case where one or more of the elements that form oxygen vacancies are contained in the insulating layer 3213, the one or more of the elements are diffused from the insulating layer 3213 to the source region 3231s and the drain region 3231d. Alternatively, one or more of the elements that form oxygen vacancies may be added to the source region 3231s and the drain region 3231d by impurity addition treatment. One or more of the elements that form oxygen vacancies may be introduced in the source region 3231s and the drain region 3231d by both diffusion from the insulating layer 3213 and impurity addition treatment.

An impurity element added to the oxide semiconductor film cuts a bond between a metal element and oxygen in the oxide semiconductor film, so that an oxygen vacancy is formed. Alternatively, when the impurity element is added to the oxide semiconductor film, oxygen bonded to a metal element in the oxide semiconductor film is bonded to the impurity element, and the oxygen is released from the metal element, whereby an oxygen vacancy is formed. As a result, the oxide semiconductor film has a higher carrier density and thus the conductivity thereof becomes higher.

The conductive layer 3221 functions as a first gate electrode and the conductive layer 3223 functions as a second gate electrode. The conductive layer 3222a functions as a source electrode and the conductive layer 3222b functions as a drain electrode.

As illustrated in FIG. 32C, an opening 3237 is formed in the insulating layers 3211 and 3212. The conductive layer 3221 is electrically connected to the conductive layer 3223 through the opening 3237. Thus, the conductive layers 3221 and 3223 are supplied with the same potential. Note that different potentials may be applied to the conductive layers 3221 and 3223 without providing the opening 3237. Alternatively, the conductive layer 3221 may be used as a light-blocking film without providing the opening 3237. For example, light irradiating the channel region 3231i from the bottom can be reduced by the conductive layer 3221 formed with a light-blocking material.

As illustrated in FIGS. 32B and 32C, the metal oxide layer 3231 faces the conductive layer 3221 functioning as a first gate electrode and the conductive layer 3223 functioning as a second gate electrode and is between the two conductive films functioning as the gate electrodes.

As with the transistors 3200a and 3200b, the transistor 3200c has the S-channel structure. Such a structure enables the metal oxide layer 3231 included in the transistor 3200c to be electrically surrounded by electric fields of the conductive layer 3221 functioning as the first gate electrode and the conductive layer 3223 functioning as the second gate electrode.

Since the transistor 3200c has the S-channel structure, an electric field for inducing a channel can be effectively applied to the metal oxide layer 3231 by the conductive layer 3221 or 3223; thus, the current drive capability of the transistor 3200c can be improved and high on-state current characteristics can be obtained. As a result of the high on-state current, it is possible to reduce the size of the transistor 3200c. Furthermore, since the transistor 3200c has a structure in which the metal oxide layer 3231 is surrounded by the conductive layers 3221 and 3223, the mechanical strength of the transistor 3200c can be increased.

The transistor 3200c may be called a top-gate self-aligned (TGSA) FET from the position of the conductive layer 3223 relative to the metal oxide layer 3231 or the formation method of the conductive layer 3223.

The metal oxide layer 3231 in the transistor 3200c may have a multi-layer structure including two or more layers, as in the transistor 3200b.

Although the insulating layer 3212 is present only in a portion overlapping with the conductive layer 3223 in the transistor 3200c, the structure is not limited thereto, and the insulating layer 3212 may cover the metal oxide layer 3231. Alternatively, the conductive layer 3221 may be omitted.

This embodiment can be implemented in appropriate combination with any of the structures described in the other embodiments and the like.

<Composition of CAC-OS>

The composition of a CAC-OS that can be used for a transistor disclosed in one embodiment of the present invention is described below.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In-Ga—Zn oxide with the CAC composition (such an In-Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline oxide semiconductor or c-axis-aligned and a-b-plane-anchored crystalline oxide semiconductor (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where intentional substrate heating is not performed, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In-Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current (Ion) and high field-effect mobility (t) can be achieved.

A semiconductor element including a CAC-OS has high reliability. Thus, the CAC-OS is suitably used in a variety of semiconductor devices typified by a display.

At least part of this embodiment can be implemented in appropriate combination with any of the other embodiments.

REFERENCE NUMERALS

A1: region, C1: arrow, C3: capacitor, C4: capacitor, C5: capacitor, C6: capacitor, R1: arrow, Tr1: transistor, Tr19: transistor, Tr20: transistor, Tr34: transistor, Tr35: transistor, Tr48: transistor, Tr49: transistor, Tr58: transistor, X0: adjoining portion, 10: pixel, 10s: light-blocking region, 10t: light-transmitting region, 21: shift register, 22: shift register, 23: shift register, 31: register, 32: register, 33: register, 35: register, 60: display unit, 61: pixel array, 62: gate driver, 63: gate driver, 64: source driver IC, 64a: source driver IC, 64d: source driver IC, 70: touch sensor unit, 71: sensor array, 72: touch sensor IC, 80: application processor, 90: tablet information terminal, 91: display region, 100: display device, 402: driver circuit, 403: detection circuit, 404: capacitor, 475: sensor element, 801: control circuit, 802: driver, 803: frame memory, 804: frame memory, 806: gate driver signal generation circuit, 807: gate driver signal generation circuit, 810: timing controller, 901: peripheral circuit region, 902: wiring, 904: wiring, 906: wiring, 910: transistor, 911: transistor, 912: transistor, 913: capacitor, 914: transistor, 915: capacitor, 916B: light-emitting region, 916G: light-emitting region, 916R: light-emitting region, 918B: display region, 918G: display region, 918R: display region, 918W: display region, 930: liquid crystal element, 931: coloring film, 932: light-blocking film, 935: display region, 940: light-emitting element, 951: substrate, 965: wiring, 972: FPC, 3200a: transistor, 3200b: transistor, 3200c: transistor, 3211: insulating layer, 3212: insulating layer, 3212a: insulating layer, 3212b: insulating layer, 3213: insulating layer, 3215: insulating layer, 3221: conductive layer, 3222a: conductive layer, 3222a_1: conductive layer, 3222a_2: conductive layer, 3222a_3: conductive layer, 3222b: conductive layer, 3222b_1: conductive layer, 3222b_2: conductive layer, 3222b_3: conductive layer, 3223: conductive layer, 3224: insulating layer, 3231: metal oxide layer, 3231_1: metal oxide layer, 3231_2: metal oxide layer, 3231d: drain region, 3231i: channel region, 3231s: source region, 3235: opening, 3236a: opening, 3236b: opening, 3237: opening, 5200B: data processor, 5210: arithmetic device, 5220: input/output device, 5230: display portion, 5240: input portion, 5250: sensor portion, and 5290: communication portion.

This application is based on Japanese Patent Application Serial No. 2016-239122 filed with Japan Patent Office on Dec. 9, 2016, the entire contents of which are hereby incorporated by reference.

The invention claimed is:

1. A display device comprising:
first to N-th pixel groups; and
a gate driver,
wherein N is an integer of 2 or more,
wherein the gate driver comprises a first circuit and a second circuit,
wherein the second circuit comprises first to N-th shift registers,
wherein the first to N-th pixel groups each comprise a transistor comprising a metal oxide in a channel formation region,
wherein the metal oxide comprises indium, gallium, and zinc,
wherein the first circuit is configured to select a K-th shift register from among the first to N-th shift registers,
wherein K is an integer more than or equal to 1 and less than or equal to N,
wherein the K-th shift register is configured to output a first signal to a gate line electrically connected to a K-th pixel group,
wherein the first circuit is configured to receive a first reset signal,
wherein the second circuit is configured to receive a second reset signal,
wherein the first reset signal is different from the second reset signal, and
wherein a number of registers included in the first circuit is smaller than a number of registers included in the second circuit.

2. The display device according to claim 1, wherein the first to N-th shift registers are configured to output first signals to gate lines electrically connected to the first to N-th pixel groups using a second signal as a trigger.

3. The display device according to claim 1, wherein the first circuit is a shift register.

4. The display device according to claim 1,
wherein in a period when the K-th shift register outputs the first signal, the first circuit is configured to select an L-th shift register to output a signal next, and
wherein L is an integer more than or equal to 1 and less than or equal to N and different from K.

5. The display device according to claim 1, further comprising a touch sensor unit,
wherein the touch sensor unit performs a touch sensing operation in a period when the first circuit and the first to N-th shift registers stop signal output.

6. The display device according to claim 1, further comprising an application processor,
wherein the application processor is configured to determine whether a display image changes in the first to N-th pixel groups, and
wherein the application processor is configured to rewrite the display image in the pixel group in which the display image changes and not to rewrite the display image in the pixel group in which the display image does not change.

7. The display device according to claim 1, wherein a transistor included in the gate driver comprises a metal oxide in a channel formation region.

8. A method for operating a display device,
wherein the display device comprises first to N-th pixel groups and a gate driver,
wherein N is an integer of 2 or more,
wherein the gate driver comprises a first circuit and a second circuit, and
wherein the second circuit comprises first to N-th shift registers,
wherein the first to N-th pixel groups each comprise a transistor comprising a metal oxide in a channel formation region,
wherein the metal oxide comprises indium, gallium, and zinc, the method comprising the steps of:
inputting a first reset signal to the first circuit;
inputting a second reset signal to the second circuit;
selecting a K-th shift register from among the first to N-th shift registers in one frame using the first circuit, the K being an integer more than or equal to 1 and less than or equal to N; and
outputting a first signal from the K-th shift register to a gate line electrically connected to a K-th pixel group in the one frame,
wherein the first reset signal is different from the second reset signal,
wherein the display device further comprises an application processor,
wherein the application processor is configured to determine whether a display image changes in the first to N-th pixel groups, and
wherein the application processor is configured to rewrite the display image in the pixel group in which the display image changes and not to rewrite the display image in the pixel group in which the display image does not change.

9. The method for operating a display device according to claim 8, wherein the first to N-th shift registers are configured to output first signals to gate lines electrically connected to the first to N-th pixel groups using a second signal as a trigger.

10. The method for operating a display device according to claim 8, wherein the first circuit is a shift register.

11. The method for operating a display device according to claim 8,
wherein in a period when the K-th shift register outputs the first signal, the first circuit is configured to select an L-th shift register to output a signal next, and
wherein L is an integer more than or equal to 1 and less than or equal to N and different from K.

12. The method for operating a display device according to claim 8,
wherein the display device further comprises a touch sensor unit, and
wherein the touch sensor unit performs a touch sensing operation in a period when the first circuit and the first to N-th shift registers stop signal output.

13. The method for operating a display device according to claim 8, wherein a transistor included in the gate driver comprises a metal oxide in a channel formation region.

* * * * *